US012764535B2

(12) United States Patent
Baskaran et al.

(10) Patent No.: US 12,764,535 B2
(45) Date of Patent: Oct. 13, 2026

(54) REVOCATION OF UAS-RELATED AUTHORIZATION AND SECURITY INFORMATION

(71) Applicant: Lenovo (Singapore) Pte. Ltd., New Tech Park (SG)

(72) Inventors: Sheeba Backia Mary Baskaran, Friedrichsdorf (DE); Andreas Kunz, Ladenburg (DE); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 117 days.

(21) Appl. No.: 18/260,930

(22) PCT Filed: Jan. 10, 2022

(86) PCT No.: PCT/IB2022/050147
§ 371 (c)(1),
(2) Date: Jul. 10, 2023

(87) PCT Pub. No.: WO2022/149104
PCT Pub. Date: Jul. 14, 2022

(65) Prior Publication Data

US 2024/0098494 A1 Mar. 21, 2024

Related U.S. Application Data

(60) Provisional application No. 63/135,511, filed on Jan. 8, 2021.

(51) Int. Cl.
*H04W 12/50* (2021.01)
*G08G 5/22* (2025.01)
*H04W 12/082* (2021.01)

(52) U.S. Cl.
CPC ............ *H04W 12/082* (2021.01); *G08G 5/22* (2025.01); *H04W 12/50* (2021.01)

(58) Field of Classification Search
CPC ... H04W 12/06; H04W 12/08; H04W 12/082; H04W 12/50; H04W 48/16; H04W 84/06; B64U 2101/00; H04L 2209/80
See application file for complete search history.

(56) References Cited

U.S. PATENT DOCUMENTS 8,583,918 B2 * 11/2013 Suzuki ................ H04L 63/0823 713/168
12,273,723 B2 * 4/2025 Park ...................... H04W 12/06
(Continued)

FOREIGN PATENT DOCUMENTS

JP 2008236594 A 10/2008

OTHER PUBLICATIONS

PCT/IB2022/050147, "Notification of Transmittal of the International Search Report and the Written Opinion of the International Searching Authority, or the Declaration", International Searching Authority, Jun. 14, 2022, pp. 1-24.
(Continued)

*Primary Examiner* — Lizbeth Torres-Diaz
(74) *Attorney, Agent, or Firm* — Kunzler Needham Hilton

(57) ABSTRACT

Apparatuses, methods, and systems are disclosed for handling security aspects for UAS in a 3GPP network. One apparatus contains a transceiver that receives a revocation indication message from a mobile communication network and a processor that deletes UAS-related authorization and security information corresponding to a UAV ID. The transceiver further transmits a revocation acknowledgement message to the mobile communication network.

20 Claims, 27 Drawing Sheets

(56) References Cited

U.S. PATENT DOCUMENTS

| | | | | |
|---|---|---|---|---|
| 2015/0350913 | A1* | 12/2015 | Eberwine | G06Q 20/3821 455/411 |
| 2021/0099870 | A1* | 4/2021 | Moon | H04W 12/06 |
| 2021/0329460 | A1* | 10/2021 | Liao | H04W 12/37 |
| 2022/0053329 | A1* | 2/2022 | Kim | G06F 21/10 |
| 2022/0086741 | A1* | 3/2022 | Liao | G08G 5/26 |
| 2022/0248497 | A1* | 8/2022 | Tamura | H04W 12/08 |
| 2022/0277657 | A1* | 9/2022 | Xiang | G08G 5/55 |
| 2022/0377547 | A1* | 11/2022 | Guo | H04W 12/065 |
| 2023/0104238 | A1* | 4/2023 | Chin | H04W 12/069 726/4 |
| 2023/0115431 | A1* | 4/2023 | Kim | H04W 12/06 370/316 |
| 2023/0133187 | A1* | 5/2023 | Ferdi | H04W 12/068 455/411 |
| 2023/0199863 | A1* | 6/2023 | Ferdi | H04W 76/10 370/329 |
| 2024/0224028 | A1* | 7/2024 | Khare | H04W 36/144 |
| 2026/0040067 | A1* | 2/2026 | Lei | H04W 12/06 |

OTHER PUBLICATIONS

CATT, "KI # 1, 2, 3, 5, 6 &7, Sol#5: Update the solution to clarify UTM triggered reauthentication and re-authorization case", 3GPP TSG-SA WG2 Meeting #141E S2-2007187, Oct. 12-23, 2020, pp. 1-4.

Qualcomm Inc. et al., "Sol#5 Update: Simplification and clarifications of solution 5", 3GPP TSG-WG SA2 Meeting #141E e-meeting S2-2008262, Oct. 12-23, 2020, pp. 1-23.

3GPP, "3rd Generation Partnership Project; Technical Specification Group Services and System Aspects; Study on supporting Unmanned Aerial Systems (UAS) connectivity, Identification and tracking (Release 17)", 3GPP TR 23.754 V17.0.0, Dec. 2020, pp. 1-140.

3GPP, "3rd Generation Partnership Project; Technical Specification Group Services and System Aspects; Study on security aspects of Unmanned Aerial Systems (UAS) (Release 17)", 3GPP TR 33.854 V0.3.0, Nov. 2020, pp. 1-40.

3GPP, "3rd Generation Partnership Project; Technical Specification Group Services and System Aspects; Procedures for the 5G System (5GS); Stage 2 (Release 16)", 3GPP TS 23.502 V16.7.0, Dec. 2020, pp. 1-603.

3GPP, "3rd Generation Partnership Project; Technical Specification Group Services and System Aspects; Support of Uncrewed Aerial Systems (UAS) connectivity, identification and tracking; Stage 2 (Release 17)", 3GPP TS 23.256 V17.0.0, Sep. 2021, pp. 1-47.

3GPP, "3rd Generation Partnership Project; Technical Specification Group Services and System Aspects; Security aspects of Uncrewed Aerial Systems (UAS) (Release 17)", 3GPP TS 33.256 V1.0.0, Dec. 2021, pp. 1-20.

Huawei, Hisilicon, "update to solution 3", 3GPP TSG-SA3 Meeting #109Adhoc-e S3-230467, Jan. 16-20, 2023, pp. 1-4.

SA WG2, "Presentation of TR 23.754 for information to TSG SA (FS_ID_UAS_SA2)", TSG SA Meeting #SP-89E SP-200700, Sep. 15-21, 2020, pp. 1-2.

* cited by examiner

REVOCATION OF UAS-RELATED AUTHORIZATION AND SECURITY INFORMATION

CROSS-REFERENCE TO RELATED APPLICATIONS

This application claims priority to U.S. Provisional Patent Application No. 63/135,511 entitled "UAV/UAV-C AUTHORIZATION AND PAIRING RELATED SECURITY ASPECTS HANDLING FOR UAS" and filed on Jan. 8, 2021 for Sheeba Backia Mary Baskaran, Andreas Kunz, and Dimitrios Karampatsis, which application is incorporated herein by reference.

FIELD

The subject matter disclosed herein relates generally to wireless communications and more particularly relates to UAV/UAV-C Authorization and Pairing related security aspects handling for UAS, e.g., in a network compliant with Third Generation Partnership Project ("3GPP") standards.

BACKGROUND

In some embodiments, a wireless networks compliant with the 3GPP family of cellular communication standards will support connections between an uncrewed/unmanned aerial vehicle controller ("UAV-C") and an uncrewed/unmanned aerial vehicle ("UAV"). Such networks may also support various uncrewed/unmanned aerial system ("UAS") services. For example, a UAS Service Supplier ("USS") and/or a UAS Traffic Management system ("UTM") may provide authentication and authorization services for a UAV and/or UAV-C. UAV USS authentication and authorization ("UUAA") is the procedure to ensure that the UAV (or UAV-C) can be authenticated and authorized by the USS before the connectivity for UAS services is enabled.

BRIEF SUMMARY

Disclosed are procedures for UAV/UAV-C Authentication, Authorization and Pairing related security aspects handling for UAS, e.g., in a 3GPP network. Said procedures may be implemented by apparatus, systems, methods, or computer program products.

One method of a User Equipment ("UE") for handling security aspects for UAS in a 3GPP network includes receiving a revocation indication message from a mobile communication network and deleting UAS-related authorization and security information corresponding to a UAV Identifier ("ID"). The first method includes transmitting a revocation acknowledgement message to the mobile communication network.

One method of a network entity (e.g., an Access and Mobility Management Function ("AMF") and/or a Session Management Function ("SMF")) for handling security aspects for UAS in a 3GPP network includes receiving a revocation message containing a UAV ID and sending a revocation indication to a UE in response to the revocation message. The method includes deleting a UAS context, corresponding to the revocation message and receiving a revocation acknowledgement from the UE.

One method of a UAS network function for handling security aspects for UAS in a 3GPP network includes receiving, from a first network entity (e.g., AMF/SMF), a UUAA request comprising one or more of: a network-level UAV ID, a subscription permanent identifier ("SUPI") and a Civil Aviation Authority ("CAA")-level UAV ID. The method includes associating the subscription permanent identifier with the CAA-level UAV ID and a network-level UAV ID and transmitting a second UUAA request to a USS and/or UTM, where the second UUAA request comprises routing information for a network function that handles UAV and/or UAV-C related message exchange, with the USS/UTM.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
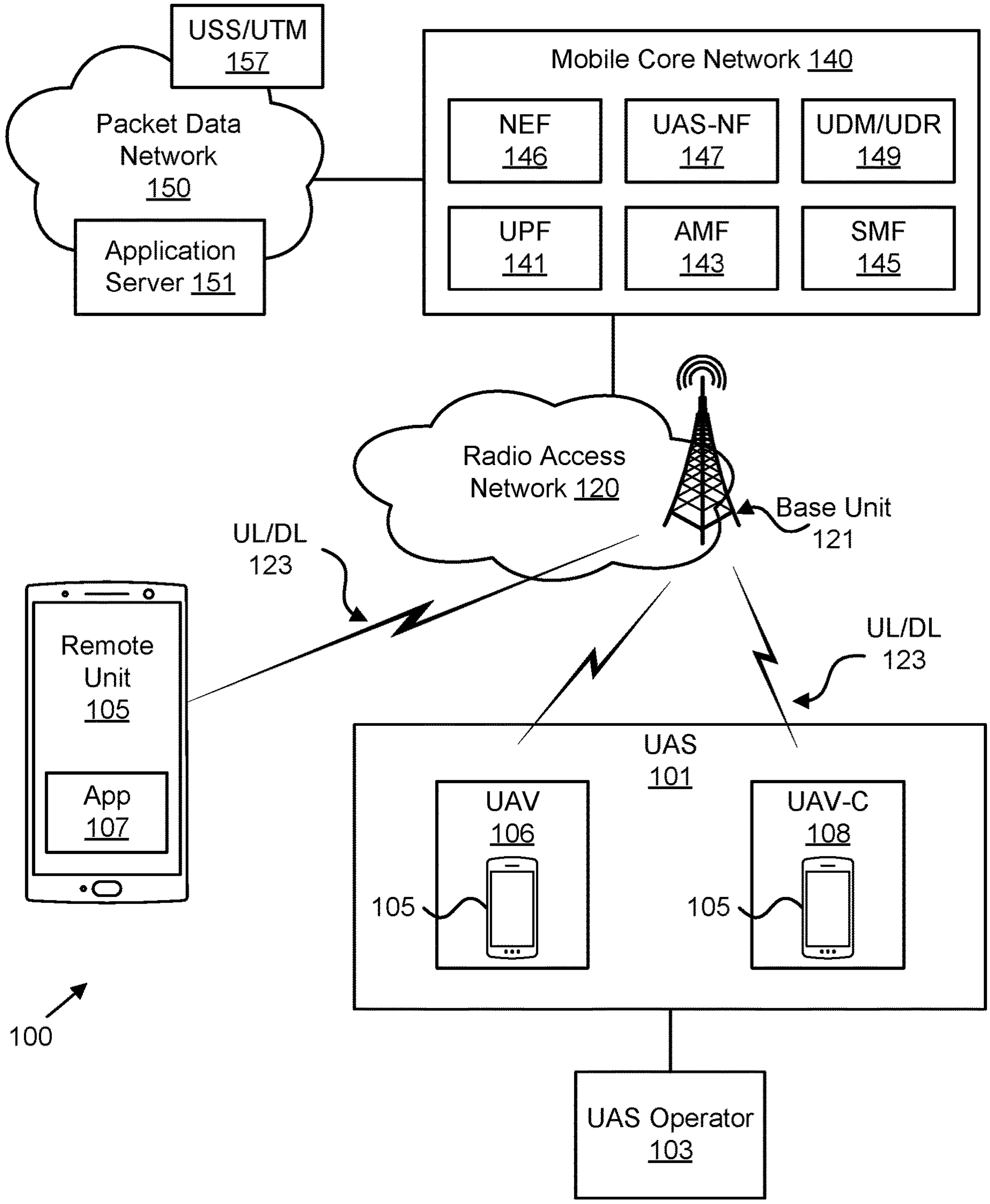
FIG. 1 is a schematic block diagram illustrating one embodiment of a wireless communication system for handling security aspects for UAS in a 3GPP network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for UAV/UAV-C Authorization and Pairing related security aspects handling for UAS. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

The UAV USS authentication and authorization ("UUAA") is the procedure to ensure that the UAV can be authenticated and authorized by a USS before the connectivity for UAS services is enabled. The UUAA is performed between the UAV and the USS.

An UAV is allowed to perform UUAA with the USS/UTM only after the UAV (i.e., containing a UE) has completed successfully primary authentication. The UUAA procedure may be triggered by an AMF when the UAV registers with 5GS. Alternatively, UUAA may be triggered by an SMF during the PDU session establishment procedure.

The AMF or SMF triggers the UUAA procedure when the UAV has an Aerial UE subscription and when the UAV requests access to UAS services (e.g., by providing the CAA-Level UAV ID of the UAV in the Registration Request or PDU Session Establishment Request). The UAV is authenticated based on the CAA-Level UAV ID and credentials associated to the CAA-Level UAV ID. The authentication messages are included in a transparent container and conveyed between the UAV and the USS via a 3GPP UAS network function (hereafter referred to as "UAS-NF"). On successful completion of a UUAA procedure, the USS can send UAS security information in the UUAA Authorization Payload to the UAV.

The UUAA procedure may also be triggered by a USS for re-authentication if the USS had previously authenticated the UAV. At any time after the initial registration, the USS, or the AMF (when the networking supports UUAA during registration) may initiate the Re-authentication procedure for the UAV.

However, existing UAV related authentication, authorization, pairing aspects supported by the 3GPP network is incomplete as described in the following sub-problems. The disclosure addresses the following issues related to the UAV/UAV-Controller (UAV-C) authentication/authorization and Pairing authorization (or reauthorization).

- Problem 1—Lack of Authorization Information and Security Context Release after a UAS Authentication/Pairing Authorization Revocation. After authorization revocation, how a corresponding authorization information and/or security context has been released is not defined in the 5G system for the UAS. If the authorization information and security context is not released after an UAS authentication or authorization revocation (or C2 pairing revocation), then there is a possibility to reuse old security context in the UAV/UAV-C and service may fail due to mismatch of security information between UAV/UAV-C and USS.
- Problem 2—Lack of provisioning UAS-NF Routing Information for the USS/UTM to support re-authorization. During Re-authorization, the USS/UTM may need to contact the right UAS-NF through which a UAV has been previously authenticated and/or authorized to send re-authorization request. But how the USS/UTM identifies a right UAS-NF which handles a UAV related UAS communication in the 5GS is not yet defined.
- Problem 3—Lack of Pairing related Security aspects. The UAV and UAV-C pairing procedure is incomplete because it does not illustrate, based on what information a 5GS determines to activate PDU session related to Command and Control ("C2") between UAV and UAV-C, and it does not clarify how a C2 session security is set up.

To resolve the above-mentioned issues, various solutions are disclosed for how an aviation authority authorizes the request by certifying that the UAV is authorized to perform a UAV operation and when required how an UAV authorization is revoked. Similarly, solutions are disclosed for how a UAV can be associated with a UAV controller (i.e., networked, or non-networked UAV-C) within the 3GPP core network and how a corresponding UAV/UAV-C pairing revocation is performed to release UAV and UAV-C connection has been described.

FIG. 1 depicts a wireless communication system 100 for supporting UAV/UAV-C Authorization and Pairing related security aspects handling for UAS, according to embodiments of the disclosure. In one embodiment, the wireless communication system 100 includes at least one remote unit 105, a UAV 106 and a UAV-C, which may include an instance of a remote unit 105, a radio access network ("RAN") 120 (e.g., a NG-RAN), and a mobile core network 140. The RAN 120 and the mobile core network 140 form a mobile communication network. The RAN 120 may be composed of at least one base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

An Unmanned Aerial System ("UAS") 101 includes an Unmanned Aerial Vehicular ("UAV") 106, e.g., a "drone," and an UAV Controller (denoted "UAV-C") 108. The UAS Operator 103 is the person who operates the UAV 106 (e.g., via the UAV-C 108) and who, typically, requests for flight authorizations. The UAV 106 and UAV-C 108 may each be UEs in the wireless communication system 100 and/or may include an instance of a remote unit 105. As such, the UAV 106 may communicate with an access network (e.g., RAN 120) to access services provided by a mobile core network 140.

In some embodiments, the UEs communicate with one or more UAV Traffic Management ("UTM") functions via a network connection with the mobile core network 140. As described below, the UAV 106 and/or UAV-C 108 may establish a PDU session (or similar data connection) with the mobile core network 140 using the RAN 120. The mobile core network 140 then relays traffic between the UE and the packet data network 150 using the PDU session. In certain embodiments, a UAV-C 108 may establish a connection with UTM functions where the connection is not established via the mobile core network 140.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. In various embodiments, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a UAS Network Function ("UAS-NF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

To support UAS operation and related security aspects, the mobile core network 140 may also include a UAS-NF 147 for interacting with a UAS Service Supplier ("US S") system and/or a UAS Traffic Management ("UTM") system (depicted as combined node "USS/UTM" 157). The USS/UTM 157, in one embodiment, provides a set of overlapping USSs that assist UAS operators 103 in conducting safe and compliant operations. The services may include deconfliction of flight plans, remote identification, and/or the like. In another embodiment, the USS/UTM 157 may be used to associate (i.e., pair) a UAV 106 with a UAV-C 108. Here, each UAV 106 provides its identity to the USS/UTM 157 and the USS/UTM 157 authorizes the request. The USS/UTM 157 may be located outside the mobile core network and may interact with core network function, such as the UAS-NF 147, via the NEF 146.

While depicted as a standalone network function, in an alternative deployment of the system 100 the UAS-NF 147 may be implemented as a service offered by NEF 146. The UAS-NF 147 is supported by the NEF 146 (or by both an NEF and Service Capability Exposure Function ("SCEF")—denoted "NEF/SCEF") and is used for external exposure of services to the USS. In some embodiments, the UAS-NF 147 uses existing NEF/SCEF exposure services for UAV authentication/authorization, for UAV flight authorization, for UAV/UAV-C pairing authorization, and related revocation; for location reporting, and control of QoS/traffic filtering for Command and Control ("C2") communication.

Note also that the UAS-NF 147 may be replaced with another 3GPP NF which handles the UAV/UAV-C related UAS operational message exchange with the corresponding USS/UTM on behalf of the 3GPP network, such as a UAV Flight Enablement Subsystem ("UFES"), the NEF 146, or another suitable NF in the 3GPP network. In certain embodiments, a dedicated NEF 146 may be deployed to provide only the UAS-NF functionality, i.e., to support the UAS-specific features/APIs and the NEF-features/APIs that are specified for capability exposure towards the USS/UTM 157.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

In various embodiments, a remote unit 105 (e.g., part of the UAV) receives an indication of UUAA revocation (alternatively, of UAS pairing and/or C2 connection revocation or UAV-UAV-C pairing authorization revocation) from the AMF 143 and/or SMF 145 in any of the N1 message (example, PDU Session release command). Here, the remote unit 105 may receive pairing revocation information/notification with C2 type, CAA-Level UAV ID, and UAV-C ID in any of the N1 message.

Upon receiving an UUAA revocation, the remove unit 105 (e.g., UAV 106) releases (e.g., removes and/or deletes) the locally stored UAS authentication and authorization information (e.g., received from the USS/UTM 157 after a successful UUAA) such as UUAA result, UAS security information (e.g., a security key), lifetime of UUAA, UAS/UAV authorization information (Token or any UUAA authorization information) and UAS ID, etc.

Upon receiving a C2/Pairing authorization revocation, the remote unit 105 (e.g., UAV 106) releases (e.g., removes/deletes) the locally stored C2/Pairing authorization information and session security information, pairing authorization results, etc., (e.g., received from the USS/UTM 157 after a successful UAV-UAV-C pairing authorization). In response, the remote unit 105 sends UAA Revocation Acknowledgement or Pairing Revocation Acknowledgement to the AMF 143 and/or SMF 145.

The remote unit 105 sends C2/Pairing Required indication in the PDU Session establishment request message or in any N1 message to the AMF 143 and/or SMF 145. In some embodiments, the remote unit 105 may receive Session Security Information, Pairing Success Indication, CAA-Level-UAV ID, UAV-C ID, and UAS ID in the PDU Session Establishment Accept Message or in any N1 message from the AMF 143 and/or SMF 145. In some embodiments, the remote unit 105 receives a UAS authentication/authorization ("UAS AA") Required indication or Pairing authorization Required indication or flight authorization required indication along with Cause value (e.g., the Cause value can include info on UAS AA/C2 Re-auth/UAV-C Change/Pairing Authorization) from the AMF 143 and/or SMF 145.

While FIG. 1 depicts components of a 5G RAN and a 5G core network, the described embodiments for handling security aspects for UAS in a 3GPP network apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), Authentication Center ("AuC"), and the like. For example, the AMF 143 may be mapped to an MME, the SMF 145 may be mapped to a control plane portion of a PGW ("PGW-C") or SGW+PGW-C and/or to an MME, the UPF 141 may be mapped to an SGW and a user plane portion of the PGW ("PGW-U"), the NEF may be mapped to a SCEF+NEF, UAS-NF may be mapped to a UAS-NF/SCEF+NEF, the UDM/UDR 149 may be mapped to an HSS/AuC, etc.

In the following descriptions, the term "gNB" is used for the base station/base unit, but it is replaceable by any other radio access node, e.g., RAN node, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions are also equally applicable to other mobile communication systems for handling security aspects for UAS in a 3GPP network.

The disclosure proposes the following features related to UAS Security (authentication, authorization (or reauthorization), UAS-NF discovery, revocation and session security set up) as listed in the following solutions:

a. According to embodiments of a first solution, UAV/UAV-C authorization and security information is removed during an USS UAV Authentication and Authorization ("UUAA") revocation and pairing/C2 revocation.

b. According to embodiments of a second solution, 3GPP NF/UAS-NF Routing and Re-authorization is supported.
c. According to embodiments of a third solution, C2 Pairing Authorization and Session Security Set up is supported.
d. According to embodiments of a fourth solution, USS/UTM Triggered PDU Session Establishment is supported.

Note: In all the embodiments, a 3GPP Network Function ("3GPP NF") which supports aerial functionality related to UAV identification and tracking, supports Remote Identification, UUAA, pairing authorization and related revocations, by sending and receiving UAS related message exchanges with the USS/UTM can be referred as the UAS-NF. In the following descriptions, the term "UAS-NF" is used for the above described 3GPP NF, but it is replaceable by any other 3GPP NF which supports UAS functionality, such as NEF, SCEF+NEF, UFES, or Unmanned Aerial System Control/Management/Interworking Function ("UASC/M/I/F") accordingly (or another NF coordinating UAS procedures between the 3GPP network and the external USS/UTM).

The first solution has primary focus on removing the stored Authorization Information and/or UAS Security Context at the UAV/UAV-C and 3GPP NFs following an authorization revocation procedure. Applicable 3GPP NFs include the AMF 143, the SMF 145, the NEF 146, and the UAS-NF 147 (representative of a 3GPP UAS Network Function for support of aerial functionality related to UAV identification and tracking, and to support Remote Identification) or any NF coordinating UAS procedures in the 3GPP network).

The first solution considers the following two scenarios for the revocation and deletion/removal of UAS-related information in the UE (i.e., UAV/UAV-C) and the 3GPP NF. The first scenario (i.e., Scenario A) is UUAA revocation, while the second scenario (i.e., Scenario B) is UAS pairing revocation (i.e., UAV-UAV-C pairing authorization revocation). As used herein, a "UAS pairing" refers to a UAV/UAV-C pairing, a C2 pairing, and/or a C2 association. Note that the USS UAV Authorization/Authentication ("UUAA") can otherwise be referred to as UAS Authentication and Authorization ("UAA").

Figure 2A:
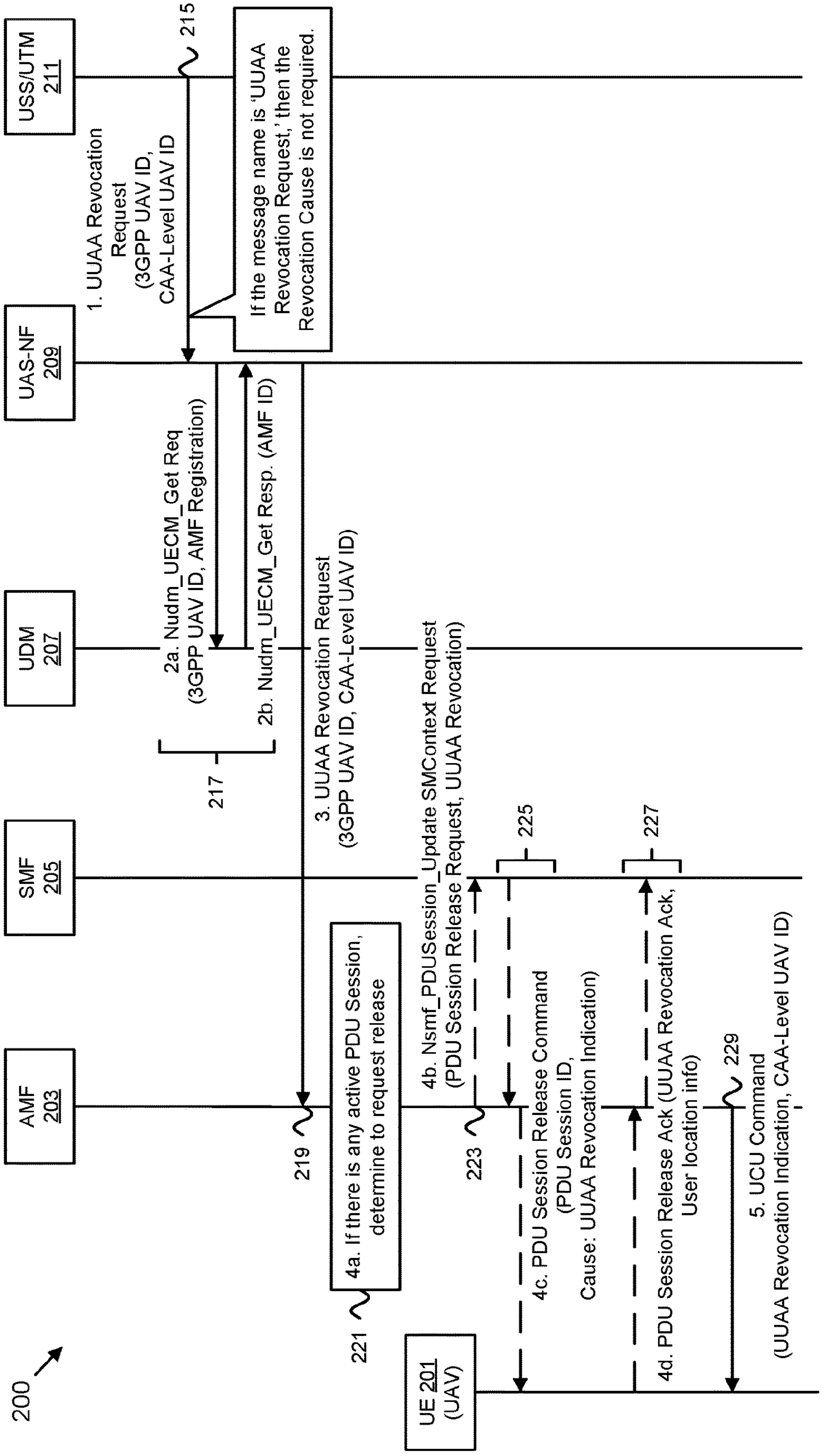
FIG. 2A illustrates one embodiment of a procedure for UUAA Revocation related security information removal at UAV/UAV-C and 3GPP network function ("NF")
Figure 2B:
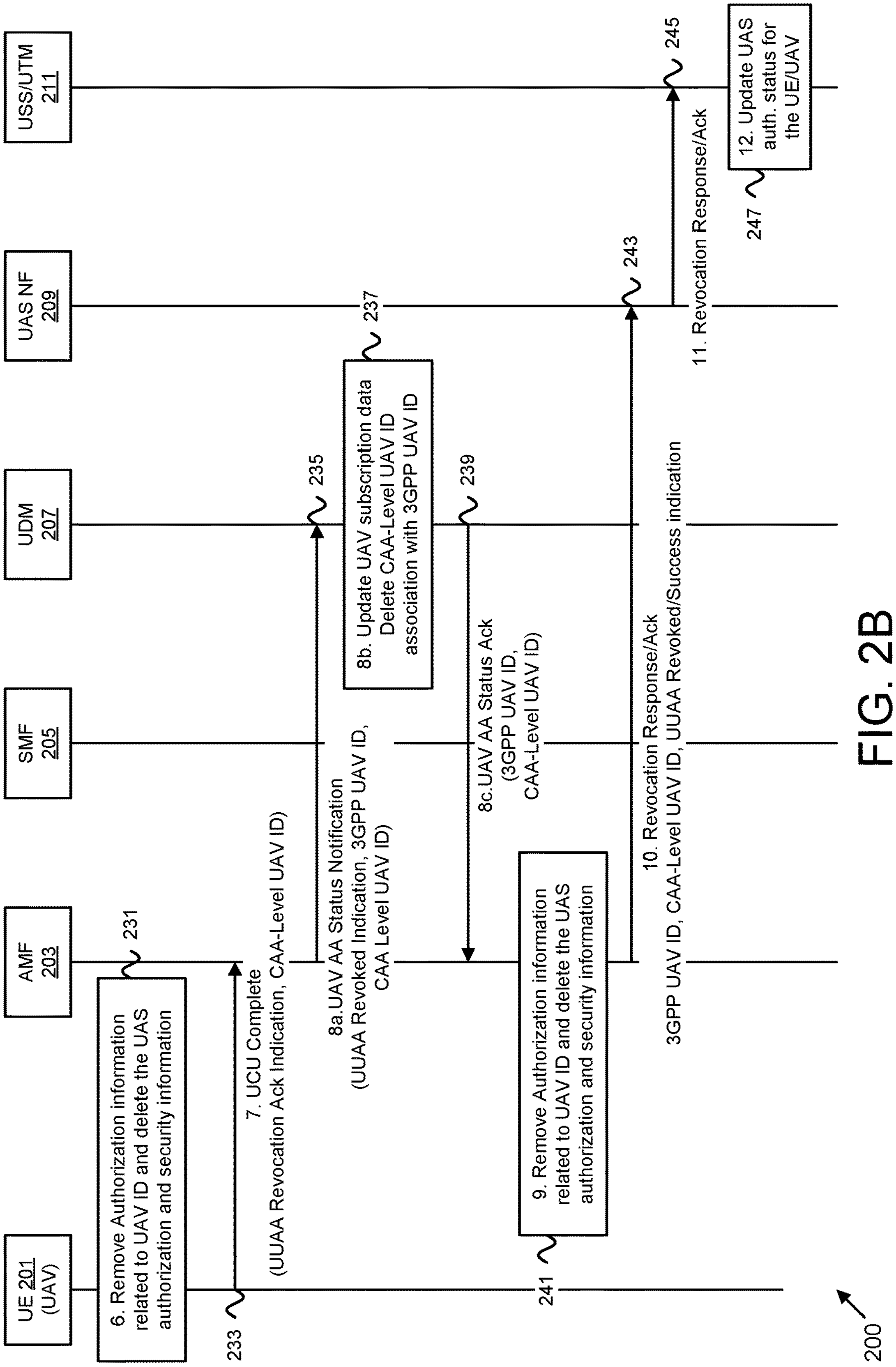
FIG. 2B is a continuation of the procedure of FIG. 2A.

FIGS. 2A-2B depict an exemplary procedure 200 for UUAA Revocation and related security information removal at UAV/UAV-C and 3GPP NF (such as AMF, SMF, UDM and NEF/UAS-NF), according to embodiments of the first solution. The procedure 200 involves a UE 201 (e.g., the Aerial UE of a UAV and one embodiment of the remote unit 105), an AMF 203 (e.g., one embodiment of the AMF 143), an SMF 205 (e.g., one embodiment of the SMF 145), a UDM 207 (e.g., one embodiment of the UDM/UDR 149), a UAS-NF 209 (e.g., one embodiment of the UAS-NF 147) and a USS/UTM server 211 (e.g., one embodiment of the USS/UTM 157). In certain embodiments, the UAS-NF 209 may be replaced with another 3GPP NF which handles the UAV/UAV-C related UAS operational message exchange with the corresponding USS/UTM on behalf of the 3GPP network, such as a UFES, the NEF, or another suitable NF in the 3GPP network. The steps of the procedure 200 are as follows:

Beginning on FIG. 2A, at Step 1, when the USS/UTM server 211 determines to revoke a UUAA, it sends a UUAA Revocation Request to the UAS-NF 209 (see messaging 215). Here, the UUAA Revocation Request includes at least a 3GPP UAV ID (e.g., a Generic Public Subscription Identifier ("GPSI")) and CAA-Level UAV ID.

At Step 2, the UAS-NF 209 retrieves a UUAA context associated with the 3GPP UAV ID and CAA-Level UAV ID. For example, at Step 2*a*, the UAS-NF 209 sends a Nudm_UECM_Get Request message to the UDM 207 with the received 3GPP UAV ID, and setting the NF type as 'AMF'. Alternatively, the UAS-NF 209 may fetch the (locally stored) SUPI corresponding to a received 3GPP UAV ID and send a Nudm_UECM_Get Request message to the UDM, said request containing the SUPI and having the NF type set as 'AMF'. At Step 2*b* the UAS-NF 209 receives the serving AMF information corresponding to the 3GPP UAV ID (or SUPI) from the UDM 207, i.e., in a Nudm_UECM_Get response message (see messaging 217).

At Step 3, the UAS-NF 209 forwards the received UUAA Revocation Request message to the serving AMF 203, which contains 3GPP UAV ID/SUPI, and CAA-Level UAV ID in a transparent container (see messaging 219). Alternatively, if the AMF 203 has subscribed to be notified of revocation of UUAA, the UAS-NF 209 sends a UUAA Revocation Notification message to the serving AMF 203. The UAS-NF 209 can delete the UUAA context related to the UUAA revocation request at this phase or later.

At Step 4*a*, upon receiving the UUAA Revocation Request/Notification, the AMF 203 checks whether there is any active PDU Session corresponding to the indicated 3GPP UAV ID/CAA-Level UAV ID (see block 221). If there is any active PDU Session, then the AMF 203 performs steps 4*b* through 4*d* to release the active PDU Session(s) corresponding to the indicated 3GPP UAV ID/CAA-Level UAV ID. Otherwise, if there is no active PDU session for the UE 201 (i.e., UAV), then steps 4*b*-4*d* may be skipped.

At Step 4*b*, the AMF 203 sends a UUAA Revocation indication and 3GPP UAV ID/SUPT/CAA-Level UAV ID along with the PDU Session Release Request to the SMF 205, e.g., in a Nsmf_PDUSessionUpdateSM Context Request message (see messaging 223). In an alternative, the UAS-NF 209 may send a UUAA revocation message to the service SMF (i.e., SMF 205). The SMF 205 updates/deletes the locally stored UAV related information/UAA status information corresponding to the received 3GPP UAV ID/SUPI/CAA-Level UAV ID.

In an alternative embodiment, the UUAA revocation request may be sent to the SMF 205 directly from the UAS-NF 209. Upon receiving such request, the SMF 205 can trigger PDU Session release. Note that where the UUAA revocation request is sent directly to the SMF 205 from the UAS-NF 209, the above steps 4*a* and 4*b* are unnecessary, and thus may be skipped.

At Step 4*c*, upon receiving the UUAA Revocation indication, the SMF 205 sends a PDU Session Release command to the AMF 203 which contains PDU Session ID with Cause set as 'UUAA Authorization Revocation' and CAA-Level UAV ID. The AMF 203 forwards the received PDU Session Release Command containing PDU Session ID, Cause 'UUAA Revocation' to the UE 201 (i.e., UAV/UAV-C) (see messaging 225).

At Step 4*d*, the UE 201 (i.e., UAV/UAV-C) performs the PDU Session Release by sending the PDU Session Release Acknowledgement and UUAA Revocation Acknowledgement indication to the SMF 205 via the AMF 203, e.g., similar to the existing system described in 3GPP Technical Specification ("TS") 23.502 (see messaging 227). If the SMF 205, upon receiving the UUAA Revocation Acknowledgement indication considers the UUAA Revocation as successful, then steps 5-11 may be skipped.

At Step 5, in response to receiving the UUAA Revocation Request/Notification from the USS/UTM server 211 via the UAS-NF 209, the AMF 203 sends a UE Configuration Update ("UCU") command to the UE 201 (i.e., UAV/UAV-C) with the UUAA Revocation Indication and the CAA-Level UAV ID (see messaging 229). The AMF 203 can delete the UUAA context being revoked at this phase or later.

Continuing on FIG. 2B, at Step 6, upon receiving the UUAA Revocation Indication, the UE 201 (i.e., UAV/UAV-C) deletes the locally stored UAS authorization information (i.e., UUAA related authorization data) and all UAS security context related information (e.g., keys, token, lifetime, pairing information, pairing security information, etc.) related to the CAA-Level UAV ID (i.e., which were received and stored after a successful UUAA earlier should be deleted) (see block 231). While FIG. 2B depicts the UE 201 (i.e., UAV) removing/deleting the locally stored UAS authorization information after receiving the UUAA Revocation Indication from the AMF 203 in Step 5, in other embodiments the UE 201 (i.e., UAV) may delete the locally stored UAV-related information soon after step 4*c* upon receiving the UUAA Revocation Indication during PDU Session release.

At Step 7, after the successful release of all UAS authorization and security information, the UE 201 (i.e., UAV/UAV-C) sends a UE Configuration Update ("UCU") complete message to the AMF 203 with the UUAA Revocation Acknowledgement indication and the CAA-Level UAV ID (see messaging 233). Alternatively, if the AMF 203 at step 5 deleted the UUAA context being revoked, then upon receiving the step 7 with UUAA Revocation Acknowledgement indication and the CAA-Level UAV ID, the AMF 203 considers the UUAA revocation as successful, and steps 8-11 may be skipped. Note that is the UE 201 (i.e., UAV) received the UUAA Revocation Indication in step 4*c* and transmits the UUAA Revocation Acknowledgement in step 4*d*, then step 5 and step 7 are unnecessary and thus may be skipped.

At Step 8*a*, the AMF 203 sends a UAV Authentication and Authorization ("UAV AA") Status Notification message to the UDM 207 (i.e., this can be a Nudm service operation message) with the 'UUAA Revoked Indication' with 3GPP UAV ID (e.g., GPSI) and the CAA-Level UAV ID (see messaging 235). In an alternative embodiment, the AMF 203 sends a UUAA Status Notification message to the UDM 207 (and/or co-located UDR) with the above contents.

At Step 8*b*, the UDM 207 (and/or co-located UDR) updates the UAV subscription data with the UAS authentication status information (i.e., UUAA Revoked) and deletes the CAA-Level UAV ID associated with the 3GPP UAV ID for the SUPI (see block 237).

At Step 8*c*, the UDM 207 (and/or co-located UDR) sends a UAV AA Status Acknowledgement message to the AMF 203 (i.e., this can be a Nudm service operation message) which contains 3GPP UAV ID and received CAA-Level UAV ID (see messaging 239). In an alternative embodiment, the UDM 207 (and/or co-located UDR) sends a UUAA Status Acknowledgement message to the AMF 203 with the above contents.

At Step 9, the AMF 203 deletes all UAV-related information locally stored (i.e., if available and not deleted earlier) for the CAA-Level UAV ID and 3GPP UAV ID such as authorization information (Token), UUAA authentication and authorization status information, lifetime, security information, etc. (see block 241). While FIG. 2B depicts the AMF 203 deleting the locally stored UAV-related information after receiving the UAV AA (alt. UUAA) Acknowledgement message, in other embodiments the AMF 203 may delete the locally stored UAV-related information soon after receiving the UUAA Revocation Request in Step 3. Alternatively, the locally stored UAV-related information may be deleted after sending an acknowledgement to the UAS-NF 209 (i.e., in Step 10).

In one alternative embodiment, if the UUAA context for the UE 201 (i.e., UAV) was deleted by the AMF 203 in the previous steps while sending the UUAA Revocation request to the UE 201 (i.e., UAV), then after receiving the UUAA Revocation Acknowledgement from the UE 201, the AMF 203 need not do anything, other than considering the UUAA revocation as successful in response to receiving the UUAA Revocation Acknowledgement from the UE 201. Accordingly, in this alternative embodiment the Steps 8*a*, 8*b*, and 8*c* would be skipped. In a further embodiment, the AMF 203 is not expected to send a UUAA Revocation Response/Acknowledgement message to the UAS-NF 209.

At Step 10, the AMF 203 sends a UUAA Revocation Response/Acknowledgement message to the UAS-NF 209 (see messaging 243). As depicted, the revocation response/acknowledgement message may include the 3GPP UAV ID, the CAA-Level UAV ID and a UUAA Revoked Indication/Success Indication. Alternatively, the UUAA Revocation Response/Acknowledgement message name can be described with any message name (e.g., using any Naf_Auth_Notification or in any NEF service operation message). Alternatively, if the AMF 203 sends only a Revocation Response/Acknowledgement message to the UAS-NF 209 (i.e., where the message type implicitly indicates that revocation has occurred), then the AMF 203 need not also send a UUAA Revoked Indication/Success Indication within the Revocation Response/Acknowledgement message.

In one alternative embodiment, if the SMF 205 receives the UUAA Revocation Request directly from the UAS-NF 209, then Step 10 may be performed by the SMF 205 upon receiving the UUAA Revocation Acknowledgement from the UE 201. In a further alternative, the SMF 205 is not expected need not do anything in response to the UUAA Revocation Acknowledgement from the UE 201, other than considering the UUAA revocation as successful. Accordingly, in this alternative Step 10 would be skipped as the SMF 205 would not expect to send a UUAA Revocation Response/Acknowledgement message to the UAS-NF 209.

At Step 11, the UAS-NF 209 sends the received UUAA Revocation Response/Acknowledgement message to the USS/UTM server 211 (see messaging 245). Alternatively, if the UAS-NF 209 sends the UUAA Revoked Indication/Success Indication to the USS/UTM server 211, if received from the AMF 203. Upon on receiving the UUAA Revoked indication, the UAS-NF 209 deletes any UAS-related information (i.e., UUAA Context) and any UAV identifiers locally stored for the UE 201 (i.e., UAV/UAV-C). While FIG. 2B depicts the UAS-NF 209 deleting the locally stored UAV-related information after receiving the UAV AA (alt. UUAA) Acknowledgement message, in other embodiments the UAS-NF 209 may delete the locally stored UAV-related information (i.e., UUAA related authorization data/UUAA Context) soon after receiving the UUAA Revocation Request in Step 2. Alternatively, the locally stored UAV-related information may be deleted after sending an acknowledgement to the USS/UTM server 211 (i.e., in Step 12).

In one alternative embodiment, if the locally stored UAV-related information for the UE 201 (i.e., UAV) was removed/deleted by the UAS-NF 209 in the previous steps, e.g., soon after sending an UUAA Revocation request to the AMF 203 and/or SMF 205, then after receiving a UUAA Revocation Acknowledgement from the AMF 203 and/or SMF 205, the UAS-NF 209 need not do anything, other than considering the UUAA revocation as successful. Accordingly, in this alternative embodiment the Step 11 would be skipped as the UAS-NF 209 would not be expected to send a UUAA Revocation Response/Acknowledgement message to the USS/UTM server 211. Alternatively, the UAS-NF 209 may send a UUAA Revocation Acknowledgement to the USS/UTM server 211, soon after deleting the locally stored UAV-related information for the UE and/or after sending the revocation request to the AMF/SMF.

At Step 12, upon receiving the UUAA Revoked Indication/Success Indication, the USS/UTM server 211 updates the UAS authentication and authorization information status and deletes the related security information locally stored for a UAV corresponding to its CAA-Level UAV ID (see block 247). The procedure 200 ends.

Applicability to EPS: The UUAA Revocation procedure 200 shown in FIGS. 2A-2B as described above are also applicable to EPS, with the adaptation of using an MME instead of the AMF 203, using an SGW+PGW-C instead of the SMF 205, and using an HSS/AuC instead of the UDM 207. In the EPS deployment, the UAS-NF 209 may be replaced with another 3GPP NF/UFES which can perform the role of the UAS-NF 209 or as a UAS control function in the 3GPP network. The 3GPP NF/UFES may be a standalone network function, or may be a service offered by the SCEF+NEF in the EPS instead of NEF in the 5GS.

Figure 3A:
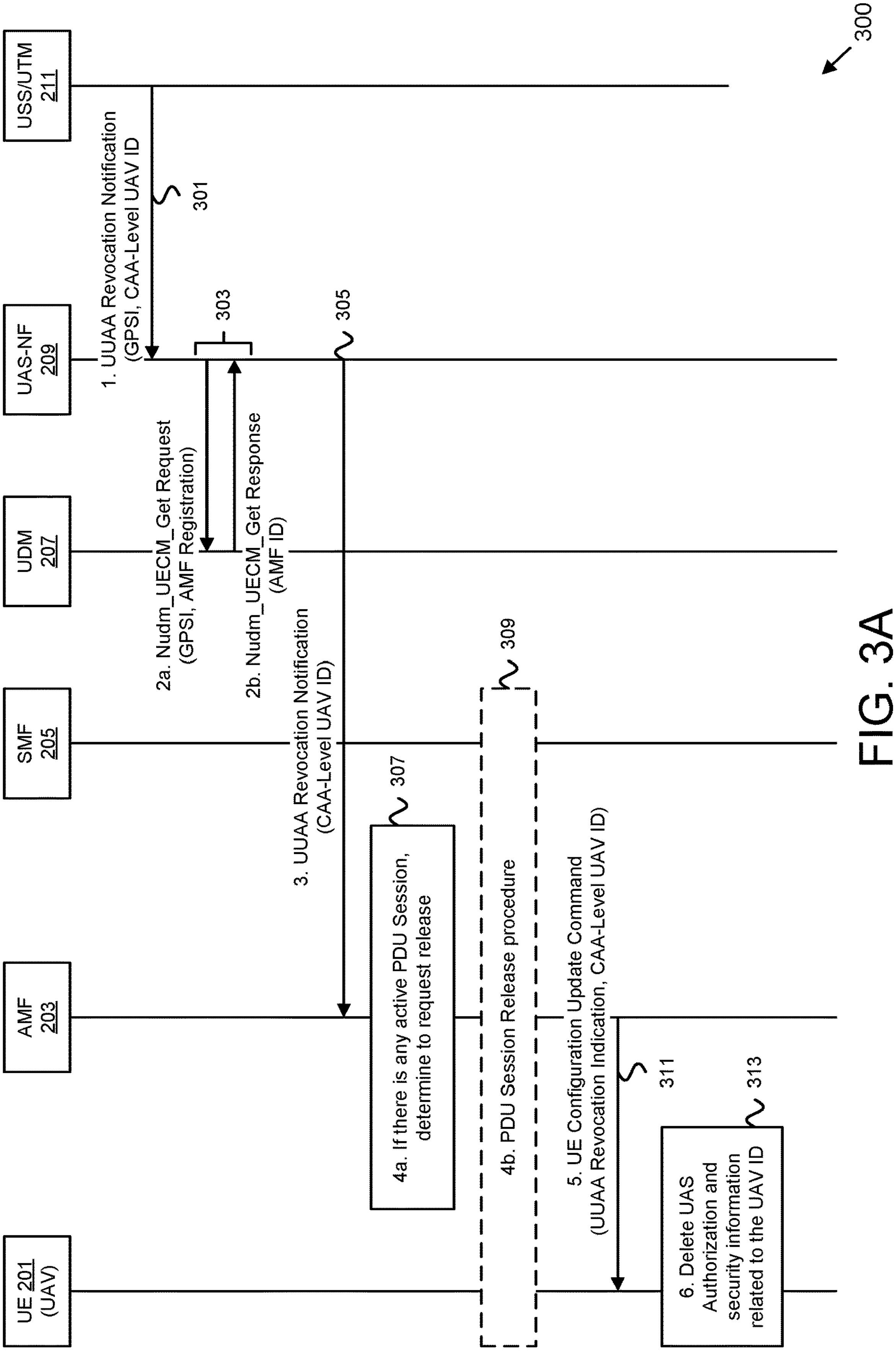
FIG. 3A illustrates one embodiment of another procedure for UUAA Revocation.
Figure 3B:
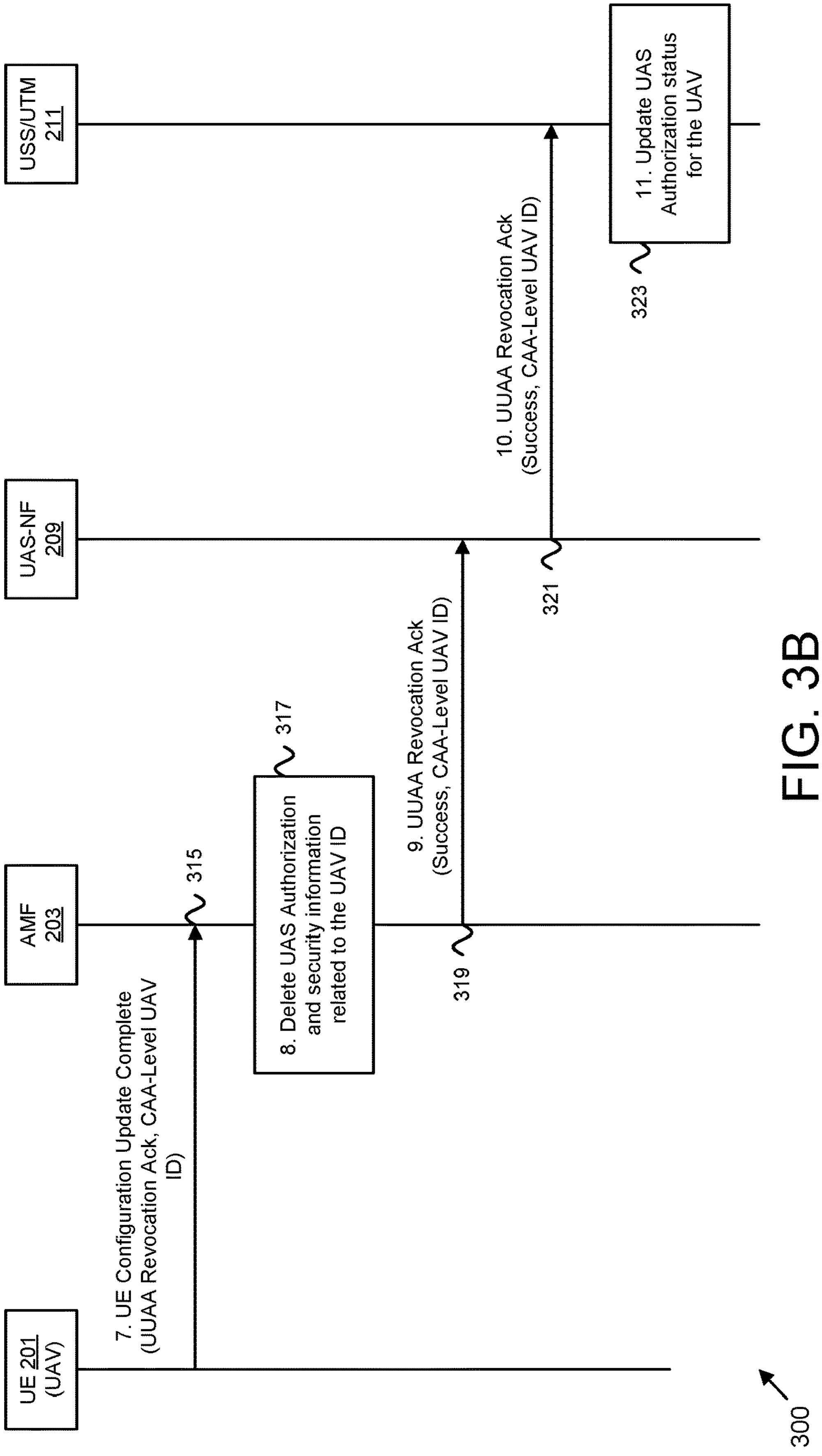
FIG. 3B is a continuation of the procedure of FIG. 3A.

FIGS. 3A-3B depicts a first variant procedure 300 of UUAA Revocation, according to embodiments of the first solution. The procedure 300 involves the UE 201, the AMF 203, the SMF 205, the UDM 207, the UAS-NF 209, and the USS/UTM server 211. In certain embodiments, the UAS-NF 209 may be replaced with another 3GPP NF which handles the UAV/UAV-C related UAS operational message exchange with the corresponding USS/UTM on behalf of the 3GPP network, such as a UFES, the NEF, or another suitable NF in the 3GPP network. The steps of the procedure 300 are as follows:

Beginning on FIG. 3A, at Step 1, the USS/UTM server 211 determines to revoke UUAA corresponding to an UAV identified with a CAA-Level UAV-ID and sends an UAA Revocation Notification with a GPSI and the CAA-Level UAV ID to the corresponding UAS-NF 209 using a service operation message (see messaging 301). In some embodiments, the UAS-NF 209 is subscribed with the USS/UTM server 211 to receive notifications relating to UAV authentication and authorization.

At Step 2, the UAS-NF 209 fetches the serving AMF ID corresponding to the GPSI of the UAV from the UDM 207, e.g., by invoking Nudm_UECM_Get Request/Response message, e.g., based on TS 23.502, Clause 5.2.3.2.4 (see messaging 303). Here it is assumed that the GPSI corresponds to the UE 205 (i.e., embodied in a UAV).

At Step 3, the UAS-NF 209 sends the received UUAA Revocation Notification message to the AMF 203 with the CAA-Level UAV ID (see messaging 305). The UAS-NF 209 removes UAV-related information (if any) (i.e., UUAA related authorization data) locally stored related to the CAA-Level UAV ID. In some embodiments, the AMF 203 is subscribed with the UAS-NF 209 to receive notifications relating to UAV authentication and authorization.

At Step 4*a*, upon receiving the UUAA Revocation Notification, the AMF 203 determines whether there is any active PDU session corresponding to the identified UAV (i.e., related to the UE 201) (see block 307). If there is any active PDU Session, then the AMF 203 determines to request PDU Session release.

At conditional Step 4*b*, if there is any related active PDU session corresponding to the UAV, then the AMF 203 and/or SMF 205 initiates a PDU Session release procedure, e.g., based on 3GPP TS 23.502, Clause 4.3.4 (see block 309). During PDU Session release the SMF 205 further enables the UUAA revocation with the UE 201 (i.e., the UAV) using the PDU Session release procedure. Here, the SMF 205 sends a CAA-Level UAV ID along with the UUAA Revocation indication to the UE 201 (i.e., UAV) in the PDU Session release command, where step 5 is skipped, and step 6 is performed. Further, the SMF 205 may delete the locally stored UAV-related information (i.e., UUAA related authorization data/UUAA Context).

At Step 5, the AMF 203 further enables the UUAA revocation with the UE 201 (i.e., the UAV) using the UE Configuration Update procedure (see messaging 311). Here, the AMF 203 sends a CAA-Level UAV ID along with the UUAA Revocation indication to the UE 201 (i.e., UAV) in the UE Configuration Update command. Alternatively, based on network policy the AMF 203 may start network initiated de-registration process by sending a CAA-Level UAV ID along with the UUAA Revocation indication to the UE 201 (i.e., UAV) in a de-registration request message.

At Step 6, upon receiving the UUAA Revocation indication, the UE 201 (i.e., UAV) deletes all the UAS authorization (i.e., UUAA related authorization data) and security information locally stored corresponding to its CAA-Level UAV ID (see block 313).

Continuing on FIG. 3B, at Step 7, the UE 201 (i.e., UAV) further sends a UE Configuration update complete message to the AMF 203 (see messaging 315). Here, the UE Configuration update complete message contains a UUAA Revocation acknowledgement along with the CAA-Level UAV ID. Alternatively, if the UE 201 (i.e., UAV) received UUAA Revocation indication in a registration request message then the UE 201 (i.e., UAV) sends to the AMF 203 a deregistration accept message which contains a UUAA Revocation acknowledgement along with the CAA-Level UAV ID. Alternatively, if the UE 201 (i.e., UAV) received UUAA Revocation indication in a PDU Session release command then the UE 201 (i.e., UAV) sends to the SMF 205 a PDU Session release Acknowledgment message which contains a UUAA Revocation acknowledgement along with the CAA-Level UAV ID.

At Step 8, upon receiving the UUAA Revocation acknowledgement and the CAA-Level UAV ID, the AMF 203 deletes locally stored UAS authorization and security information corresponding to the CAA-Level UAV ID (see block 317). While FIG. 3B depicts the AMF 203 deleting the locally stored UAV-related information after receiving the UUAA Revocation acknowledgement message, in other embodiments the AMF 203 may delete the locally stored UAV-related information soon after sending the UUAA Revocation indication in Step 5. Alternatively, the locally stored UAV-related information may be deleted after sending an UUAA Revocation acknowledgement to the UAS-NF 209 (i.e., see Step 9). Alternatively, upon receiving the UUAA Revocation acknowledgement and the CAA-Level UAV ID, the SMF 205 considers the UUAA revocation as successful, where step 9 can be skipped.

At Step 9, the AMF 203 further sends an UUAA Revocation acknowledgement message with a Success Indication, the GPSI and the CAA-Level UAV ID to the UAS-NF 209 (see messaging 319). Upon receiving the UUAA Revocation acknowledgement, the UAS-NF 209 removes UAV-related information (if any) (i.e., if UUAA related authorization data has not been deleted at step 3) locally stored related to the CAA-Level UAV ID.

At Step 10, the UAS-NF 209 further sends the received UUAA Revocation acknowledgement message with the received Success Indication, the GPSI and the CAA-Level UAV ID to the USS/UTM server 211 (see messaging 321). Alternatively, step 10 and 11 can be performed soon after step 3.

At Step 11, upon receiving the UUAA Revocation acknowledgement message containing the Success Indication, the GPSI and the CAA-Level UAV ID, the USS/UTM server 211 updates the UAS authentication status and related information locally stored for the UAV (i.e., UE 201) (see messaging 323). The procedure 300 ends.

Figure 4A:
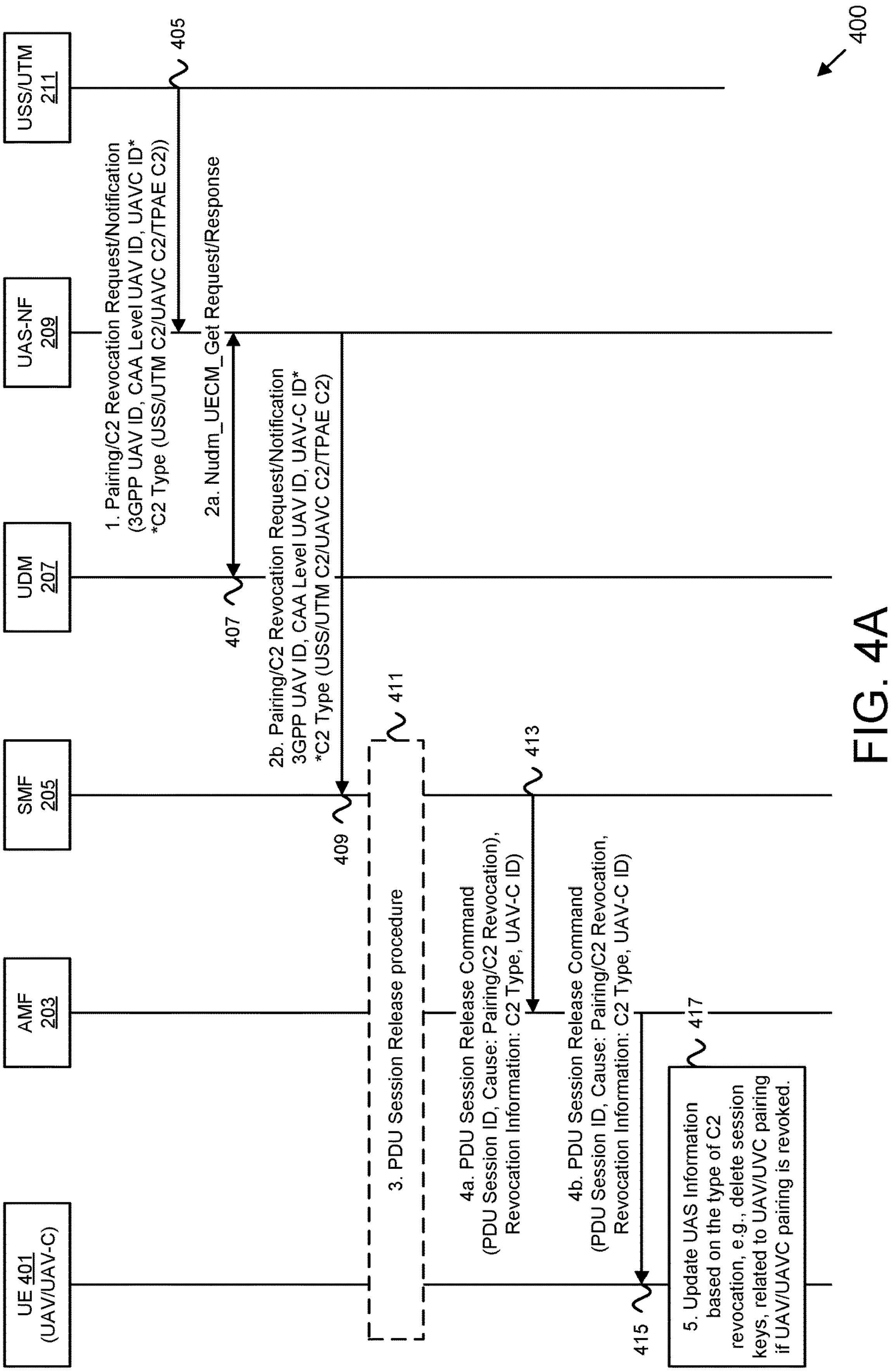
FIG. 4A illustrates one embodiment of a procedure for UAV and UAV-C pairing revocation-based authorization and session security information deletion.
Figure 4B:
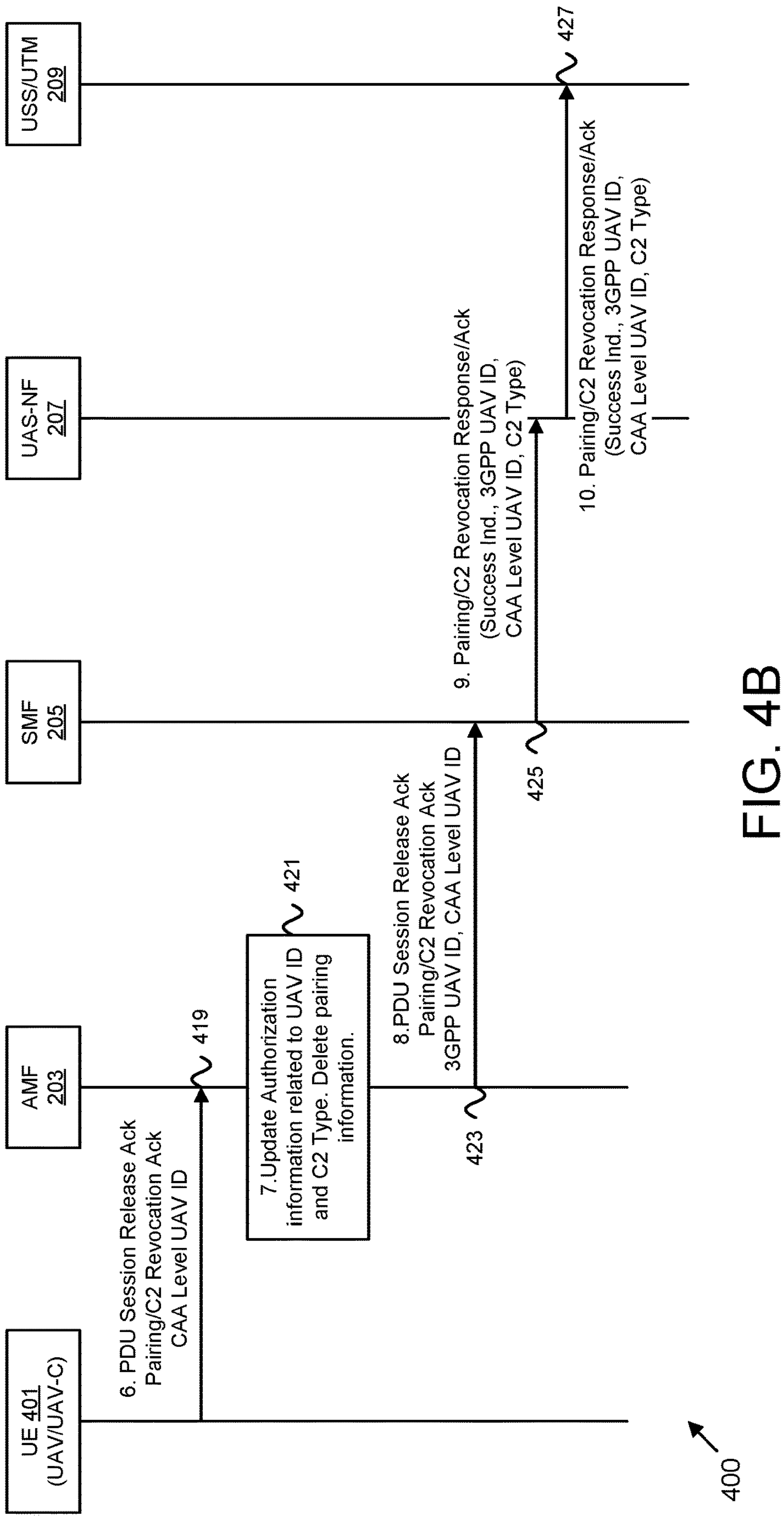
FIG. 4B is a continuation of the procedure of FIG. 4A.

FIGS. 4A-4B depict a procedure 400 for UAV and UAV-C pairing revocation-based authorization and session security information deletion at a UE 401 (i.e., a UAV and/or UAV-C), the AMF 203, the SMF 205, and the UAS-NF 209. The procedure 400 involves a UE 401 (e.g., which may be an embodiment of the remote unit 105, the UAV 106 and/or UAV-C 108), the AMF 203, the SMF 205, the UDM 207, the UAS-NF 209, and the USS/UTM server 211. Note that the UAS-NF depicted in FIGS. 4A-4B is a 3GPP NF, such as a UFES/NEF/UAS-NF/any NF in the 3GPP network which handles the UAV/UAV-C related UAS operational message exchange with the corresponding USS/UTM on behalf of the 3GPP network. In certain embodiments, the UAS-NF 209 may be replaced with another 3GPP NF which handles the UAV/UAV-C related UAS operational message exchange with the corresponding USS/UTM on behalf of the 3GPP network, such as a UFES, the NEF, or another suitable NF in the 3GPP network. The steps of the procedure 400 are as follows.

Beginning on FIG. 4A, at Step 1, when the USS/UTM server 211 determines to revoke UAV/UAV-C pairing (also known as C2 pairing or C2 association), then the USS/UTM server 211 sends a Pairing Revocation Request to the UAS-NF 209 (see messaging 405). Alternatively, the USS/UTM server 211 may send a Pairing Revocation Notification, e.g., when the UAS-NF 209 is subscribed with the USS/UTM server 211 to receive notifications relating to UAS pairing. Alternatively, when the USS/UTM server 211 determines to revoke any C2 connection for a UAV, the USS/UTM server 211 sends a C2 Revocation Request (or Notification) to the 3GPP NF with 3GPP UAV ID (e.g., a GPSI), and Revocation C2 Type indicating either 'USS/UTM C2' or 'UAV-UAVC C2' or 'TPAE C2'.

To better illustrate the possible messages within the scope of the procedure 400, FIG. 4A denote the message as "Pairing/C2 Revocation Request/Notification." Such message may be, for example, a Pairing Revocation Request message, a Pairing Revocation Notification message, C2 Revocation Request message, or a C2 Revocation Notification message. In the depicted embodiments, the Pairing/C2 Revocation Request/Notification message contains a 3GPP UAV ID (e.g., a GPSI), CAA-Level UAV ID and UAV-C ID (or UAV-C address).

At Step 2*a*, the UAS-NF 209 sends a Nudm_UECM_Get Request message to the UDM 207, where the Nudm_UECM_Get Request message contains a 3GPP UAV ID (e.g., GPSI/SUPI), NF type as 'SMF,' and receives the serving SMF information corresponding to the SUPI (or other 3GPP UAV ID) from the UDM 207 in a Nudm_UECM_Get response message (see messaging 407). Here, it is assumed that the UDM 207 identifies the SMF 205 as the serving SMF.

At Step 2*b*, the UAS-NF 209 sends the received Pairing/C2 Revocation Request/Notification message to the serving SMF 205 (see messaging 409). Here, the Pairing/C2 Revocation Request/Notification message contains one or more of the 3GPP UAV ID, the UAV-C ID, the SUPI, the CAA-Level UAV ID, and combinations thereof.

Alternatively, the UAS-NF 209 sends a received C2 Revocation Request/Notification to the SMF 205, where the C2 Revocation Request/Notification contains the 3GPP UAV ID (e.g., a GPSI), and a Revocation C2 Type indicating either 'USS/UTM C2' or 'UAV-UAVC C2' or 'TPAE C2'. The Revocation C2 Type can be of the format (Target C2 Type, Value) which can contain information, for example, 'Revocation C2 Type: (USS/UTM C2, USS/UTM address/ID) or (UAVC C2, UAVC address/ID) or (TPAE C2, TPAE address/ID)'. Further, the UAS-NF 209 sends a Pairing Revocation Response/Ack message to the USS/UTM server 211. In one embodiment, the UAS-NF 209 sends the Pairing Revocation Response/Ack message soon after receiving the Pairing/C2 Revocation Request/Notification message. In another embodiment, the UAS-NF 209 waits to send the Pairing Revocation Response/Ack message until after receiving a response from the SMF 205.

At Step 3, upon receiving the Pairing/C2 Revocation Request/Notification, the SMF 205 checks if there is any active PDU Session corresponding to the indicated SUPI for its 3GPP UAV ID/CAA-Level UAV ID with a UAV-C ID. If there is any active PDU Session, the SMF 205 performs PDU Session release procedure for the associated PDU Session IDs (see block 411), e.g., using the existing procedure in 3GPP TS 23.502, Clause 4.3.4.3, with the following new adaptations.

Alternatively, upon receiving the C2 Revocation Request/Notification message with Revocation C2 Type, the SMF 205 checks if there is any active PDU Session corresponding to the indicated Revocation C2 Type for the corresponding 3GPP UAV ID/CAA-Level UAV ID. If there is any active PDU Session, the SMF performs PDU Session release procedure for the associated PDU Session IDs using the existing procedure in TS 23.502 Clause 4.3.4.3 with the following new adaptations. Alternatively, the SMF 205 may delete locally stored pairing information (such as pairing authorization information and paired UAV and UAV-C IDs)—if available—for the UE 401 (i.e., UAV/UAV-C) corresponding to its CAA-Level UAV ID and updates the UAV pairing status information accordingly (e.g., Pairing Status can be changed from 'Pairing Authorized' to 'Pairing Authorization Required/Pairing Not Authorized').

At Step 4*a*, the SMF 205 sends a PDU Session Release command to the AMF 203 including the PDU Session ID and (as new adaptations) a Cause as 'Pairing/C2 Revocation' and 2-tuple Revocation information as 'CAA-Level UAV ID, UAV-C ID' (see messaging 413). Alternatively, the SMF 205 sends a PDU Session Release command to the AMF 203 including the PDU Session ID and (as new adaptations) the cause value as 'Pairing/C2 Revocation', and the Revocation information which indicates the C2 Type (as 'USS/UTM C2' or 'UAV-UAVC C2' or 'TPAE C2').

Note that a Revocation information received from the USS/UTM server 211 can be a revocation C2 Type of the format (Target C2 Type, Value) which can contain information for example, 'Revocation C2 Type: (USS/UTM C2, USS/UTM address) or (UAVC C2, UAVC address) or (TPAE C2, TPAE address)'.

At Step 4*b*, the AMF 203 forwards the PDU Session Release command to the UE 401 (i.e., the UAV and/or UAV-C) including the PDU Session ID and (as new adaptations) the Cause as 'Pairing/C2 Revocation' and 2-tuple Revocation information as 'CAA-Level UAV ID, UAV-C ID' (see messaging 415). Alternatively, in the case where the cause value is 'C2 Revocation', the Revocation information indicates the C2 Type ('USS/UTM C2' or 'UAV-UAVC C2' or 'TPAE C2').

At Step 5, upon receiving the PDU Session Release command with Cause as 'Pairing Revocation', the UE 401 (i.e., UAV/UAV-C) deletes the locally stored pairing authorization information (token, lifetime, identifiers, or any related information) and associated session security information for the UAV and UAV-C pairing indicated in the revocation information (see block 417).

Alternatively, upon receiving the PDU Session Release command with Cause as 'C2 Revocation', the UE 401 (i.e., UAV/UAV-C) deletes the locally stored C2 authorization information (token, lifetime, identifiers, or any related information) and associated session security information for the corresponding revocation type indicated in the revocation information.

Continuing on FIG. 4B, at Step 6, the UE 401 (i.e., UAV/UAV-C) sends a PDU Session Release acknowledgement message to the AMF 203 by including the Pairing Revocation Ack indication and CAA-Level UAV ID (see messaging 419). Alternatively, the UE 401 (i.e., UAV/UAV-C) sends a PDU Session Release acknowledgement message to the AMF 203 by including the C2 Revocation Ack indication, C2 Type and CAA-Level UAV ID.

At Step 7, upon receiving the Pairing Revocation Ack indication, the AMF 203 deletes locally stored pairing information (such as pairing authorization information and paired UAV and UAV-C IDs)—if available—for the UE 401 (i.e., UAV/UAV-C) corresponding to its CAA-Level UAV ID and updates the UAV pairing status information accordingly (e.g., Pairing Status can be changed from 'Pairing Authorized' to 'Pairing Authorization Required/Pairing Not Authorized') (see messaging 421).

Alternatively, upon receiving the C2 Revocation Ack indication, the AMF 203 deletes locally stored C2 authorization information corresponding to the C2 revocation type for the UAV related to its CAA-Level UAV ID and updates the C2 authorization status information accordingly (e.g., change 'USS/UTM C2' or 'UAV-UAVC C2' or 'TPAE C2' status from 'C2 Authorized' to 'C2 Authorization Required/C2 Not Authorized').

At Step 8, the AMF 203 further sends a PDU Session Release Acknowledgement message to the SMF 205 with the 3GPP UAV ID, received Pairing Revocation Acknowledgement indication/Success Indication and CAA-Level UAV ID (see messaging 423). Alternatively, the AMF 203 sends a PDU Session Release Acknowledgement message to the SMF 205 with the 3GPP UAV ID, received C2 Revocation Ack indication/Success Indication, C2 Type and CAA-Level UAV ID.

At Step 9, upon receiving the Pairing Revocation Ack indication, the SMF 205 deletes locally stored pairing information (such as pairing authorization information and paired UAV and UAV-C IDs)—if available (i.e., if not deleted at step 3 earlier)—for the UE 401 (i.e., UAV/UAV-C) corresponding to its CAA-Level UAV ID and updates the UAV pairing status information accordingly (e.g., Pairing Status can be changed from 'Pairing Authorized' to 'Pairing Authorization Required/Pairing Not Authorized'). Additionally, the SMF 205 sends a Pairing Revocation Response/Ack to the UAS-NF 209 with the received 3GPP UAV ID, Success Indication, and CAA-Level UAV ID (see messaging 425).

Alternatively, the SMF on receiving the C2 Revocation Ack indication deletes locally stored C2 authorization information corresponding to the C2 revocation type for the UAV related to its CAA-Level UAV ID and updates the C2 authorization status information accordingly (e.g., change 'USS/UTM C2' or 'UAV-UAVC C2' or 'TPAE C2' status from 'C2 Authorized' to 'C2 Authorization Required/C2 Not Authorized'). The SMF further sends a C2 Revocation Response/Acknowledgement to the 3GPP NF with the 3GPP UAV ID, Success Indication, received C2 Type and CAA-Level UAV ID.

To better illustrate the possible messages within the scope of the procedure 400, FIG. 4A denote the message as "Pairing/C2 Revocation Response/Ack." Such message may be, for example, a Pairing Revocation Response message, a Pairing Revocation Acknowledgement message, C2 Revocation Response message, or a C2 Revocation Acknowledgement message.

At Step 10, the UAS-NF 209 forwards the received Pairing Revocation Response/Ack message to the USS/UTM server 211 with the received Success Indication, 3GPP UAV ID and CAA-Level UAV ID (see messaging 427). Additionally, the UAS-NF 209 deletes pairing authorization information if any stored locally for the corresponding UAV ID. Alternatively, the UAS-NF forwards the received C2 Revocation Response/Ack message to the USS/UTM server 211 with the received Success Indication, C2 Type, 3GPP UAV ID and CAA-Level UAV ID. Alternatively, step 10 is skipped if the UAS-NF 209 sends Pairing Revocation Response/Ack message to the USS/UTM server 211 already during step 2*b*. The procedure 400 ends.

Applicability to EPS: The UAS/C2 Pairing Revocation procedure 400 shown in FIGS. 4A-4B and described in this section can be applicable to EPS, with the adaptation of MME instead of the AMF 203, using an SGW+PGW-C instead of the SMF 205, and using an HSS/AuC instead of the UDM 207. In the EPS deployment, the UAS-NF 209 may be replaced with another 3GPP NF/UFES which can perform the role of the UAS-NF 209 or as a UAS control function in the 3GPP network. The 3GPP NF/UFES may be a standalone network function, or may be a service offered by the SCEF+NEF in the EPS instead of NEF in the 5GS.

The second solution has primary focus on two key aspects such as (i) USS/UTM initiated authorization/re-authorization and (ii) provisioning of 3GPP NF routing information (e.g., UFES routing info) by the 3GPP NF to the USS/UTM during an UAS authentication/authorization (UAS AA/UAA/UUAA) procedure to facilitate the USS/UTM to reach the appropriate 3GPP NF handling (or holding UAV/UAV-C related UAS information) a UAV/UAV-C during re-authorization or for any USS/UTM initiated procedures, such as UUAA revocation, pairing authorization revocation, paring authorization update etc.

Figure 5A:
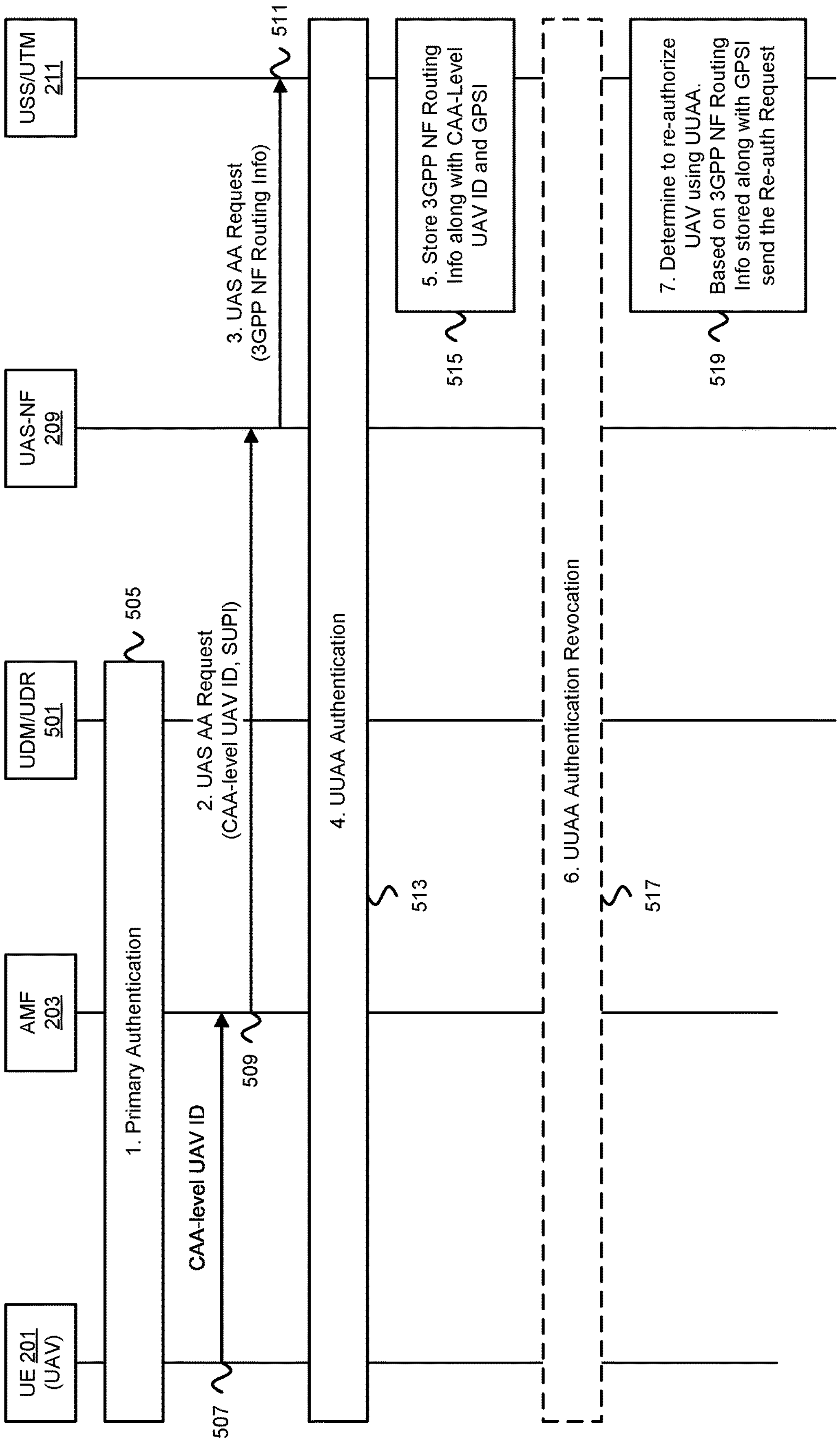
FIG. 5A illustrates one embodiment of a procedure for UAS Re-Authentication and Authorization/Pairing Re-authorization.
Figure 5B:
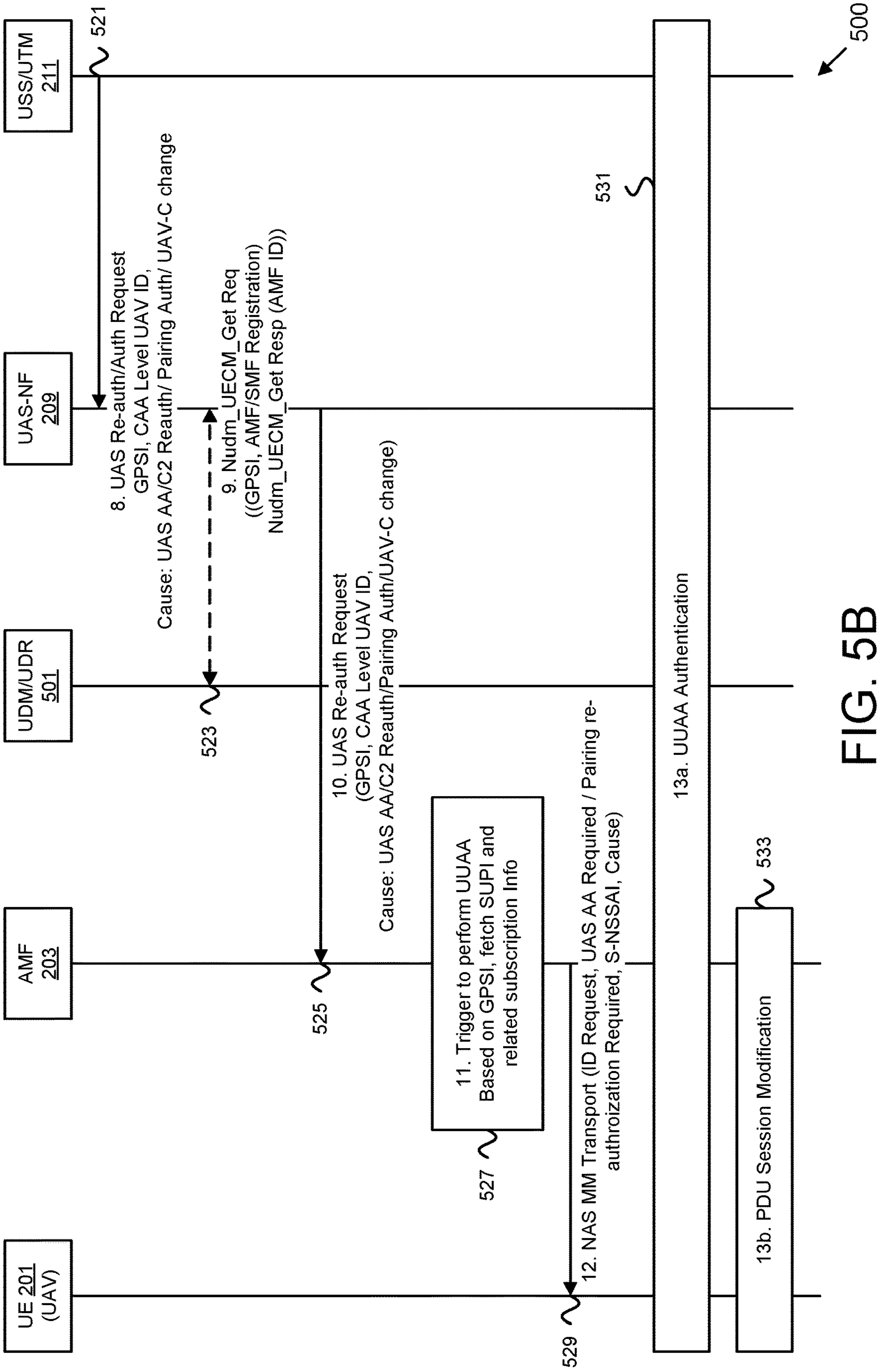
FIG. 5B is a continuation of the procedure of FIG. 5A.

FIGS. 5A-5B depict a procedure 500 for the provisioning of 3GPP Routing information by the UAS-NF to the USS/UTM during a UUAA procedure, according to embodiments of the second solution. The procedure 500 can be used by the USS/UTM to send UAV/UAV-C related UAS Re-authentication and authorization or pairing authorization (or reauthorization/revocation) requests at a later period of time. The procedure 500 involves the UE 201 (e.g., embodied in a UAV), the AMF 203, a UDM/UDR 501 (e.g., which may be an embodiment of the UDM/UDR 149), the UAS-NF 209, and the USS/UTM server 211. In certain embodiments, the UAS-NF 209 may be replaced with another 3GPP NF which handles the UAV/UAV-C related UAS operational message exchange with the corresponding USS/UTM on behalf of the 3GPP network, such as a UFES, the NEF, or another suitable NF in the 3GPP network. The steps involved in the procedure 500 are described as follows.

Beginning on FIG. 5A, at Step 1, the UE 201 (i.e., UAV) performs primary authentication with the 3GPP 5G network (see block 505). Following a successful primary authentication, the UE 201 (i.e., UAV) is requested to provide its UAV ID to initiate a UAA (i.e., UUAA) and the UAV provides its CAA-Level UAV ID (see messaging 507).

At Step 2, following a successful primary authentication, the AMF 203 provides the CAA-Level UAV ID to the UDM 207 and fetches the UE's subscription information (e.g., UE/UAV Aerial subscription) and a 3GPP UAV ID associated with a SUPI (see messaging 509). Further, based on the UE subscription information, the AMF 203 sends a UAS AA Request to the UAS-NF 209, where the UAS AA Request contains the SUPI, 3GPP UAV ID (i.e., GPSI) and the CAA-Level UAV ID, along with other information.

Alternatively, the UE 201 sends a PDU session establishment request to an SMF (via the AMF) after a successful primary authentication with the aviation payload and so the SMF sends the above UAS AA Request to the UAS-NF 209, e.g., including the SUPI, the 3GPP UAV ID and the CAA-Level UAV ID, along with other information. Alternatively, the UAS AA Request show in Step 2 may also include an AMF ID and/or SMF ID.

At Step 3, the UAS-NF 209 stores the received SUPI along with the received CAA-Level UAV ID and the 3GPP UAV ID. Further the UAS-NF 209 sends a UAS AA Request (i.e., UUAA request) to the USS/UTM server 211 (see messaging 511) by including the 3GPP NF Routing Information (i.e., a UFES/UAS-NF routing information, such as a Fully Qualified Domain Name ("FQDN") or IP address or an ID of the UFES/UAS-NF which uniquely identifies the 3GPP NF located in the 3GPP network that handles the UAV/UAV-C related messages exchanges (i.e., messages related to UUAA, pairing, etc.) with the corresponding external USS/UTM).

Alternatively, if the UAS-NF 209 does not receive 3GPP UAV ID, it fetches the 3GPP UAV ID/GPSI from the UDM/UDR 503 by providing the SUPI. The UAS-NF 209 may construct a 3GPP UAV ID by using the GPSI and the 3GPP NF Address/routing information. Alternatively, the UAS-NF 209 stores the received AMF ID/SMF ID.

At Step 4, the USS/UTM server 211 performs UUAA with the UE 201 (i.e., UAV) and UAV-C (see block 513). After a successful UUAA procedure, the UE 201 (i.e., UAV) and the USS/UTM server 211 establish a connection over the 3GPP network.

At Step 5, the USS/UTM server 211 locally stores the CAA-Level UAV ID and the 3GPP UAV ID (e.g., GPSI) along with the corresponding 3GPP NF Routing information received in the step 3 (see block 515).

At Step 6, the USS/UTM server 211 may optionally perform any UAA revocation or pairing authorization and revocation when required (see block 517).

At Step 7, if the USS/UTM server 211 determines to perform re-authentication and re-authorization of the UE 201 (i.e., UAV) or pairing re-authorization for the UAV/UAV-C pair, then the USS/UTM server 211 may use the locally stored 3GPP NF routing information corresponding to the CAA-Level UAV ID and/or the 3GPP UAV ID to send the re-authentication (i.e., re-UUAA) or pairing re-authorization/authorization requests (alternatively, UUAA revocation or pairing revocation requests) to the appropriate UAS-NF 209 handling the UE 201 (i.e., UAV) (see block 519).

Continuing on FIG. 5B, at Step 8, the USS/UTM server 211 sends the UAS Re-auth/auth Request (i.e., UUAA Re-auth Request) to the UAS-NF 209 (identified with the locally stored 3GPP NF Routing information) by including the 3GPP UAV ID (i.e., GPSI), the CAA-Level UAV ID, and a Cause indicating 'UAS AA/C2 Re-auth or Pairing Re-authorization/authorization or UAV-C Change' (see messaging 521).

At conditional Step 9, upon receiving the UAS Re-auth/auth Request, the UAS-NF 209 uses the locally stored serving AMF Identification and/or serving SMF Identification corresponding to the CAA-Level UAV ID and/or to the 3GPP UAV ID to forward the UAS Re-auth Request to the serving AMF 203 (and/or serving SMF) (i.e., the UAS-NF 209 retrieves the UE/UUAA context corresponding to the CAA-Level UAV ID and/or to the 3GPP UAV ID). If the UAS-NF 209 has no serving AMF/SMF information locally stored for a UE 201 (i.e., UAV), then the Nudm_UECM_Get Request/Response service operation may be used to fetch the serving AMF/SMF information for the UE 201 (i.e., UAV) (see messaging 523).

At Step 10, the UAS-NF 209 sends the received UAS Re-auth/auth Request to the serving AMF 203 (and/or serving SMF) along with the 3GPP UAV ID, CAA-Level UAV ID, and Cause Value with 'UAS AA/C2 Re-auth or Pairing Re-authorization/authorization or UAV-C Change' (see messaging 525). Alternatively, the UAS Re-auth Request can also contains re-authorization data and, in the case of pairing re-authorization, the UAS Re-auth Request can also contain the target pairing ID (e.g., new UAV-C information and/or Third Party Authorized Entity ("TPAE") information, etc.). Alternatively, for the case of pairing re-authorization, the message name can be 'pairing re-authorization' or 'pairing update request.'

At Step 11, upon receiving the UAS Re-auth/auth Request, the AMF 203 (and/or SMF) triggers to perform UUAA or pairing authorization (or reauthorization) (see block 527). Alternatively, the SMF sends the received UAS Re-auth/auth Request to the serving AMF 203 along with the 3GPP UAV ID, CAA-Level UAV ID, re-authorization data, and Cause Value with 'UAS AA/C2 Re-auth or Pairing Re-authorization/authorization or UAV-C Change'.

Alternatively, the SMF initiates a PDU Session modification procedure by sending the received UAS Re-auth Request to the serving AMF 203 along with the 3GPP UAV ID, CAA-Level UAV ID, re-authorization data, and Cause Value with 'UAS AA/C2 Re-auth or Pairing Re-authorization/authorization or UAV-C Change'.

At Step 12, the AMF 203 sends a NAS MM Transport message to the UE 201 (i.e., UAV) and/or UAV-C by including the UAV ID request, UAS AA Required Indication, slice information and Cause Value indicating 'UAS AA/C2 Re-auth or Pairing Re-authorization/authorization or UAV-C Change' (see messaging 529).

Alternatively, the AMF 203 sends a PDU session modification message to the UE 201 (i.e., UAV) along with the Pairing-authorization (or Pairing-reauthorization) indication, received re-authorization data and Cause Value indicating 'UAS AA/C2 Re-auth or Pairing Re-authorization/authorization or UAV-C Change'.

At Step 13*a*, if an UAS AA Required Indication is received, the UE 201 (i.e., UAV) and/or UAV-C performs UUAA with the USS/UTM server 211 over the 3GPP network (see block 531). Alternatively, at Step 13*b* the UE 201 performs PDU Session modification (see block 533) if a Pairing-reauthorization indication is received along with re-authorization data and Cause Value indicating 'UAS AA/C2 Re-auth or Pairing Re-authorization or UAV-C Change'.

Alternatively, at Step 13*b*, if a Pairing-authorization indication is received along with authorization data and Cause Value indicating 'pairing/C2 authorization', then the UE 201 (i.e., UAV) updates the locally stored pairing authorization information with the new authorization (or re-authorization) information received and performs PDU Session establishment/modification. The procedure 500 ends. While FIGS. 5A-5B depict, and the above descriptions describe, a UE embodied in a UAV, the procedure 500 may also be implemented using a UE embodied in a UAV-C. In such embodiments, the various identities exchanged can be specific to a UAV-C.

Alternate option for the UAS-NF Discovery: The NEF (e.g., the NEF 146) can store the 3GPP UAV ID and the corresponding 3GPP NF routing Information (i.e., address of UAS-NF 209 or UFES, for example, a FQDN or IP address) after step 2. Later, in step 8, if the NEF receives any request message from the USS/UTM server 211 (for example, a Revocation or re-authorization request for any UAV/UAV-C) with a 3GPP UAV ID, then the NEF can fetch the 3GPP NF routing information stored locally for the corresponding 3GPP UAV ID and routes/sends the received request message to the corresponding UAS-NF 209 for it to process the UAS related request message for the UAV/UAV-C. Alternatively, the UAS-NF 209 can send the 3GPP NF routing Information to the USS/UTM server 211 in any UAV related message exchange.

Applicability to EPS: The Re-authorization procedure 500 shown in FIGS. 5A-5B and described in this section can be applicable to EPS, with the adaptation of using an MME instead of the AMF 203, using an SGW+PGW-C instead of a SMF, and using an HSS/AuC instead of the UDM 207. In the EPS deployment, the UAS-NF 209 may be replaced with another 3GPP NF/UFES which can perform the role of the UAS-NF 209 or as a UAS control function in the 3GPP network. The 3GPP NF/UFES may be a standalone network function, or may be a service offered by the SCEF+NEF in the EPS instead of NEF in the 5GS.

The third solution describes a control plane-based UAV/UAV-C Pairing/association Authorization method in subsection-A and a user plane-based UAV/UAV-C Pairing/association Authorization method in subsection-B. The third solution primarily focuses on:

a. Verification of pairing authorization status locally stored in 3GPP network by the AMF (or any 3GPP NF) before invoking an authorization request (i.e., a pairing authorization request) for an UAV/UAV-C with the USS/UTM.
b. Verification of pairing authorization status/information locally stored in 3GPP network by the SMF before establishing a PDU Session for the UAV/UAV-C (pairing based C2 communication) in response to the received PDU Session establishment request.
c. 3GPP NF (i.e., AMF and SMF) receiving a Session security information from USS/UTM (via a UAS-NF/NEF/UFES) after a successful pairing authorization and sending the received session security information to the UAV/UAV-C (in the PDU Session establishment accept message).

Applicability to EPS: The Pairing Authorization procedures shown in FIGS. 6A-6C and 7A-7C, and described in this section can be applicable to EPS, with the adaptation of using a MME instead of the AMF, using an SGW+PGW-C instead of the SMF, and using an HSS/AuC instead of the UDM/UDR. In the EPS deployment, the UAS-NF may be replaced with another 3GPP NF/UFES which can perform the role of the UAS-NF or as a UAS control function in the 3GPP network. The 3GPP NF/UFES may be a standalone network function, or may be a service offered by the SCEF+NEF in the EPS instead of NEF in the 5GS.

Figure 6A:
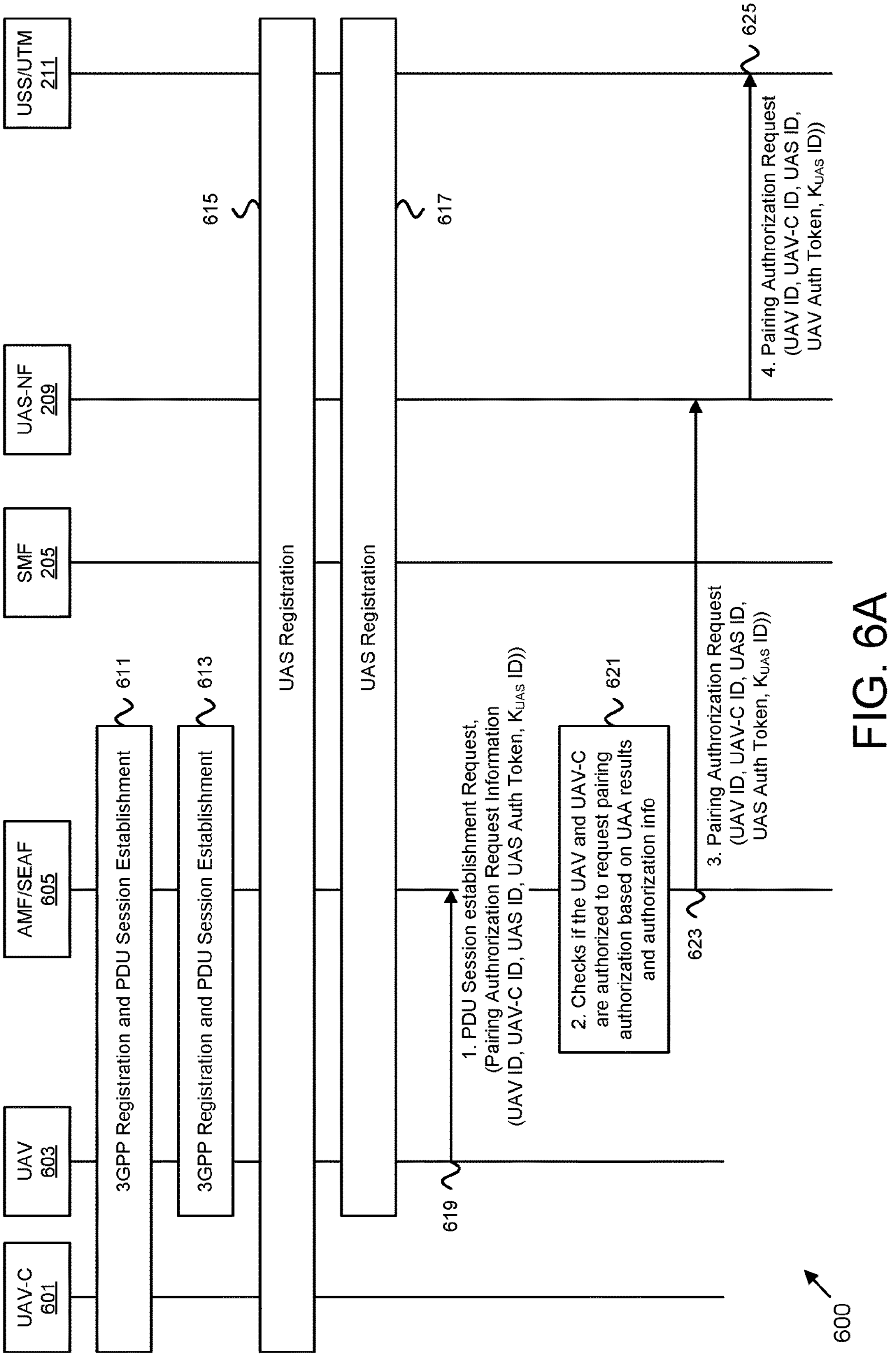
FIG. 6A illustrates one embodiment of a procedure for UAV and UAV-C Pairing/Association Authorization.
Figure 6B:
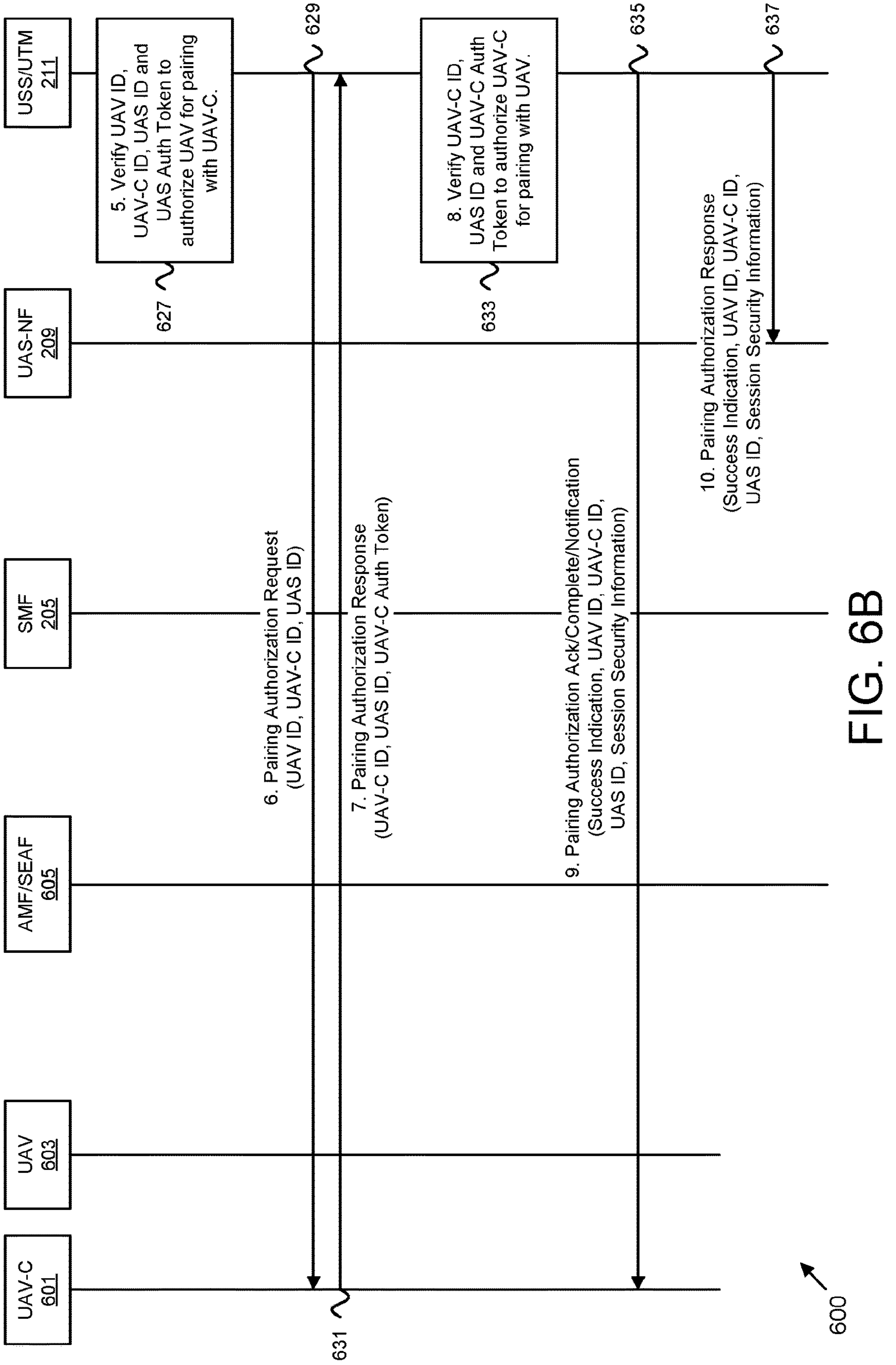
FIG. 6B is a continuation of the procedure of FIG. 6A.
Figure 6C:
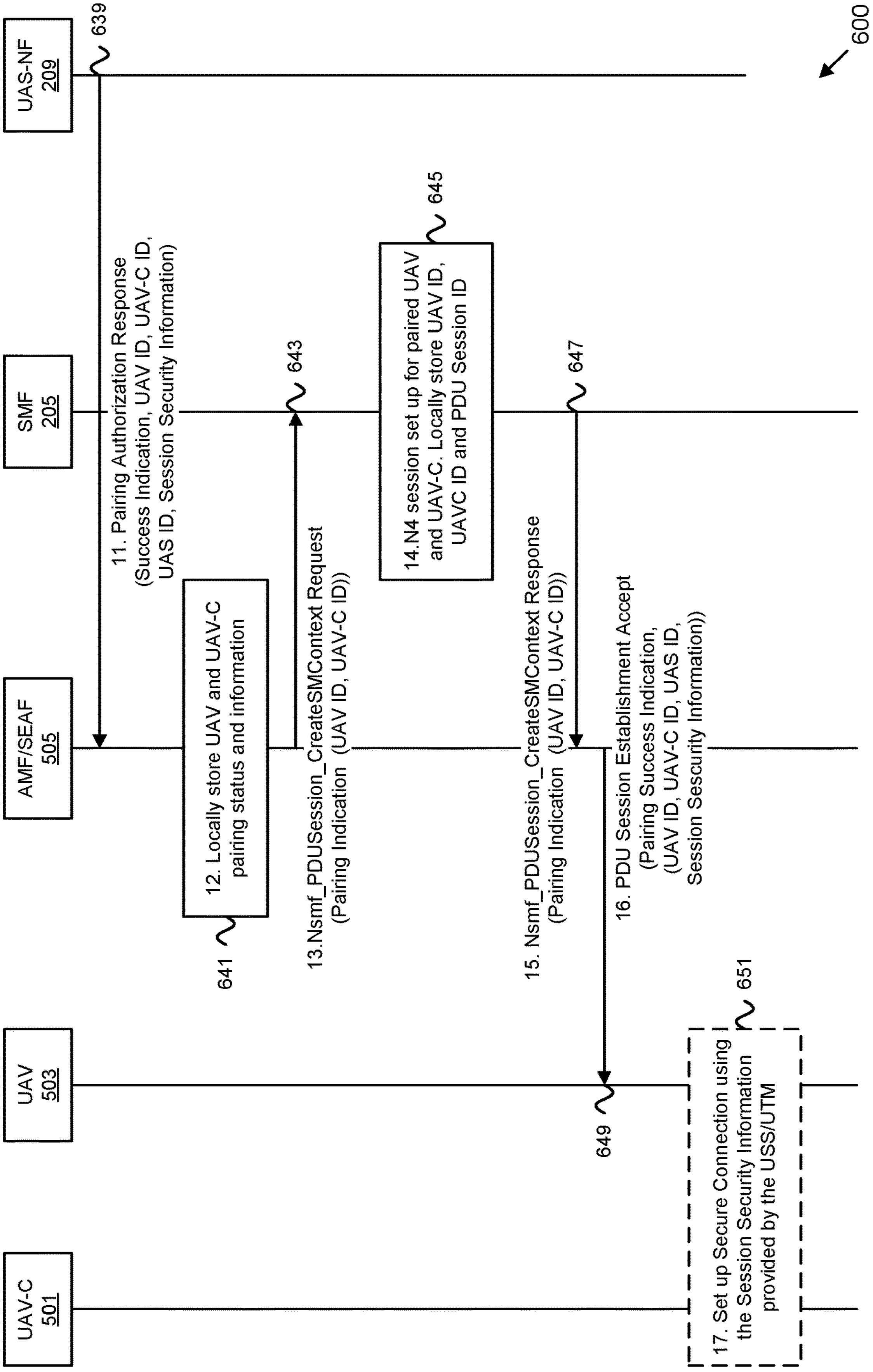
FIG. 6C is a continuation of the procedure of FIG. 6B.

FIG. 6A-6C depict a procedure 600 for UAV and UAV-C Pairing/Association authorization over control plane and related security set up, according to the third solution. As depicted, the procedure 600 involves a UAV-C 601 (i.e., an embodiment of the UAV-C 108 containing a UE), a UAV 603 (i.e., an embodiment of the UAV 106 containing a UE), an AMF and corresponding (e.g., co-located) Security Anchor Function ("SEAF") depicted as combined node "AMF/SEAF" 605, the SMF 205, the UAS-NF 209, and the USS/UTM server 211. In certain embodiments, the UAS-NF 209 may be replaced with another 3GPP NF which handles the UAV/UAV-C related UAS operational message exchange with the corresponding USS/UTM on behalf of the 3GPP network, such as a UFES, the NEF, or another suitable NF in the 3GPP network. The steps of the procedure 600 are described as follows:

Beginning on FIG. 6A, as a precondition, it is assumed that the UAV 603 and the UAV-C 601 are registered to the 3GPP network (see blocks 611 and 613) and that both the UAV 603 and the UAV-C 601 have successfully performed UAS Authentication and authorization with the USS/UTM server 211 (see blocks 615 and 617). While FIG. 6A illustrates the 3GPP registration and PDU session establishment of the UAV-C 601 occurring before the 3GPP registration and PDU session establishment of the UAV 603, the UAV 603 may register and/or establish a PDU session before the UAV-C 601—or both registrations and/or PDU Session establishments may occur concurrently/simultaneously. Similarly, while FIG. 6A illustrates the UAS Authentication and authorization of the UAV-C 601 occurring before the UAS Authentication and authorization of the UAV 603, the authorization/authentication of the UAV 603 may occur before authorization/authentication of the UAV-C 601—or UAS Authentication and authorization may occur concurrently/simultaneously for both devices. Alternatively, the UAV-C 601 may be connected to the USS/UTM server 211 over internet rather than the 3GPP network, as depicted.

At Step 1, the UAV 603 sends to the AMF/SEAF 605, a PDU Session establishment Request with Pairing Authorization Request Information (see messaging 619). Here, the Pairing Authorization Request Information includes a UAV ID, a Target UAV-C ID, a UAS ID, a UAV Authorization Token, and a UAS Security Information Identifier (i.e., the one received during the UAS authentication from the USS/UTM server 211 to uniquely identify the UAS security information established between the UAV 603 and the USS/UTM server 211).

Alternatively, in step 1, the UAV 603 also sends Pairing Required Indication. Note that throughout the descriptions of the third solution, the information sent as "Pairing authorization Request information" can be also sent as part of an UAV Operation Request/Payload. Similarly, throughout the descriptions of the third solution, the information sent as "Pairing authorization Response information" can be also sent as part of UAV Operation Response information and/or UAV Operation Accept message.

At Step 2, upon receiving the Pairing Required Indication, the AMF/SEAF 605 checks if the UAV-ID is authorized to request pairing authorization, e.g., based on the received Pairing authorization request information and locally stored UAS authentication and authorization results, authorization information (Token) and UAV-C ID (if available) (see block 621). If both the received Pairing authorization request information and locally stored information matches, then the AMF/SEAF 605 considers the check to be successful.

Alternatively, if the check is not successful (i.e., if the received Pairing authorization request information does not match the locally stored information), then the AMF/SEAF 605 sends failure message to the UAV 603, e.g., in a PDU Session establishment failure response.

At Step 3, the AMF/SEAF 605 sends a Pairing Authorization Request to the UAS-NF 209 (see messaging 623). Alternatively, the AMF/SEAF 605 forwards the received PDU Session establishment Request to the SMF 205 with Pairing Required Indication and Pairing Authorization Request Information. Here, the Pairing Authorization Request Information includes the UAV ID, the Target UAV-C ID, the UAS ID, the UAV Authorization Token, and the UAS Security Information Identifier (i.e., the one received during the UAS authentication from the USS/UTM server 211 to uniquely identify the UAS security information established between UAV 603 and the USS/UTM server 211).

Upon receiving the Pairing Required Indication, the SMF 205 checks if the UAV-ID is authorized to request pairing authorization, e.g., based on the received Pairing authorization request information and locally stored UAS authentication and authorization results, authorization information (Token) and UAV-C ID (if available). If the received Pairing authorization request information matches the locally stored information, then the SMF 205 considers the check to be successful. Further, the SMF 205 sends a Pairing Authorization Request to the UAS-NF 209 said Request containing the UAV ID, the Target UAV-C ID, the UAS ID, the UAV Authorization Token, a UAV IP address (i.e., set by the SMF for the PDU Session), and UAS Security Information Identifier.

Alternatively, if the check is not successful (i.e., if the received Pairing authorization request information does not match the locally stored information), then the SMF 205 sends failure message to the UAV 603 via AMF/SEAF 605, e.g., in a PDU Session establishment failure response.

At Step 4, the UAS-NF 209 sends the received Pairing Authorization Request to the USS/UTM server 211, said Request containing the UAV ID, the Target UAV-C ID, the UAS ID, the UAV Authorization Token, the UAV IP address, and the UAS Security Information Identifier (see messaging 625).

Continuing on FIG. 6B, at Step 5, the USS/UTM server 211 verifies the information received in the received Pairing Authorization Request with the locally stored information and if the verification is successful, the USS/UTM server 211 determines to perform pairing for the UAV 603 (see block 627). Alternatively, for the case of UAV-C 601 being a non-networked UAV-C (i.e., UAV-C connected to USS/UTM server 211 using a connection outside of 3GPP network, then steps 6-8 are skipped, and only step 9 is performed.

At Step 6, the USS/UTM server 211 sends to the UAV-C 601 identified with the UAV-C ID a Pairing Authorization Request (e.g., via the 3GPP network or over the internet), said Request containing the UAV ID, the UAV-C ID and the UAS ID (see messaging 629).

At Step 7, in response the UAV-C 601 sends a Pairing Authorization Response message to the USS/UTM server 211, said Response message containing the UAV-C ID, the UAS ID, the UAV-C IP address, and a UAV-C Authorization Token (see messaging 631).

At Step 8, the USS/UTM server 211 checks with the locally stored information to verify verifies the received information, such as the UAV-C ID, the UAS ID, and the UAV-C Authorization Token received in the Pairing Authorization Response message (see block 633). If the received authorization information matches with the locally stored information, then the USS/UTM server 211 considers the UAV-C pairing authorization to be successful.

At Step 9, the USS/UTM server 211 sends a Pairing Authorization Acknowledgement message (alternatively, a Pairing Authorization Complete or Pairing Authorization Notification message) to the UAV-C 601, said message containing the Pairing Success Indication, the UAV ID, the UAV-C ID, the UAS ID, the UAV IP address and the Session Security Information (i.e., a key material or token to set up session security) (see messaging 635).

At Step 10, the USS/UTM server 211 further sends a Pairing Authorization Response message (alternatively, a Pairing Authorization Accept message) to the UAS-NF 209 in response to receiving the Pairing Authorization Request message (e.g., in Step 4) (see messaging 637). The Pairing Authorization Response/Accept message contains the Pairing Success indication, the UAV ID, the UAV-C ID, the UAS ID, the UAV-C IP address and the Session Security Information (i.e., a key material or token to set up session security).

Continuing on FIG. 6C, at Step 11, the UAS-NF 209 sends the received Pairing Authorization Response/Accept message to the AMF/SEAF 605 (see messaging 639). Here, the Pairing Authorization Response/Accept message contains the Pairing Success indication, the UAV ID, the UAV-C ID, the UAS ID, the UAV-C IP address and the Session Security Information (i.e., a key material or token to set up session security).

Alternatively, the UAS-NF 209 sends the received Pairing Authorization Response/Accept message to the SMF 205. Again, the Pairing Authorization Response/Accept message contains the Pairing Success indication, the UAV ID, the UAV-C ID, the UAS ID, the UAV-C IP address and the Session Security Information (i.e., a key material or token to set up session security). In this alternate case, the procedure 600 is modified to skip steps 12-14 and to perform the below described alternate step for step 15.

At Step 12, the AMF/SEAF 605 locally stores the UAV ID and UAV-C ID along with the pairing authorization status and UAS ID in addition to the corresponding 3GPP UAV ID of the UAV 603 (see block 641).

At Step 13, the AMF/SEAF 605 sends to SMF 205 a Nsmf_PDUSession_CreateSMContext Request message which contains the Pairing Required Indication with the UAV ID and the UAV-C ID, along with the 'pairing authorization success' indication (see messaging 643). Additionally, this message can also include UAV-C IP address if received from the USS/UTM server 211.

At Step 14, the SMF 205 locally stores the UAV ID, UAV-C ID, pairing authorization status information, PDU Session ID and UAV IP address and UAV-C IP address performs N4 session set up for the paired UAV 603 and UAV-C 601 (see block 645).

At Step 15, the SMF 205 sends a Nsmf_PDUSession_CreateSMContext Response message to the AMF/SEAF 605 which contains Pairing authorization success indication and pairing indication with UAV ID and UAV-C ID (see messaging 647).

In the above mentioned alternative case, after step 11, upon receiving the Pairing Authorization Response/Pairing Authorization Accept message, the SMF 205 locally stores the UAV ID, the UAV-C ID, the pairing authorization status information, the PDU Session ID and the UAV IP address and the UAV-C IP address. Further the SMF 205 performs N4 session set up for the paired UAV 603 and UAV-C 601. Additionally, the SMF 205 sends the Nsmf_PDUSession-_CreateSMContext Response (alternatively, a PDU Session Establishment Response) to the AMF/SEAF 605 which contains the received Pairing authorization success indication, the Session Security Information, the UAS ID and the pairing indication along with the UAV ID and the UAV-C ID (see messaging 647).

At Step 16, the AMF/SEAF 605 sends a PDU Session Establishment Accept message to the UAV 603 over the N1 interface (see messaging 649). Here, the PDU Session Establishment Accept message includes the Pairing Authorization Success Indication, the UAV ID, the UAV-C ID, the UAS ID, and the Session Security Information.

At Step 17, the UAV 603 and the UAV-C 601 use the received session security information to set up a secure session between the UAV 603 and the UAV-C 601 for the C2 connection over the established PDU Session (see block 651). The procedure 600 ends.

Figure 7A:
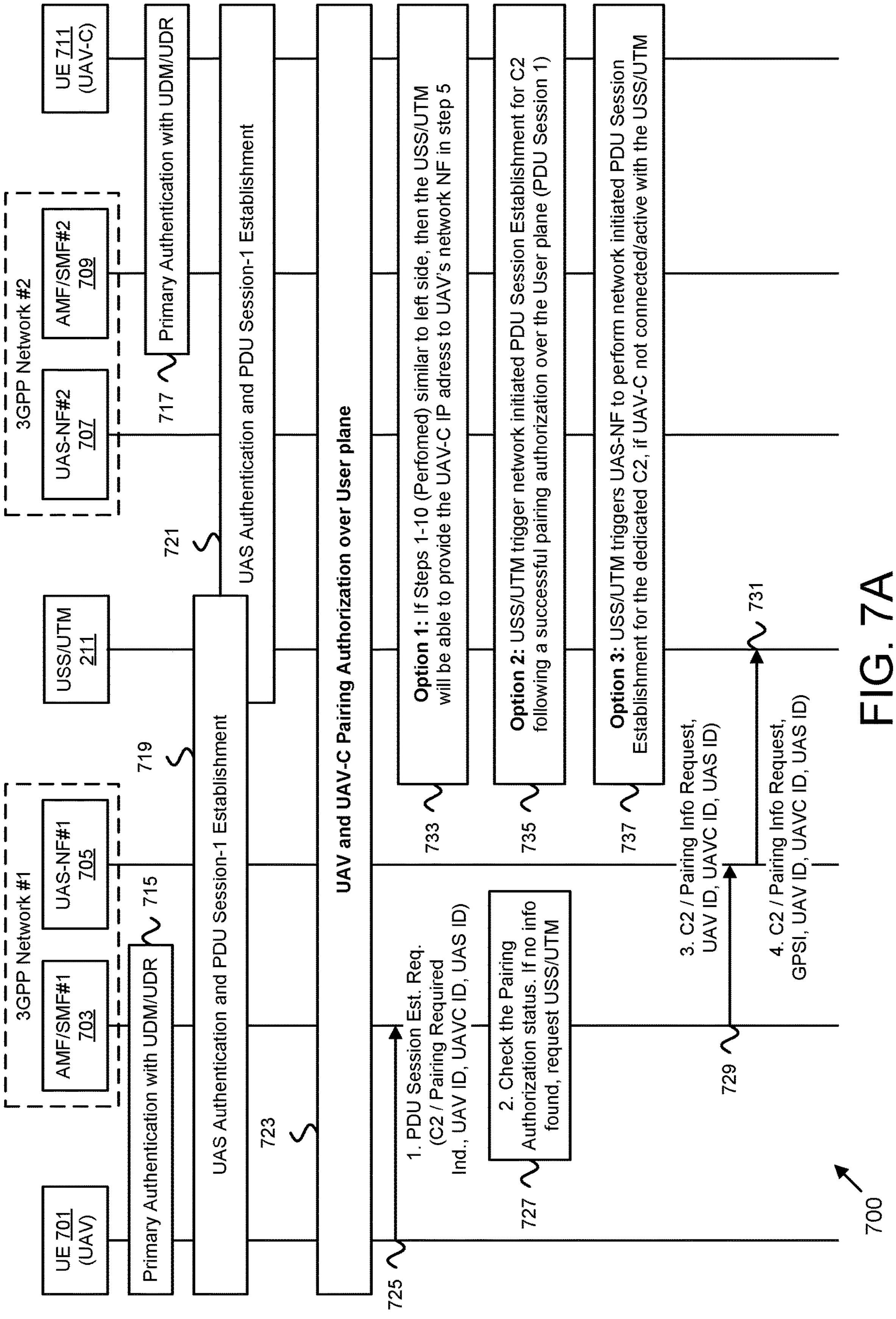
FIG. 7A illustrates one embodiment of a procedure for Command and Control ("C2") and/or UAS Pairing Authorization.
Figure 7B:
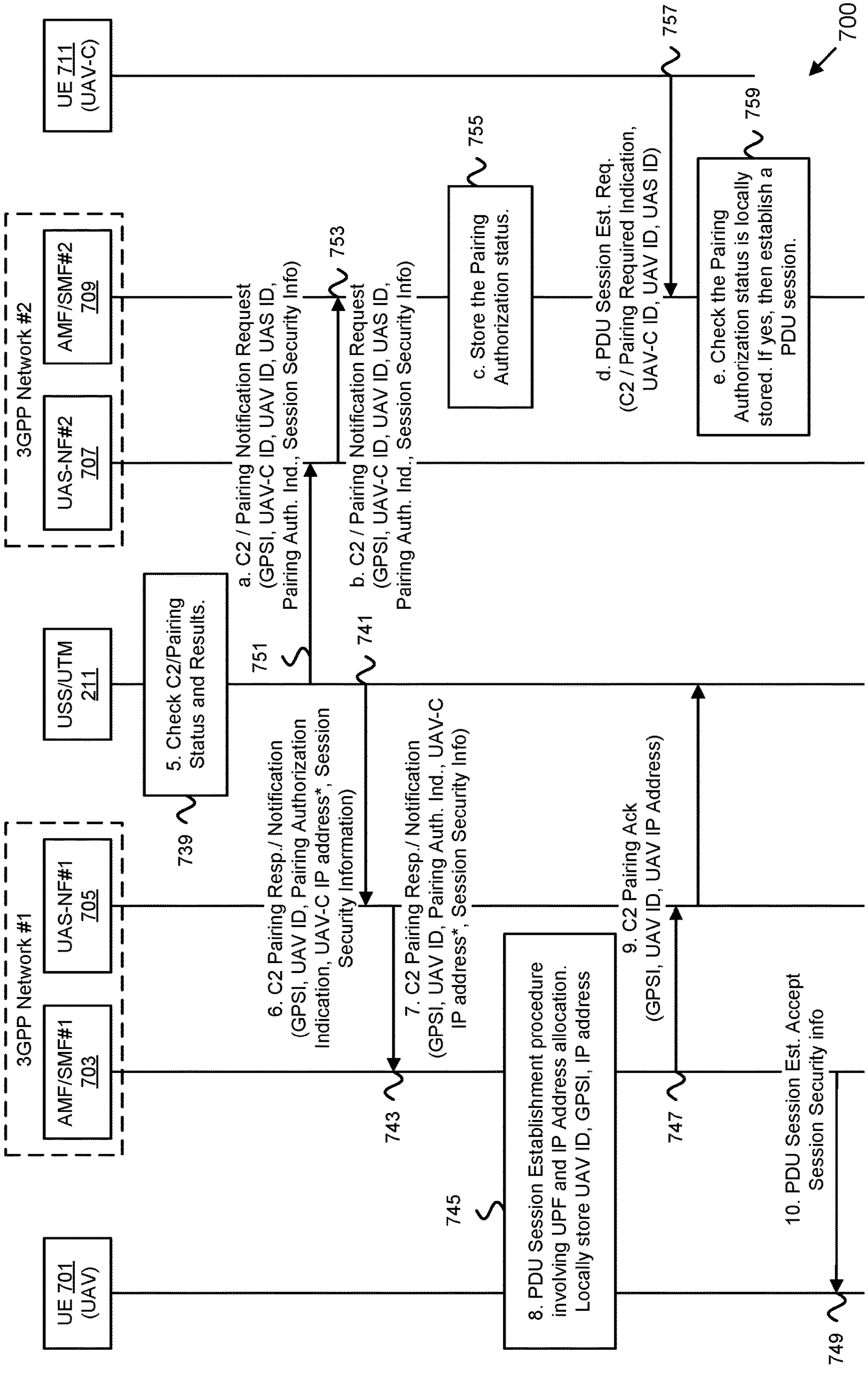
FIG. 7B is a continuation of the procedure of FIG. 7A.
Figure 7C:
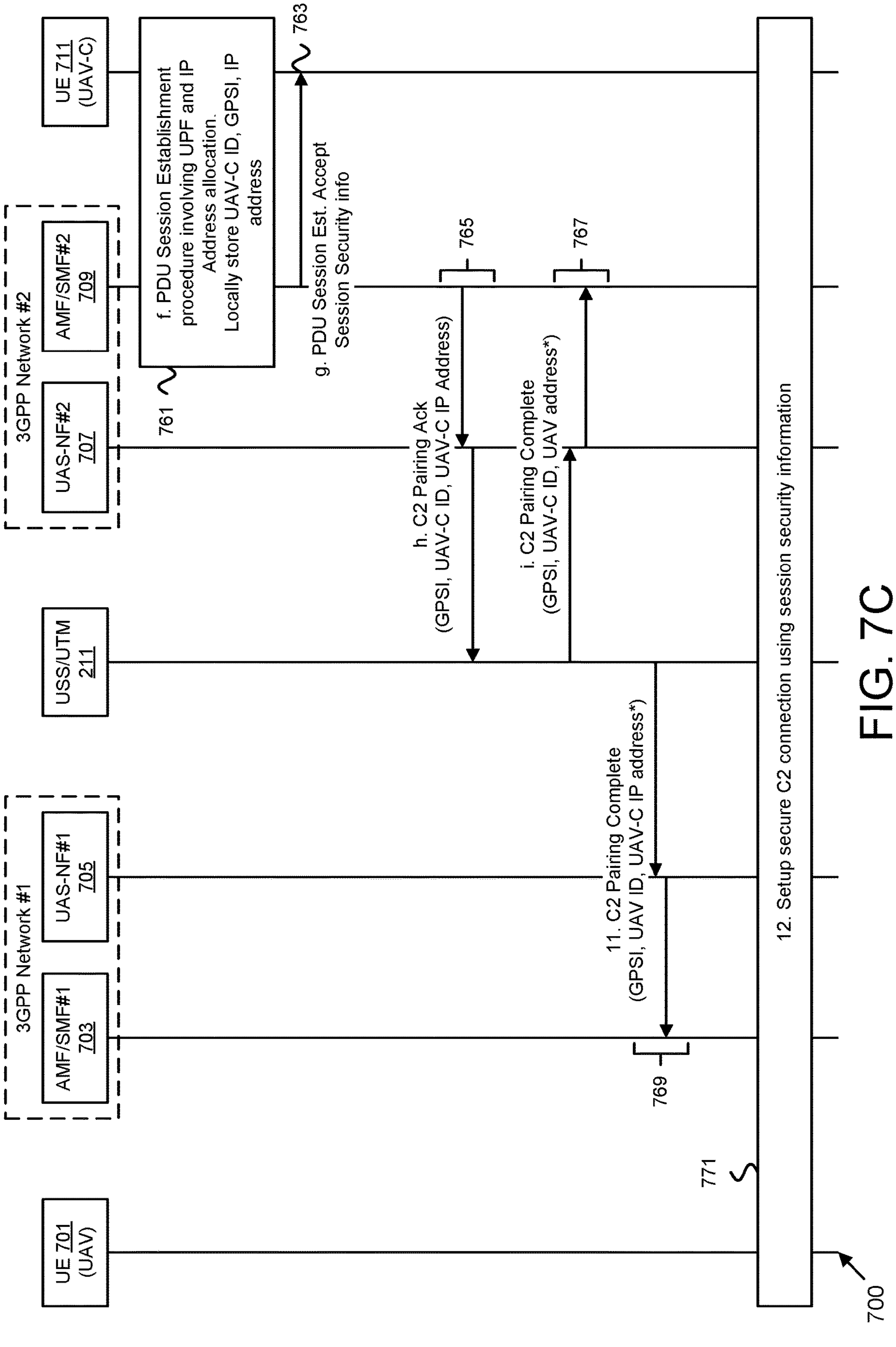
FIG. 7C is a continuation of the procedure of FIG. 7A.

FIG. 7A-7C depicts an exemplary procedure 700 for C2/Pairing Authorization over the user plane and result Notification by the USS/UTM, according to embodiments of the third solution. This section describes the UAV/UAV-C pairing authorization over user plane and describes the pairing authorization result provisioning to the 3GPP network by the USS/UTM via the UAS-NF.

As depicted, the procedure 700 involves a UE 701 (e.g., an embodiment of the remote unit 105 contained within a UAV 106), a UE 711 (e.g., an embodiment of the remote unit 105 contained within a UAV-C 108), a first AMF and/or SMF serving the UE 701 (depicted as combined node "AMF/SMF #1" 703), a first UAS-NF serving the UE 701 (depicted as "UAS-NF #1" 705), a second UAS-NF serving the UE 701 (depicted as "UAS-NF #2" 707), a second AMF and/or SMF serving the UE 711 (depicted as combined node "AMF/SMF #2" 709), and the USS/UTM server 211. In certain embodiments, the UAS-NFs 705 and 707 may be replaced with another 3GPP NF which handles the UAV/UAV-C related UAS operational message exchange with the corresponding USS/UTM on behalf of the 3GPP network, such as a UFES, the NEF, or another suitable NF in the 3GPP network.

While FIGS. 7A-7C depict the UAV as connecting to the USS/UTM server 211 via a separate 3GPP network than that used by the UAV-C, in other embodiments the UAV and UAV-C connect to the USS/UTM server 211 via the same 3GPP network. In such embodiments, the AMF/SMF #1 703 and AMF/SMF #2 709 would be the same entity, and similarly the UAS-NF #1 705 and UAS-NF #2 707 would be the same entity. In yet another embodiment, the UAV-C (i.e., of the UE 711) is a 'non-networked' UAV-C, where the UAV-C connects to USS/UTM server 211 using a connection outside of a 3GPP network. The steps involved in the procedure 700 are described as follows:

Beginning on FIG. 7A, as a precondition, it is assumed the UE 701 (i.e., embodied in a UAV) and the UE 711 (i.e., embodied in a UAV-C) perform primary authentication and UUAA with the USS/UTM server 211 (see blocks 715 and 717). It is further assumed that the UE 701 (i.e., UAV) and the UE 711 (i.e., UAV-C) have a PDU session established with the USS/UTM server 211 and so when a C2 or UAV/UAV-C pairing is required, the UE 701 (i.e., UAV) as well as the UE 711 (i.e., UAV-C) can perform pairing authorization with the USS/UTM server 211 over the established PDU session (i.e., over the established user plane connection) (see blocks 719, 721, and 723). While FIG. 7A illustrates the primary authentication, PDU session establishment, and UAS Authentication and authorization of the UE 701 occurring before the corresponding procedures of the UE 711, the UAV 603 may register and/or establish a PDU session before the UAV-C 601—or both registrations and/or PDU Session establishments may occur concurrently/simultaneously.

While FIG. 7A illustrates the primary authentication of the UE 701 occurring before the primary authentication of the UE 711, the UE 711 may perform primary authentication of the UE 701—or both primary authentications may occur concurrently/simultaneously. Similarly, while FIG. 7A illustrates the UAS Authentication and PDU Session establishment of the UE 701 occurring before the UAS Authentication and PDU Session establishment of the UE 711, the UAS Authentication and PDU Session establishment of the UE 711 may occur before the UAS Authentication and PDU Session establishment of the UE 701—or UAS Authentication and authorization may occur concurrently/simultaneously for both devices.

Note that the USS/UTM server 211 still needs to notify the 3GPP network (e.g., UAS-NFs 705/707 and/or AMFs/SMFs 703/709) about the results of the UAV/UAV-C pairing authorization, so that the 3GPP network can take into account the UAV/UAV-C pairing authorization results before accepting any related (i.e., pairing or C2 related) PDU Session establishment request from the UAV/UAV-C or accepting any C2 connection/traffic routing between the UE 701 (i.e., UAV) and the UE 711 (i.e., UAV-C).

At Step 1, the UE 701 (i.e., UAV) sends PDU session Establishment Request to the AMF/SMF #1 703 which includes a C2/Pairing Required Indication, a UAV ID, a UAV-C ID, a UAS ID, and an authorization token (see messaging 725). In one alternative, a PDU session modification request may be sent in Step 1. Note that the UAS ID may be an identifier that is assigned by the USS/UTM server 211 (e.g., after a successful UAV-UAV-C pairing authorization) to combinedly denote a UAV and UAV-C pair. In certain embodiments, even before the pairing authorization is done, the USS/UTM server 211 may have provided the UE 701 (i.e., UAV) with a UAS ID during UUAA or anytime during a pre-configuration (if any).

At Step 2, the AMF/SMF #1 703 uses the received UAV ID to check for a locally stored Pairing Authorization status (see block 727). If there a pairing Authorization status with 'Success Indication' and 'Session Security information' is locally stored, and if the authorization token received matches with the locally stored authorization information (e.g., Token) then PDU Session Establishment is performed (see Steps 8-10). However, if there is no pairing Authorization status locally stored in the AMF/SMF #1 703—or if the pairing Authorization status indicates 'failed or required,' then the AMF/SMF #1 703 performs the C2/Pairing Authorization procedure comprising Steps 3-7.

At Step 3, the AMF/SMF #1 703 sends a C2/Pairing information request to the UAS-NF #1 705 (see messaging 729), said request containing the received UAV ID, the authorization token, the UAV-C ID and the UAS ID.

At Step 4, the UAS-NF #1 705 sends the received C2/Pairing information request to the USS/UTM server 211 (see messaging 731), said request containing the received UAV ID, the authorization token, the UAV-C ID, the UAS ID, and the 3GPP UAV ID/GPSI. The received C2/Pairing information request triggers the USS/UTM server 211 to retrieve and/or acquire information (e.g., UAV-C IP address) for the UAV-C identified in the C2/Pairing information request.

Note that if the UE 711 (i.e., UAV-C) has already performed step 1-10 similar to UE 701 (i.e., UAV), then the USS/UTM server 211 will be able to provide the UAV-C IP address to the UAS-NF #1 705 in step 6 (see block 733). Alternatively (Option 1), for a UE 711 (i.e., UAV-C) that is not connected to the USS/UTM server 211 via a 3GPP network, the UAV-C IP address will be available to the USS/UTM server 211 soon after the UAS authentication and pairing authorization is carried out over the internet connection (i.e., outside 3GPP network).

Alternatively (Option 2), the USS/UTM server 211 may trigger a network-initiated PDU Session Establishment for C2 following a successful pairing authorization over the user plane (in the PDU Session 1) (see block 735).

Alternatively (Option 3), if the USS/UTM server 211 finds that a UE 711 (i.e., UAV-C) is not connected/active with the USS/UTM server 211, then the USS/UTM server 211 may perform device triggering to perform network-initiated PDU Session Establishment (as described below in the fourth solution) for C2 at Step 5 (see block 737). In this case, Steps a-i are performed.

Continuing onto FIG. 7B, at Step 5, the USS/UTM server 211 checks locally stored C2/Pairing status and result information (see messaging 739). If the pairing authorization result is available and if it is success, (i.e., as the UE 701 (i.e., UAV) and the UE 711 (i.e., UAV-C) have already performed pairing authorization over user plane as described in the precondition), then the USS/UTM server 211 performs step 6.

At Step 6 the USS/UTM server 211 sends a C2 Pairing Response/Notification message to the UAS-NF #1 705, which message contains the 3GPP UAV ID (i.e., GPSI), the UAV ID, the Pairing Authorization Success Indication, the UAV-C IP address (if available), and the Session Security Information (see messaging 741).

At Step 7, the UAS-NF #1 705 forwards the received C2 Pairing Response/Notification message to the AMF/SMF #1 703, which message contains the 3GPP UAV ID (i.e., GPSI), the UAV ID, the Pairing Authorization Success Indication, the UAV-C IP address (if available), and the Session Security Information (see messaging 743).

At Step 8, the AMF/SMF #1 703 performs the PDU Session Establishment Procedure, i.e., involving UPF allocation and IP address allocation for the UE 701 (i.e., UAV) (see messaging 745). Further, the AMF/SMF #1 703 locally stores the UAV ID, the corresponding GPSI and the UAV ID address and the UAV-C IP address (if received).

At Step 9, if the AMF/SMF #1 703 has not provided any static IP address for the UE 701 (i.e., UAV) to the USS/UTM server 211 (i.e., in step 3-4), then the AMF/SMF #1 703, after the IP address allocation sends the UAV IP address to the USS/UTM server 211 in a C2 Pairing Acknowledgement message via the UAS-NF #1 705 (see messaging 747).

At Step 10, the AMF/SMF #1 703 sends a PDU Session Establishment Accept message to the UE 701 (i.e., UAV) with the Session Security Information and Pairing Authorization Success Indication (see messaging 749). The AMF/SMF #1 703 also locally updates and stores the Pairing Authorization Status with Pairing Authorization Success Indication and pairing information with UE 701 (i.e., UAV) and the UAV-C ID and their IP addresses corresponding to the UAV ID and the 3GPP UAV ID.

Referring to the right-hand side of FIG. 7B, at Step (a), the USS/UTM server 211 sends C2/Pairing Notification Request message to the UAS-NF #2 707 which message contains the 3GPP UAV-C ID (i.e., GPSI), the UAV-C ID, the UAV ID, the UAS ID, the Pairing Authorization Required Indication/Pairing Authorized Indication and the Session Security Information (see messaging 751).

At Step (b), the UAS-NF #2 707 performs device triggering based on the fourth solution (described in greater detail below) to trigger network initiated PDU Session Establishment for the dedicated C2. The UAS-NF #2 707 sends the received C2/Pairing Notification Request message to the AMF/SMF #2 709, which message contains the 3GPP UAV-C ID (i.e., GPSI), the UAV-C ID, the UAV ID, the UAS ID, the Pairing Authorization Required Indication/Pairing Authorized Indication and the Session Security Information (see messaging 753).

At Step (c), the AMF/SMF #2 709 locally stores the Pairing Authorization Status, e.g., based on the received information in Step (b) (see messaging 755).

At Step (d), the AMF/SMF #2 709 receives a PDU Session Establishment Request from the UE 711 (i.e., UAV-C) which message contains C2/Pairing Required Indication, UAV-C ID, Authorization Token, UAV ID and UAS ID (see messaging 757).

At Step (e), the AMF/SMF #2 709 checks for the received UAV-C ID, if there is any corresponding Pairing Authorization status locally stored (see block 759). If there a pairing Authorization status with 'Success Indication' and 'Session Security information' is locally stored, and if the authorization token received matches with the locally stored authorization information (e.g., a Token), then the AMF/SMF #2 709 performs Step (f).

Continuing onto FIG. 7C, at Step (f), the AMF/SMF #2 709 performs PDU Session Establishment procedure, i.e., involving UPF allocation and IP address allocation for the UE 711 (i.e., UAV-C) (see block 761). Further, the AMF/SMF #2 709 locally stores the UAV-C ID, the corresponding GPSI and the UAV ID address and the UAV-C IP address received in step (d).

At Step (g), the AMF/SMF #2 709 sends a PDU Session Establishment Accept message to the UE 711 (i.e., UAV-C) with the Session Security Information and Pairing Authorization Success Indication (see messaging 763).

At Step (h), the AMF/SMF #2 709 sends the C2 Pairing Acknowledgement message to the USS/UTM server 211 via UAS-NF #2 707, which message includes the UAV-C ID, the 3GPP UAV-C ID, and the UAV-C IP address (see messaging 765).

At Step (i), the USS/UTM server 211 sends a C2 pairing complete message to the AMF/SMF #2 709 via the UAS-NF #2 707, said pairing complete message including the UAV IP address (see messaging 767).

Referring now to the left-hand side of FIG. 7C, at Step 11 the USS/UTM server 211 sends a C2 pairing complete message to the AMF/SMF #1 703 via the UAS-NF #1 705, said pairing complete message including the GPSI of the UE 701 (i.e., UAV), the UAV ID and the UAV-C IP address (see messaging 769).

At Step 12, the UE 701 (i.e., UAV) and the UE 711 (i.e., UAV-C) use the received session security information to set up a secure session between the UE 701 (i.e., UAV) and the UE 711 (i.e., UAV-C) for the C2 connection (see block 771). The procedure 700 ends.

According to a first variant of the third solution, the authorization of UAV and UAV-C pairing can be performed by the USS/UTM (after a successful primary authentication and during/after a successful UAS authentication) when a UAV initiates a PDU session establishment to set up C2 connection with the UAV-C for enabling the UAS service.

It is considered that UAV and UAV-C has already performed successful UAS registration with the USS/UTM (and has UAS authorization and security information provided by the USS/UTM). The UAV shall include Pairing authorization request information containing UAV-C ID, Authorization Token, UAS ID, Security context ID in addition to its CAA-level UAV ID in the PDU session establishment request message to SMF along with the UAV operation request and SMF can send the UAV operation Request along with the received Pairing authorization request information to the UFES and the UFES forwards the same to the USS/UTM. UAV operation Request procedure can be based on agreements from SA2 23.754.

Upon receiving the Pairing authorization request information along with UAV operation request, the USS/UTM can trigger the following UAV and UAV-C pairing authorization and session security set up procedure. Pairing authorization can also be referred C2 Association authorization. The solution considers that, the UAV-C information (i.e., a UAV-C ID) with which the UAV can form an UAS can be available in the USS, and it can also be prepositioned to the UAV along with the CAA-level UAV ID provisioning (out of 3GPP scope) as a precondition.

Figure 8A:
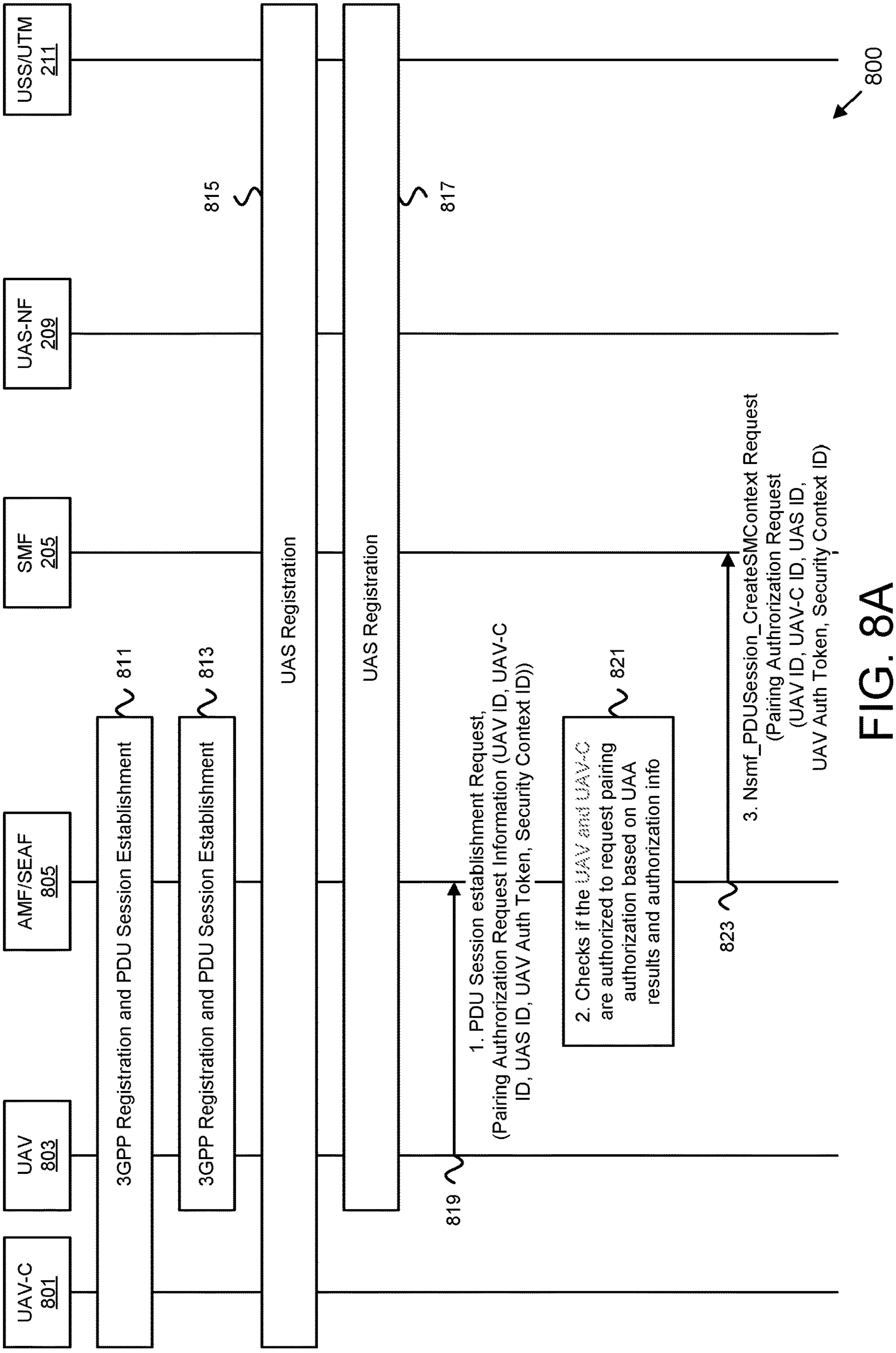
FIG. 8A illustrates one embodiment of a procedure for UAV and UAV-C pairing authorization and session security set up.
Figure 8B:
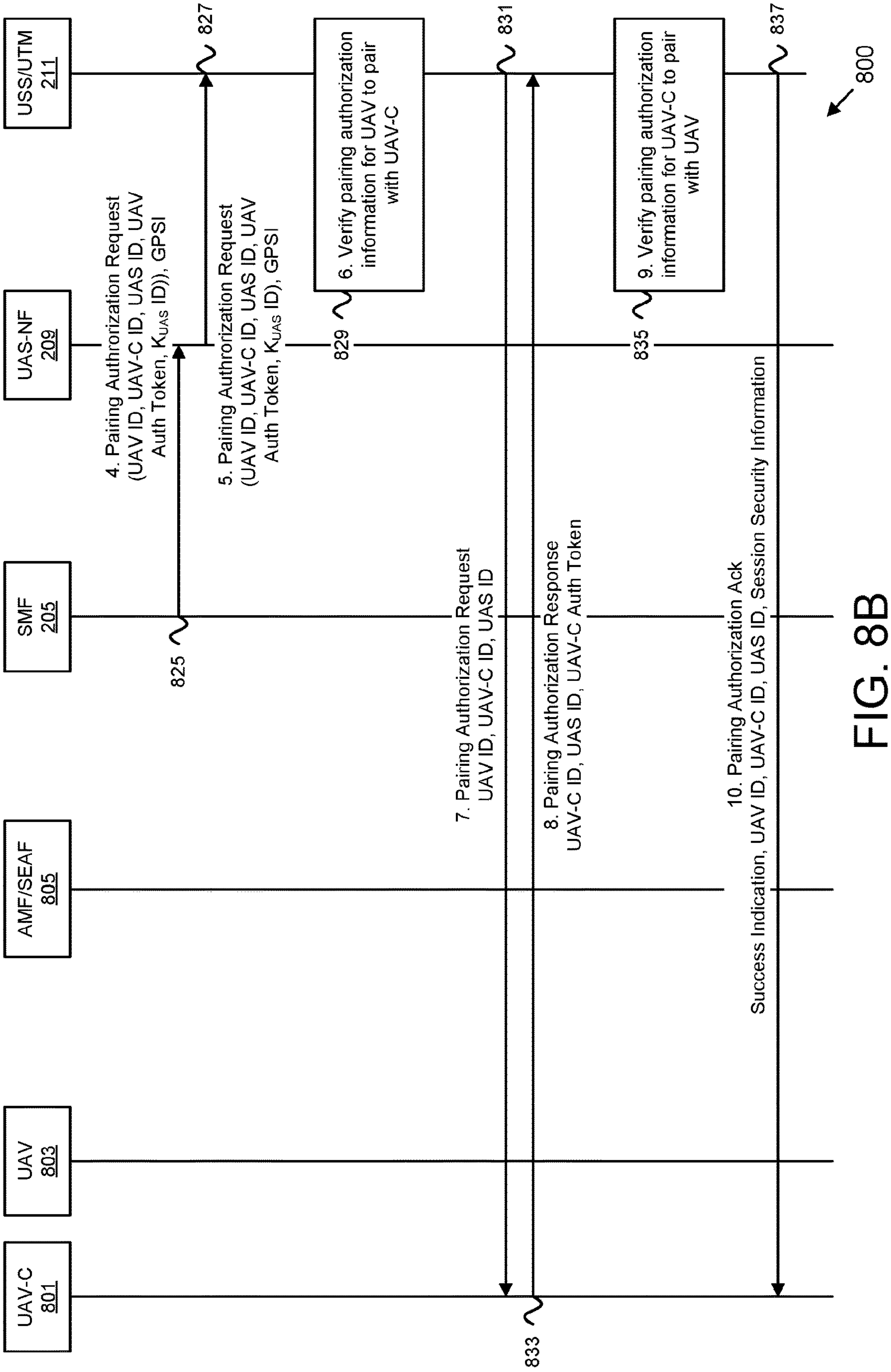
FIG. 8B is a continuation of the procedure of FIG. 8A.

FIG. 8A-8B depict an exemplary procedure 800 of UAV and UAV-C pairing authorization and session security set up, according to the first variant of the third solution. As depicted, the procedure 800 involves a UAV-C 801 (i.e., an embodiment of the UAV-C 108 containing a UE), a UAV 803 (i.e., an embodiment of the UAV 106 containing a UE), an AMF and corresponding (e.g., co-located) Security Anchor Function ("SEAF") depicted as combined node "AMF/SEAF" 805, the SMF 205, the UAS-NF 209, and the USS/UTM server 211. In certain embodiments, the UAS-NF 209 may be replaced with another 3GPP NF which handles the UAV/UAV-C related UAS operational message exchange with the corresponding USS/UTM on behalf of the 3GPP network, such as a UFES, the NEF, or another suitable NF in the 3GPP network. The steps of the procedure 800 are as follows.

Beginning on FIG. 8A, as a precondition, the UAV 803 and UAV-C 801 are registered to the 3GPP network (see blocks 811 and 813) and both the UAV 803 and the UAV-C 801 have successfully performed UAS Authentication and authorization (e.g., UUAA) with the USS/UTM server 211 and established a PDU Session with the USS/UTM server 211 (see blocks 815 and 817). While FIG. 6A illustrates the 3GPP registration and PDU session establishment of the UAV-C 601 occurring before the 3GPP registration and PDU session establishment of the UAV 603, the UAV 603 may register and/or establish a PDU session before the UAV-C 601—or both registrations and/or PDU Session establishments may occur concurrently/simultaneously. Similarly, while FIG. 6A illustrates the UAS Authentication and authorization of the UAV-C 601 occurring before the UAS Authentication and authorization of the UAV 603, the authorization/authentication of the UAV 603 may occur before authorization/authentication of the UAV-C 601—or UAS Authentication and authorization may occur concurrently/simultaneously for both devices. Alternatively, the UAV-C 801 may be connected to the USS/UTM server 211 over the internet or another data network outside of the 3GPP network.

At Step 1, the UAV 803 sends to the AMF/SEAF 805, a PDU Session establishment Request with Pairing Authorization Request Information (see messaging 819). Pairing Authorization Request Information includes a UAV ID, a Target UAV-C ID, a UAS ID, a UAV Authorization Token (i.e., received during successful UUAA from USS/UTM server 211), and a UAS Security Context/Information Identifier (i.e., received during the successful UUAA from USS/UTM server 211 to uniquely identify the UAS security information established between UAV 803 and USS/UTM server 211).

At Step 2, upon receiving the PDU Session establishment Request with Pairing Authorization Request Information, the AMF/SEAF 805 checks whether the UAV-ID is authorized to request pairing authorization, e.g., based on the locally stored UAS authentication and authorization results, the authorization information (i.e., a Token) and the UAV-C ID (if available) (see block 821). If the received Pairing authorization request information matches the locally stored information, then the AMF/SEAF 805 considers the check as successful and performs Step 3. However, if the AMF/SEAF 805 does not find any UAS authentication results or if the authentication result or authorization information locally stored does not match with the received authorization information, then the AMF/SEAF 805 triggers UUAA as described in the fourth solution and/or sets an 'authorization information mismatch indication'.

At Step 3, the AMF/SEAF 805 sends a Nsmf_PDUSession_CreateSMContext Request to the SMF 205 with the received Pairing Authorization Request Information, which includes the UAV ID, the Target UAV-C ID, the UAS ID, the UAV Authorization Token, and the UAS Security Information Identifier (see messaging 823). If an authorization mismatch is identified, then an 'authorization information mismatch indication' is also sent.

Continuing onto FIG. 8B, at Step 4, the SMF 205 sends the received Pairing Authorization Request to the UAS-NF 209 (e.g., in a service operation message) (see messaging 825), said request containing the UAV ID, the Target UAV-C ID, the UAS ID, the UAV Authorization Token, and the UAS Security Information Identifier, along with a GPSI of the UAV 803 and a UAV IP address. If the SMF 205 receives an 'authorization information mismatch indication,' then the SMF 205 sends a PDU session establishment reject message to the AMF/SEAF 805 in the N1SM container and the AMF/SEAF 805 sends the PDU session establishment reject message to the UE of the UAV 803.

At Step 5, the UAS-NF 209 sends the received Pairing Authorization Request to the USS/UTM server 211 (e.g., in a service operation message) (see messaging 827), said request containing the UAV ID, the Target UAV-C ID, the UAS ID, the UAV Authorization Token, the UAS Security Information Identifier, along with the UAV GPSI and UAV IP address.

At Step 6, the USS/UTM server 211 verifies the information received in the received Pairing Authorization Request with the locally stored information (see block 829). If the verification is successful, then the USS/UTM server 211 determines to authorize pairing for the UAV 803. Optionally, Steps 7-10 may be skipped and only step 10 is performed if the UAV-C 801 is connected to the USS/UTM server 211 over internet.

At Step 7, the USS/UTM server 211 sends a Pairing Authorization Request to the UAV-C 801 identified with the UAV-C ID (via the 3GPP network or over internet) (see messaging 831), said request containing the UAV ID, the UAV-C ID and the UAS ID.

At Step 8, in response the UAV-C 801 sends a Pairing Authorization Response message to the USS/UTM server 211 (see messaging 833), said Response message containing the UAV-C ID, the UAS ID, the UAV-C IP address, and the UAV-C Authorization Token.

At Step 9, the USS/UTM server 211 verifies the information such as UAV-C ID, UAS ID, and UAV-C Authorization Token received in the Pairing Authorization Response message, e.g., by checking with the locally stored information (see block 835). If the received authorization information matches with the locally stored information, then the USS/UTM server 211 considers the UAV-C pairing authorization as successful.

At Step 10, the USS/UTM server 211 sends a Pairing Authorization Acknowledgement/Pairing Authorization Notification message to the UAV-C 801 (see messaging 837), which message contains a Pairing Success Indication, the UAV ID, the UAV-C ID, the UAS ID, the Session Security Information (i.e., a key material or token to set up session security), and the UAV IP address.

Figure 8C:
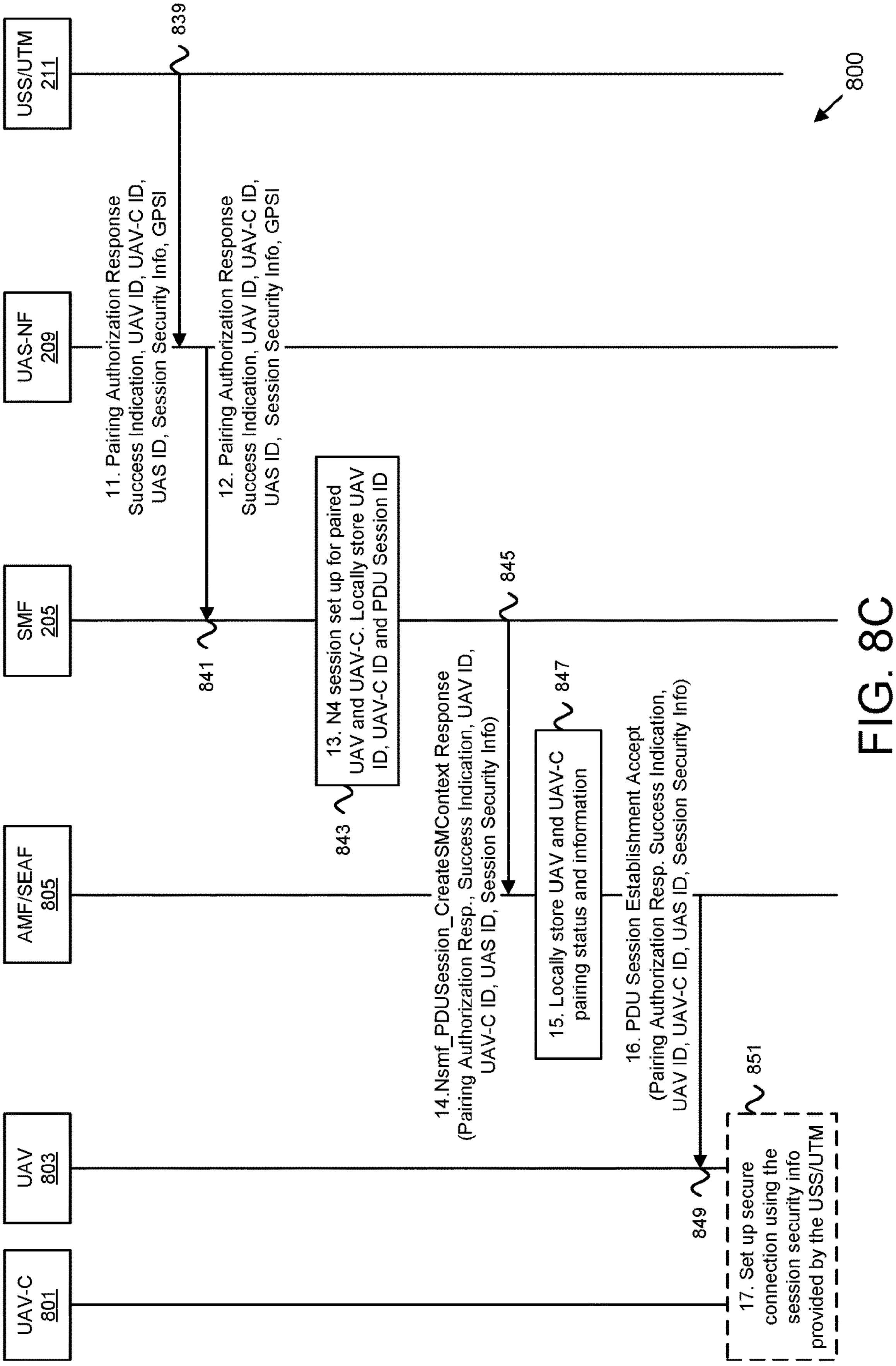
FIG. 8C is a continuation of the procedure of FIG. 8B.

Continuing onto FIG. 8C, at Step 11, the USS/UTM server 211 further sends a Pairing Authorization Response/Accept message to the UAS-NF 209 in response to the Pairing Authorization Request (i.e., received in Step 5) (see messaging 839). Here, the Pairing Authorization Response/Pairing message contains the Pairing Success indication, the UAV ID, the UAV-C ID, the UAS ID, the Session Security Information, the GPSI of the UAV-C 801, and the UAV-C IP address.

At Step 12, the UAS-NF 209 sends the received Pairing Authorization Response message to the SMF 205 (see messaging 841), which Response message contains the Pairing Success indication, the UAV ID, the UAV-C ID, the UAS ID, the Session Security Information, the UAV GPSI, and the UAV-C IP address.

At Step 13, the SMF 205 locally stores the information received in the Pairing Authorization Response as part of pairing authorization status information. Further, the SMF 205 performs N4 session set up for the authorized pair of UAV 803 and UAV-C 801 (see block 843).

At Step 14, the SMF 205 sends Nsmf_PDUSession_CreateSMContext Response to the AMF/SEAF 805 with the received Pairing Authorization Response Information, which response message includes the Success Indication, the UAV ID, the UAV-C ID, the UAS ID, and the Session Security Information (see messaging 845).

At Step 15, the AMF/SEAF 805 optionally stores the UAV ID and the UAV-C ID along with the pairing authorization status and the UAS ID (see block 847).

At Step 16, the AMF/SEAF 805 sends a PDU Session Establishment Accept message to the UAV 803 over the N1 interface (see messaging 849). Here, the PDU Session Establishment Accept message includes the received Authorization Response Information, which includes the Success Indication, the UAV ID, the UAV-C ID, the UAS ID, and the Session Security Information.

At Step 17, the UAV 803 and the UAV-C 801 use the received session security information to set up a secure connection between the UAV 803 and the UAV-C 801 for the C2 connection (see block 851). The procedure 800 ends.

Figure 9A:
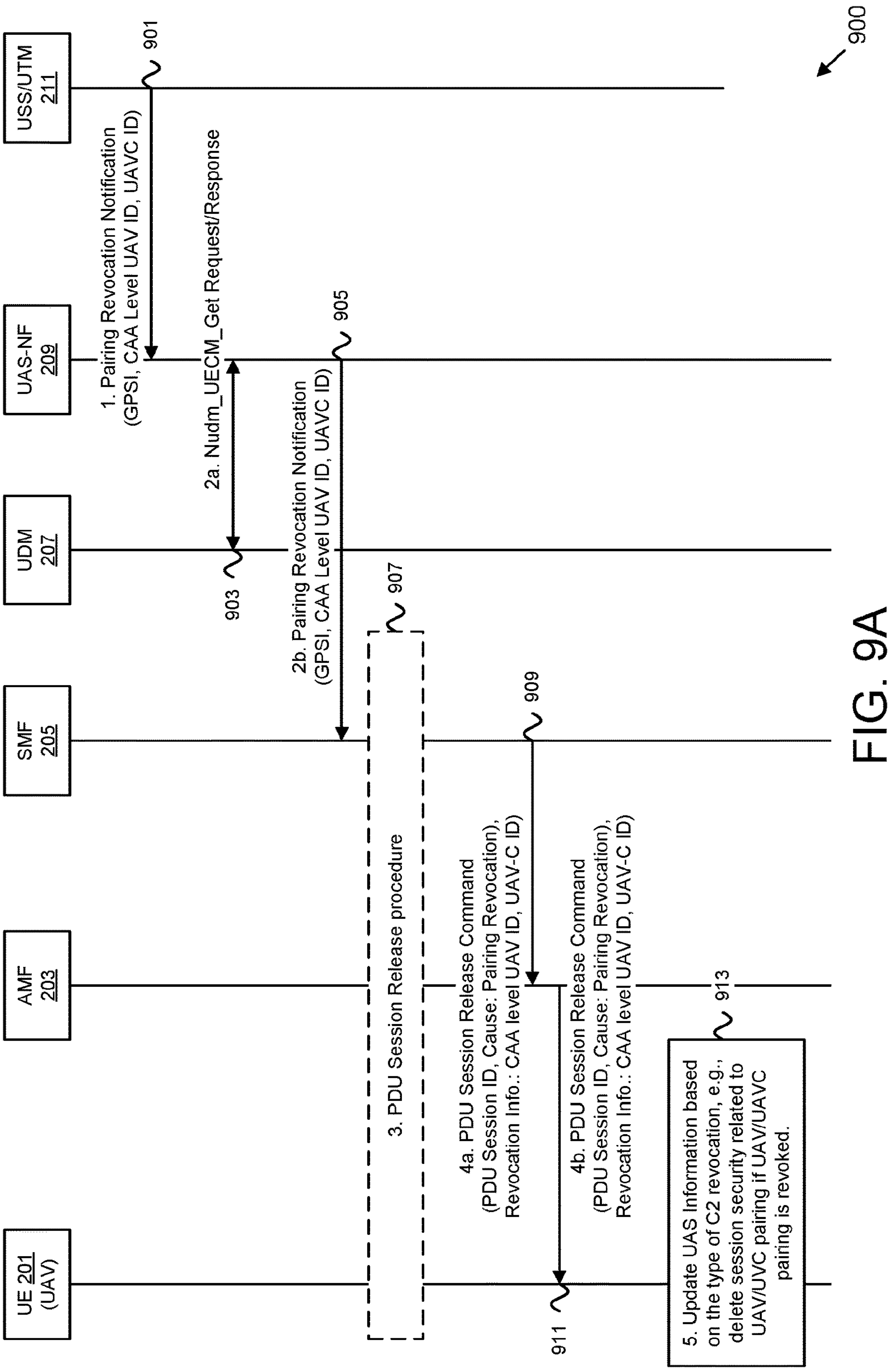
FIG. 9A illustrates one embodiment of a procedure for UAV and UAV-C pairing authorization revocation.
Figure 9B:
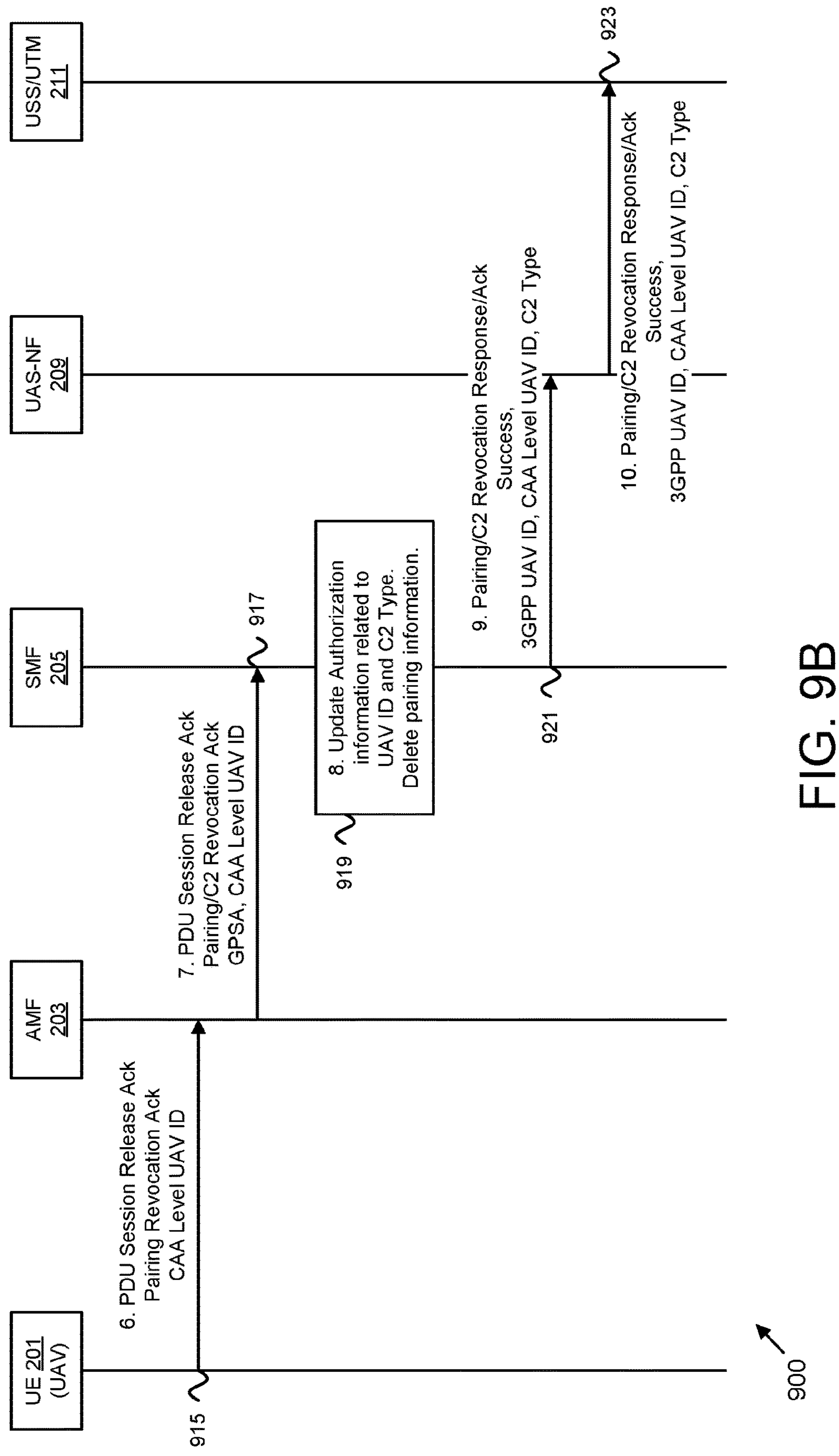
FIG. 9B is a continuation of the procedure of FIG. 9A.

FIGS. 9A-9B depict an exemplary procedure 900 for UAV and UAV-C Pairing Authorization Revocation, according to a second variant of the third solution. The procedure 900 involves a UE 201, the AMF 203, the SMF 205, the UDM 207, the UAS-NF 209, and the USS/UTM server 211. In certain embodiments, the UAS-NF 209 may be replaced with another 3GPP NF which handles the UAV/UAV-C related UAS operational message exchange with the corresponding USS/UTM on behalf of the 3GPP network, such as a UFES, the NEF, or another suitable NF in the 3GPP network. The steps of the procedure 900 are as follows:

Beginning on FIG. 9A, at Step 1 when the USS/UTM server 211 determines to revoke UAV/UAV-C pairing (also known as C2 pairing or C2 association), the USS/UTM server 211 sends a Pairing Revocation Notification message to the UAS-NF 209 (see messaging 901), said message containing the GPSI of the UE 201, a CAA-Level UAV ID of the UE 201, and a UAV-C ID.

At Step 2*a*, the UAS-NF 209 uses the Nudm_UECM_Get Request/Response service operation to fetch serving SMF information corresponding to the received GPSI (see messaging 903). Here, it is assumed that the serving SMF information identifies the SMF 205.

At Step 2*b*, the UAS-NF 209 sends the received Pairing Revocation Notification message to the serving SMF 205 (see messaging 905), which message contains the GPSI, the CAA-Level UAV ID, and the UAV-C ID. Alternatively, the UAS-NF 209 sends a Pairing Revocation Acknowledgement to the USS/UTM server 211 with the GPSI and the CAA-Level UAV ID.

At Step 3, upon receiving the Pairing Revocation Notification, the SMF 205 checks whether there is any active PDU Session corresponding to the indicated CAA-Level UAV ID with a UAV-C ID. If there is any active PDU Session, then the SMF 205 performs PDU Session release procedure for the associated PDU Session IDs (see block 907), e.g., using the existing procedure in TS 23.502 Clause 4.3.4.3, with the below noted adaptations.

At Step 4*a*, based on the received pairing revocation notification, the SMF 205 sends a PDU Session Release command to the AMF 203 (see messaging 909), said command message including the PDU Session ID along with a suitable cause value and pairing revocation information containing the CAA-Level UAV ID and the UAV-C ID. Alternatively, the SMF 205 upon receiving the Pairing Revocation Notification, the SMF 205 may further delete locally stored pairing information (such as pairing authorization information and paired UAV and UAV-C IDs)—if available—for the UE 201 (i.e., UAV) corresponding to its CAA-Level UAV ID.

At Step 4*b*, the AMF 203 forwards the PDU Session Release command to the UE 201 (i.e., UAV) (see messaging 911), which command message includes the PDU Session ID, the suitable cause value, and the pairing revocation information containing the CAA-Level UAV ID and the UAV-C ID.

At Step 5, the UE 201 (i.e., UAV) on receiving the PDU Session Release command with a pairing revocation information will delete the locally stored pairing authorization information (e.g., token, lifetime, identifiers, or any related information) and associated security information for the UAV and UAV-C pairing indicated in the pairing revocation information (see block 913).

Continuing onto FIG. 9B, at Step 6 the UE 201 (i.e., UAV) sends a PDU Session Release acknowledgement message to the AMF 203, e.g., including the Pairing Revocation Ack/Success indication and the CAA-Level UAV ID (see messaging 915).

At Step 7, the AMF 203 deletes locally stored pairing information (such as pairing authorization information and paired UAV and UAV-C IDs if available) for the UE 201 (i.e., UAV) corresponding to its CAA-Level UAV ID. Further, the AMF 203 sends a PDU Session Release Acknowledgement message to the SMF 205 with the GPSI, the received Pairing Revocation Ack indication/Success Indication and the CAA-Level UAV ID (see messaging 917).

At Step 8, upon receiving the Pairing Revocation Ack indication, the SMF 205 deletes (i.e., if not deleted during step 4) locally stored pairing information (such as pairing authorization information and paired UAV and UAV-C IDs)—if available—for the UE 201 (i.e., UAV) corresponding to its CAA-Level UAV ID (see block 919).

At Step 9, the SMF 205 sends a Pairing Revocation Acknowledgement to the UAS-NF 209 (see messaging 921), said acknowledgement message containing the received GPSI, the Success Indication, and the CAA-Level UAV ID.

At Step 10, the UAS-NF 209 forwards the received Pairing Revocation Acknowledgement to the USS/UTM server 211 (i.e., if not sent during step 2) with the received Success Indication, the GPSI and the CAA-Level UAV ID (see messaging 923). The procedure 900 ends.

The fourth solution discusses how a UAV or UAV-C in inactive mode can be triggered (by device triggering) to activate network-initiated PDU Session establishment when required related to an UAS authentication and authorization (e.g., UUAA) or pairing authorization as deemed necessary by the USS/UTM.

Figure 10A:
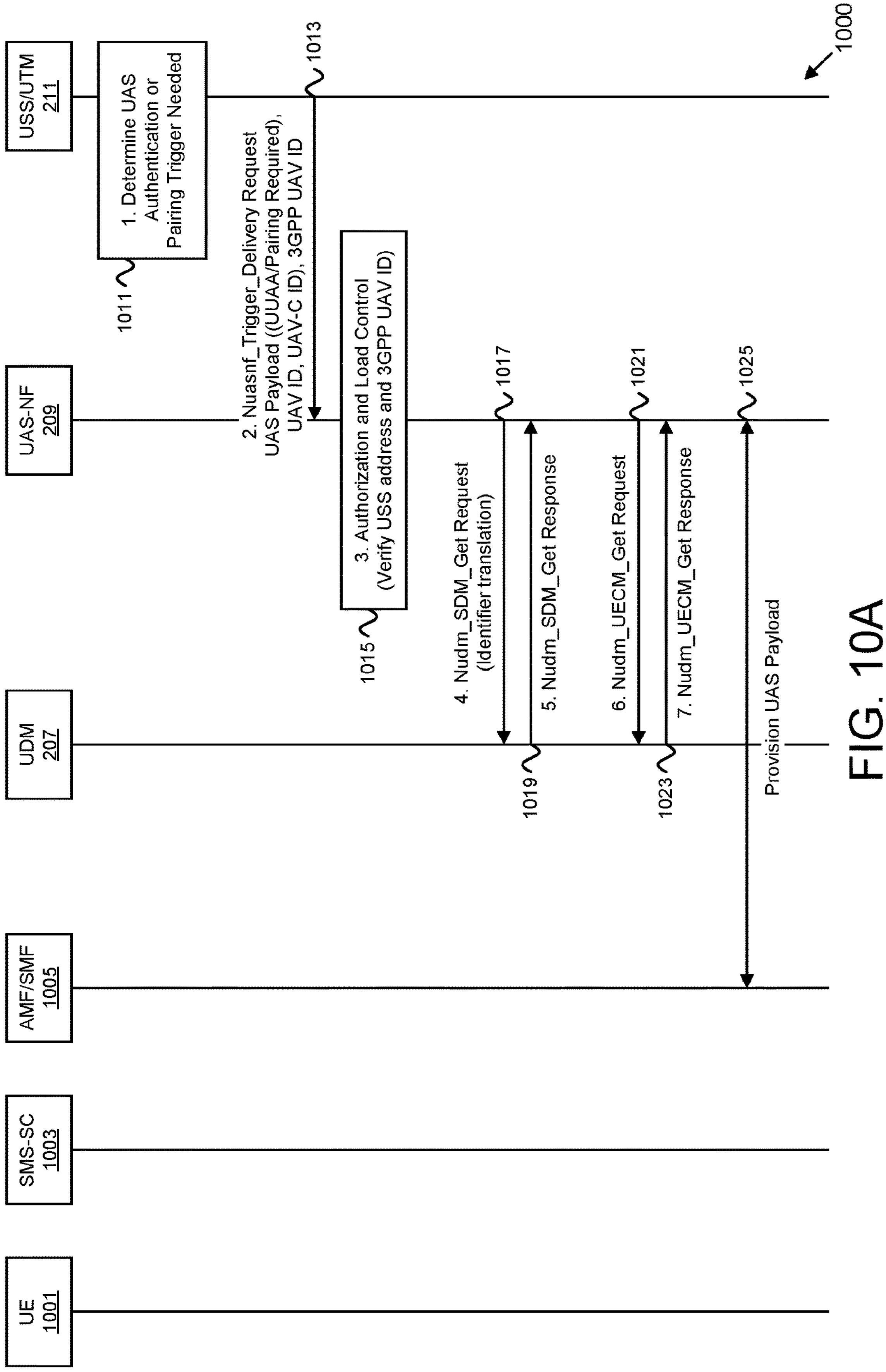
FIG. 10A illustrates one embodiment of a procedure for USS/UTM Triggered PDU session establishment.
Figure 10B:
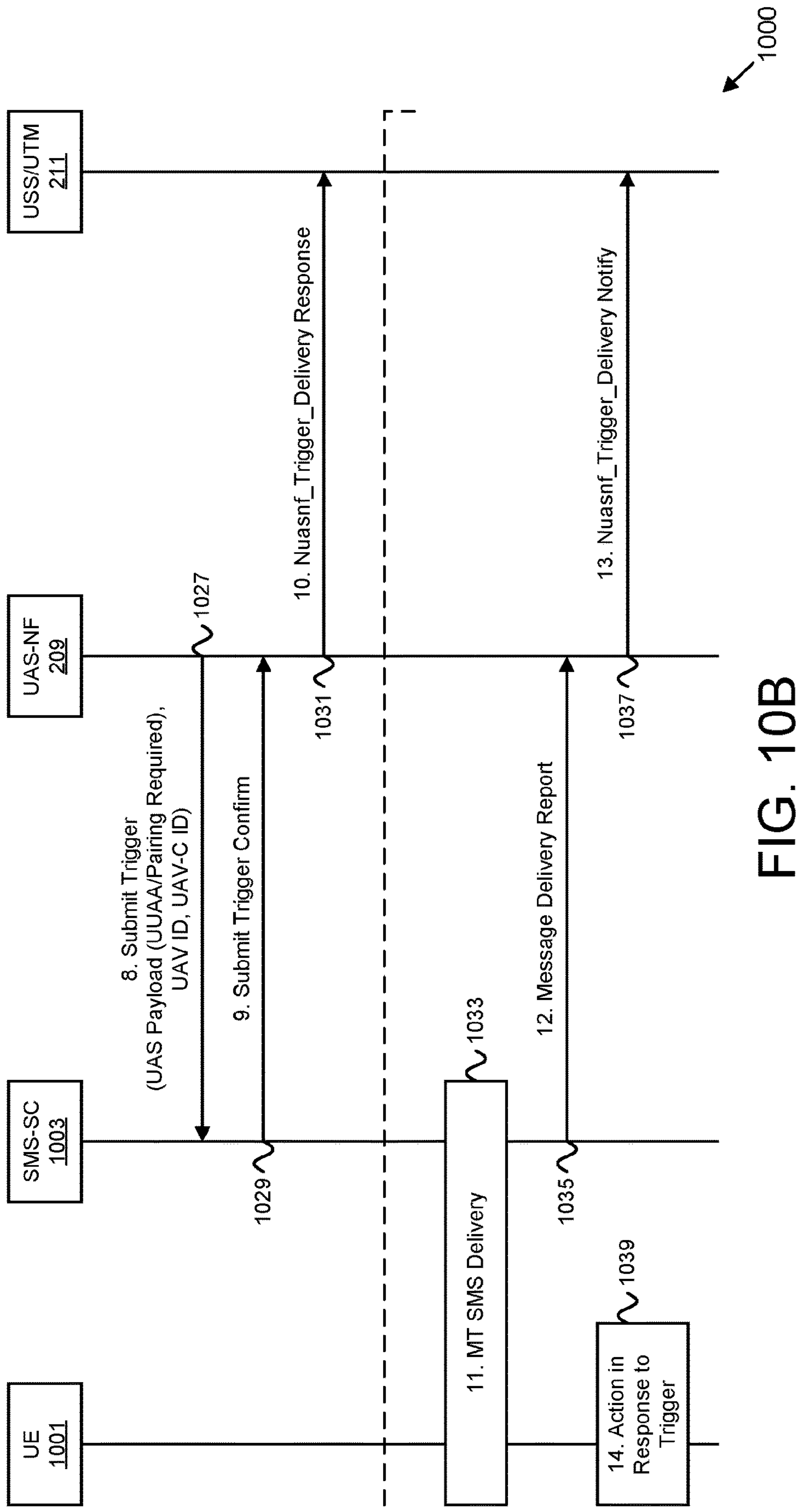
FIG. 10B is a continuation of the procedure of FIG. 10A.

FIGS. 10A-10B depicts an exemplary procedure 1000 for USS/UTM Triggered PDU session establishment for authorized pairing connection/UAA related to C2, according to embodiments of the fourth solution. The procedure 1000 involves a UE 1001 (e.g., which may be an embodiment of the remote unit 105, the UAV 106 and/or UAV-C 108), a Short Message Service ("SMS") Service Center (denoted "SMS-SC") 1003, an AMF and/or SMF serving the UE 1001 (depicted as combined node "AMF/SMF" 1005), the UDM 207, the UAS-NF 209, and the USS/UTM server 211. In certain embodiments, the UAS-NF 209 may be replaced with another 3GPP NF which handles the UAV/UAV-C related UAS operational message exchange with the corresponding USS/UTM on behalf of the 3GPP network, such as a UFES, the NEF, or another suitable NF in the 3GPP network.

The USS/UTM server 211 may invoke a Nuasnf_Trigger service, a Nnef_Trigger service, or a N3gppnf_Trigger service (e.g., Nufes_Trigger service), or a Naf_Trigger service to request the network to send an application trigger to the UAV and/or UAV-C. While the NEF is not depicted in FIGS. 10A-10B, in certain embodiments the UAS-NF 209 and USS/UTM server 211 communicate via the NEF, as discussed in greater detail below. The steps of the procedure 1000 are as follows:

Beginning on FIG. 10A, at Step 1 the USS/UTM server 211 determines the need to trigger the UE 1001 (i.e., UAV/UAV-C device) (see block 1011). If the USS/UTM server 211 has no contact details for the NEF and/or UAS-NF 209 (alt., NEF), it discovers and selects NEF/UAS-NF services. Alternatively, the USS/UTM server 211 may use the 3GPP NF routing information to send step 2 (i.e., a 3GPP NF routing information received from the UAS-NF 209 and stored during a UUAA if any occurred before).

At Step 2, the USS/UTM server 211 invokes the Nuasnf_Trigger_Delivery request service (alternatively, the N3gppnf_Trigger service, e.g., Nnef/Nufes_Trigger service) with UAS Payload containing: {(UUAA Required/Pairing authorization Required Indications), CAA-Level UAV ID, UAV-C ID (applicable when a pairing authorization required indication is sent)), 3GPP UAV ID} (see messaging 1013). To illustrate the different possibilities, the notation "Nuasnf/Nnef/N3gppnf/Naf" to indicate that the accompanying service operation may be a UAS-NF service operation (i.e., using "Nuasnf" service operation prefix), an NEF service operation (i.e., using "Nuasnf" service operation prefix), a 3GPP Application Function ("AF") service operation (i.e., using "Naf" service operation prefix), or another 3GPP NF service operation (i.e., using "N3gppnf" service operation prefix, or other service operation prefix defined in the 3GPP standards).

At Step 3, the UAS-NF 209 (alt., NEF) checks that the USS/UTM server 211 is authorized to send trigger requests and that the USS/UTM server 211 has not exceeded its quota or rate of trigger submissions over Nuasnf/Nnef/N3gppnf/Naf (see block 1015). If this check fails, the UAS-NF 209 (alt., NEF) sends an Nuasnf/Nnef/N3gppnf/Naf_Trigger_Delivery response with a cause value indicating the reason for the failure condition and the flow stops at this step. Otherwise, the flow continues with Step 4.

At Step 4, when the USS/UTM server 211 is authorized to trigger the UE 1001 (i.e., UAV/UAV-C device), then the UAS-NF 209 may invoke the Nudm_SDM_Get service operation (i.e., including parameters Identifier Translation, GPSI and USS/UTM Identifier) to resolve the GPSI to a SUPI (see messaging 1017).

At Step 5, the UDM 207 may invoke the Nudr_DM_Query service to retrieve a list of USS/UTM's that are allowed to trigger the UE 1001 and determines, based on UDM policy, which identifier (SUPI or Mobile Station Integrated Services Digital Network Number ("MSISDN")) should be used to trigger the UE 1001. The UDM 207 provides a Nudm_SDM_Get response (i.e., containing parameters: SUPI, and—optionally—MSISDN) (see messaging 1019).

If the USS/UTM server 211 is not allowed to send a trigger message to this UE 1001, or there is no valid subscription information for this user, then the UAS-NF 209 (alt., NEF) sends an Nuasnf/Nnef/N3gppnf/Naf_Trigger_Delivery response with a cause value indicating the reason for the failure condition and the flow stops at this step. Otherwise, this flow continues with step 6.

At Step 6, the UAS-NF 209 invokes Nudm_UECM_Get (SUPI, SMS) to retrieve the 5G SMS Function ("SMSF") identities of the UE 1001 (see messaging 1021).

At Step 7, the UDM 207 may invoke the Nudr_DM_Query service to retrieve the UE SMSF identities. The UDM 207 provides a Nudm_UECM_Get response with the corresponding UE SMSF identities (see messaging 1023). A UDM policy (possibly dependent on the Visited PLMN ("VPLMN") ID) may influence which serving node identities are returned. The UAS-NF 209 provisions the received identities as UAS Payload (see messaging 1025).

Continuing onto FIG. 10B, at Step 8, the UAS-NF 209 selects a suitable SMS Service Center (SMS-SC) 1003 based on configured information (see messaging 1027). The UAS-NF 209 acts as an MTC Interworking Function ("MTC-IWF") and sends a Submit Trigger (i.e., containing parameters: GPSI, SUPI, USS/UTM Identifier, trigger reference number, validity period, priority, SMSF serving node ID(s) (if available, these are obtained from UDM in Step 7), SMS Application port ID, UAS trigger payload (the received UAS Payload), Trigger Indication) message to the SMS-SC 1003.

If the UAS-NF 209 indicates that "Absent subscriber" was received from the UDM 207, then the SMS-SC 1003 is not to submit the message, but store it directly and send Routing Information for Session Management ("SM") to request the UDM 207 to add the SMS-SC address to the Message Waiting List.

At Step 9, the SMS-SC 1003 sends a Submit Trigger Confirm message to the UAS-NF 209 to confirm that the submission of the SMS has been accepted by the SMS-SC 1003 (see messaging 1029).

At Step 10, the UAS-NF 209 (alt., NEF) sends a Nuasnf/Nnef/M3gppnf/Naf_Trigger_Delivery response to the USS/UTM server 211 to indicate whether the Device Trigger Request has been accepted for delivery to the UE 1001 (see messaging 1031).

At Step 11, the SMS-SC 1003 performs Mobile-Terminated ("MT") SMS delivery to the UE 1001 (see block 1033).

At Step 12, if the message delivery fails (either directly or when validity period of the trigger message expires) or when the message delivery succeeds, the SMS-SC 1003 is to send a Message Delivery Report (i.e., containing: cause code, trigger reference number, USS/UTM Identifier) to the UAS-NF 209 (see messaging 1035).

At Step 13, the UAS-NF 209 (alt., NEF) provides a Nuasnf/Nnef/N3gppnf/Naf_Trigger_Delivery Notify message to the USS/UTM server 211 with a Delivery Report indicating the trigger delivery outcome (e.g., succeeded, unknown or failed and the reason for the failure) (see messaging 1037). The UAS-NF 209 (alt., NEF) generates the necessary Charging Data Record ("CDR") information including the GPSI and USS/UTM Identifier.

At Step 14, in response to the received device trigger, the UE 1001 takes specific actions and may take into consideration the content of the trigger payload (see block 1039). This action typically involves initiation of immediate or later communication with the USS/UTM server 211. The procedure 1000 ends.

Figure 11:
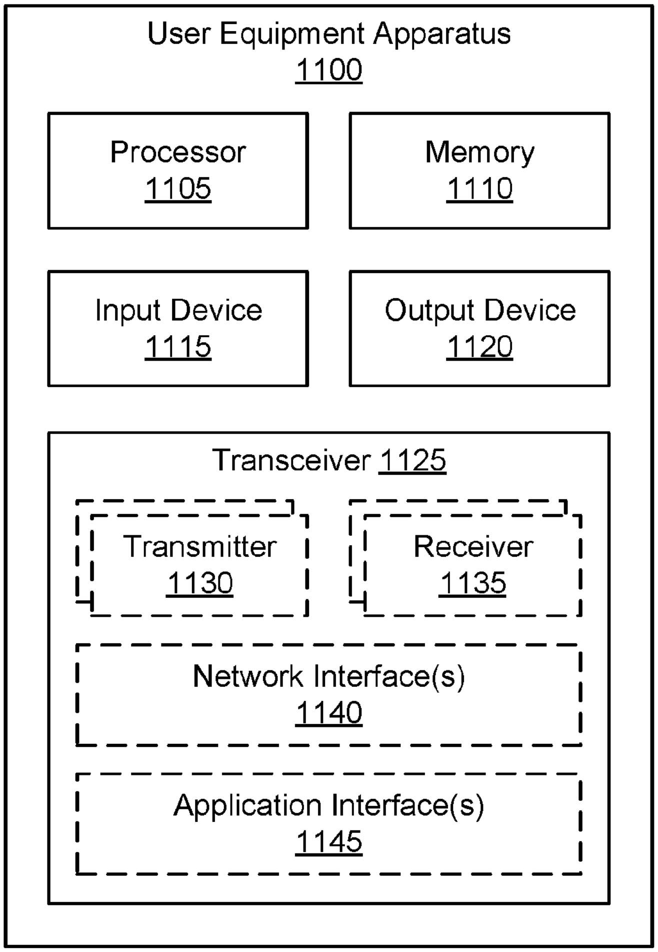
FIG. 11 is a block diagram illustrating one embodiment of a user equipment apparatus that may be used for handling security aspects for UAS in a 3GPP network.

FIG. 11 depicts a user equipment apparatus 1100 that may be used for handling security aspects for UAS in a 3GPP network, according to embodiments of the disclosure. In various embodiments, the user equipment apparatus 1100 is used to implement one or more of the solutions described above. The user equipment apparatus 1100 may be one embodiment of the remote unit 105 and/or the UE 201, described above. Furthermore, the user equipment apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the user equipment apparatus 1100 may not include any input device 1115 and/or output device 1120. In various embodiments, the user equipment apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. In some embodiments, the transceiver 1125 communicates with one or more cells (or wireless coverage areas) supported by one or more base units 121. In various embodiments, the transceiver 1125 is operable on unlicensed spectrum. Moreover, the transceiver 1125 may include multiple UE panels supporting one or more beams. Additionally, the transceiver 1125 may support at least one network interface 1140 and/or application interface 1145. The application interface(s) 1145 may support one or more APIs. The network interface(s) 1140 may support 3GPP reference points, such as Uu, N1, PCS, etc. Other network interfaces 1140 may be supported, as understood by one of ordinary skill in the art.

The processor 1105, in one embodiment, may include any known controller capable of executing computer-readable instructions and/or capable of performing logical operations. For example, the processor 1105 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125.

In various embodiments, the processor 1105 controls the user equipment apparatus 1100 to implement the above described UE behaviors. In certain embodiments, the processor 1105 may include an application processor (also known as "main processor") which manages application-domain and operating system ("OS") functions and a baseband processor (also known as "baseband radio processor") which manages radio functions.

In various embodiments, the transceiver 1125 receives a revocation indication message from a mobile communication network (e.g., from SMF via AMF or from AMF in case of 5GS or from MME/SMF+PGW-C in case of EPS). The processor 1105 deletes UAS-related authorization and security information corresponding to a UAV ID and sends a revocation acknowledgement message to the mobile communication network (e.g., via the transceiver 1125).

In some embodiments, the UAV ID comprises at least a CAA-level UAV ID. In some embodiments, the UAS-related authorization and security information includes one or more of: A) UUAA results; B) Pairing/C2 authorization results; C) UUAA authorization information; D) security key; E) a token; F) a lifetime; G) pairing information; H) pairing authorization results; I) C2 association information; J) C2 association authorization results; K) UAS security information; L) session security key material; M) session security token; and N) combinations thereof.

In some embodiments, based on the revocation indication message, the processor 1105 either revokes a UUAA for the UAV ID or requests an upper layer (i.e., application layer) to revoke a UUAA for the UAV ID. In such embodiments, deleting the UAS-related authorization and security information includes deleting authorization information and security context that was received after a successful UUAA.

In some embodiments, based on the revocation indication message, the processor 1105 either revokes a UAS pairing authorization corresponding to the UAV ID (e.g., UAV/UAV-C pairing and/or C2 pairing/association) or requests an upper layer (i.e., application layer) to revoke a UAS pairing authorization corresponding to the UAV ID. In such embodiments, deleting the UAS-related authorization and security information comprises deleting UAS pairing authorization information and session security information that was received after a successful UAS pairing procedure, e.g., between a UAV and a UAV-C. As used herein, a "UAS pairing" refers to a UAV/UAV-C pairing, a C2 pairing, and/or a C2 association.

In certain embodiments, the UAS pairing procedure includes sending a pairing authorization request and receiving a pairing success indication comprising the session security information. Here, the pairing authorization request contains one or more of: A) a first ID that belongs to the UAV, B) a second ID belonging to the UAV-C, and C) a third ID belonging to a UAS.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to location-aware beam selection and/or mobile operation. For example, the memory 1110 may store various parameters, panel/beam configurations, resource assignments, policies, and the like as described above. In certain embodiments, the memory 1110 also stores program code and related data, such as an operating system or other controller algorithms operating on the apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1120 may include a wearable display separate from, but communicatively coupled to, the rest of the user equipment apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 communicates with one or more network functions of a mobile communication network via one or more access networks. The transceiver 1125 operates under the control of the processor 1105 to transmit messages, data, and other signals and also to receive messages, data, and other signals. For example, the processor 1105 may selectively activate the transceiver 1125 (or portions thereof) at particular times in order to send and receive messages.

The transceiver 1125 includes at least transmitter 1130 and at least one receiver 1135. One or more transmitters 1130 may be used to provide UL communication signals to a base unit 121, such as the UL transmissions described herein. Similarly, one or more receivers 1135 may be used to receive DL communication signals from the base unit 121, as described herein. Although only one transmitter 1130 and one receiver 1135 are illustrated, the user equipment apparatus 1100 may have any suitable number of transmitters 1130 and receivers 1135. Further, the transmitter(s) 1130 and the receiver(s) 1135 may be any suitable type of transmitters and receivers. In one embodiment, the transceiver 1125 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1125, transmitters 1130, and receivers 1135 may be implemented as physically separate components that access a shared hardware resource and/or software resource, such as for example, the network interface 1140.

In various embodiments, one or more transmitters 1130 and/or one or more receivers 1135 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 1130 and/or one or more receivers 1135 may be implemented and/or integrated into a multi-chip module. In some embodiments, other components such as the network interface 1140 or other hardware components/circuits may be integrated with any number of transmitters 1130 and/or receivers 1135 into a single chip. In such embodiment, the transmitters 1130 and receivers 1135 may be logically configured as a transceiver 1125 that uses one more common control signals or as modular transmitters 1130 and receivers 1135 implemented in the same hardware chip or in a multi-chip module.

Figure 12:
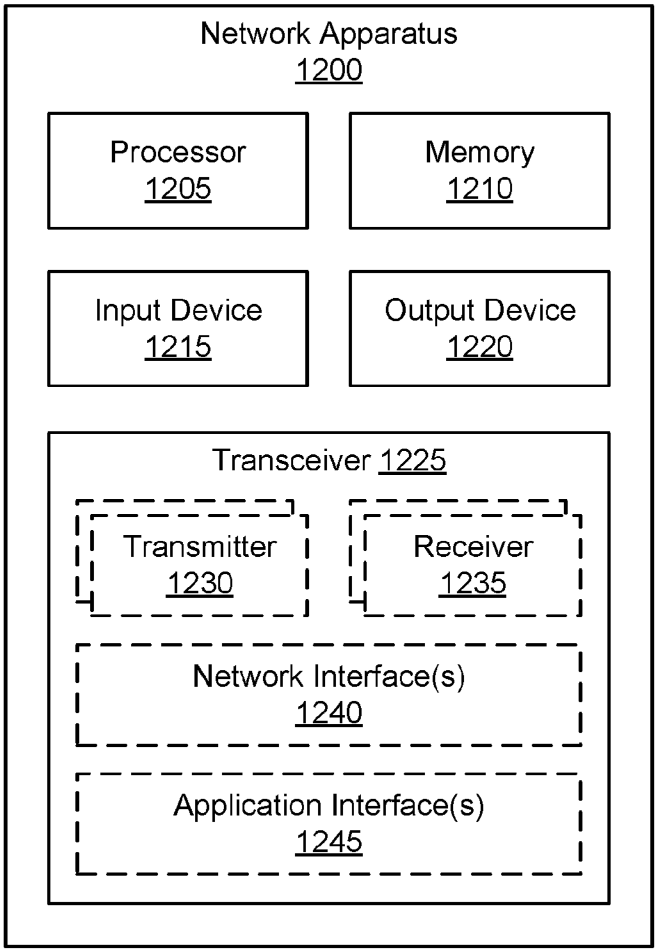
FIG. 12 is a block diagram illustrating one embodiment of a network equipment apparatus that may be used for handling security aspects for UAS in a 3GPP network.

FIG. 12 depicts a network apparatus 1200 that may be used for handling security aspects for UAS in a 3GPP network, according to embodiments of the disclosure. In one embodiment, network apparatus 1200 may be one implementation of a serving network function in a mobile network, such as the AMF 143, the SMF 145, the AMF 203, the SMF 205, the AMF/SEAF 605, the AMF/SMF #1 703, the AMF/SMF #2 707, the AMF/SEAF 805, and/or the AMF/SMF 1005. In another embodiment, the network apparatus 1200 may be one implementation of a network function that handles UAV and/or UAV-C related UAS operational message exchange with a corresponding USS/UTM on behalf of the 3GPP network, such as the NEF 146, the UAS-NF 147, the UAS-NF 209, the UAS-NF #1 705, the UAS-NF #2 707, a NEF+SCEF, a UFES, and/or another suitable NF in the 3GPP network. Furthermore, the network apparatus 1200 may include a processor 1205, a memory 1210, an input device 1215, an output device 1220, and a transceiver 1225.

In some embodiments, the input device 1215 and the output device 1220 are combined into a single device, such as a touchscreen. In certain embodiments, the network apparatus 1200 may not include any input device 1215 and/or output device 1220. In various embodiments, the network apparatus 1200 may include one or more of: the processor 1205, the memory 1210, and the transceiver 1225, and may not include the input device 1215 and/or the output device 1220.

As depicted, the transceiver 1225 includes at least one transmitter 1230 and at least one receiver 1235. Here, the transceiver 1225 communicates with one or more remote units 105. Additionally, the transceiver 1225 may support at least one network interface 1240 and/or application interface 1245. The application interface(s) 1245 may support one or more APIs. The network interface(s) 1240 may support 3GPP reference points, such as Uu, N1, N2 and N3. Other network interfaces 1240 may be supported, as understood by one of ordinary skill in the art.

The processor 1205, in one embodiment, may include any known controller capable of executing computer-readable instructions and/or capable of performing logical operations. For example, the processor 1205 may be a microcontroller, a microprocessor, a CPU, a GPU, an auxiliary processing unit, a FPGA, or similar programmable controller. In some embodiments, the processor 1205 executes instructions stored in the memory 1210 to perform the methods and routines described herein. The processor 1205 is communicatively coupled to the memory 1210, the input device 1215, the output device 1220, and the transceiver 1225.

In various embodiments, the network apparatus 1200 is a RAN node (e.g., gNB) that communicates with one or more UEs, as described herein. In such embodiments, the processor 1205 controls the network apparatus 1200 to perform the above described RAN behaviors. When operating as a RAN node, the processor 1205 may include an application processor (also known as "main processor") which manages application-domain and operating system ("OS") functions and a baseband processor (also known as "baseband radio processor") which manages radio functions.

In various embodiments, the processor 1205 controls the apparatus 1200 to perform the above described AMF and/or SMF behaviors. In some embodiments, the transceiver 1225 receives (e.g., via a network interface 1245) a revocation message comprising a UAV ID (e.g., a UUAA revocation or a UAS pairing revocation message) and sends a revocation indication to a UE in response to the revocation message. The processor 1205 deletes a UAS context (i.e., UE context) corresponding to the revocation message, wherein the transceiver 1225 receives a revocation acknowledgement from the UE. In various embodiments, the UAS context contains information related to UUAA or C2 pairing of a UE.

In some embodiments, the revocation message comprises a UUAA revocation message that revokes a UUAA for the UAV ID. In such embodiments, sending the revocation indication comprises sending a UCU command to the UE and deleting the UAS context comprises deleting one or more of: authorization information and security context that was received after a successful UUAA, wherein the UAV ID comprises one or more of: a network-level UAV ID (i.e., 3GPP UAV ID, SUPI and/or GPSI) and a CAA-level UAV ID.

In certain embodiments, the processor 1205 determines whether an active data connection (i.e., PDU Session in 5G or PDN Connection in 4G) corresponds to the UUAA/pairing revocation message (e.g., determining using the network-level UAV ID or the CAA-level UAV ID) and releasing the active data connection in response to determining that the active data connection corresponds to UUAA/pairing revocation request.

In some embodiments, the revocation message revokes a UAS pairing corresponding to the UAV ID (e.g., a UAV/UAV-C pairing or C2 association). In such embodiments, sending the revocation indication includes sending a PDU session release command and deleting the UAS context includes deleting one or more of: A) pairing (or C2 association) authorization information, B) session security information that was received after a successful UAS pairing procedure between a UAV and a UAV-C, and C) combinations thereof. As used herein, a "UAS pairing" refers to a UAV/UAV-C pairing, a C2 pairing, and/or a C2 association.

In some embodiments, the revocation message includes a pairing update message for the UAV ID. For example, the revocation indication message may be a UAV/UAV-C pairing update for the UAV ID or a C2 pairing/association update for the UAV ID. In such embodiments, the pairing update message contains one or more of: A) UAV-C ID, B) new pairing authorization information, and C) cause value 'UAV-C replacement' (or 'UAV-C change').

In certain embodiments, sending the revocation indication to the UE includes sending a PDU session modification command. In one embodiment, the processor updates a UAS pairing corresponding to the UAV ID based on the new pairing authorization information. In another embodiment, the processor uses the new pairing authorization information to update one or more of: A) pairing (or C2) authorization information; B) C2 association authorization information; C) session security information that was received after a successful UAS pairing procedure between a UAV and a UAV-C; and D) combinations thereof.

In some embodiments, the UAS context contains one or more of: A) UUAA results; B) Pairing/C2 authorization results; C) UUAA authorization information; D) security key; E) a token; F) a lifetime; G) pairing information; H) pairing authorization results; I) C2 association information; J) C2 association authorization results; K) UAS security information; L) session security key material; M) session security token; and N) combinations thereof.

In some embodiments, the transceiver 1225 receives a reauthentication request message from a UAS-NF, the reauthentication request message containing one or more of: A) a network-level UAV ID (e.g., GPSI), B) a CAA-level UAV ID, C) a cause value that indicates reauthentication of the UE, and D) combinations thereof. In such embodiments, the transceiver 1225 transmits—to the UE—a NAS message containing a UAV ID request and an indication that reauthentication of the UE is required.

In some embodiments, the transceiver 1225 receives a pairing authorization request from a UE and forwarding the pairing authorization request to a UAS-NF in response to verifying that the UE is authorized to request pairing authorization. Here, the pairing authorization request includes one or more of: A) a first ID that belongs to the UAV, B) a second ID belonging to the UAV-C, C) a third ID belonging to a UAS, and D) combinations thereof.

In such embodiments, the transceiver 1225 receives a pairing authorization response from the UAS-NF, storing the contents of the pairing authorization response to local memory, and sending the contents of the pairing authorization response to the UE. Here, the contents of the pairing authorization response include one or more of: A) a pairing success indication, B) pairing authorization information (or C2 authorization information), C) session security information, and D) combinations thereof.

In various embodiments, the processor 1205 controls the apparatus 1200 to perform the above described UAS-NF behaviors. In some embodiments, the transceiver 1225 (i.e., supporting a network interface 1245) receives a UUAA request from a first NF (e.g., from an AMF and/or SMF), where the UUAA request contains one or more of: a network-level UAV ID (i.e., UAV ID and/or GPSI), a subscription permanent identifier (i.e., SUPI) and a CAA-level UAV ID.

The processor 1205 associates (and stores) the subscription permanent identifier with the CAA-level UAV ID and a network-level UAV ID (i.e., 3GPP UAV ID and/or GPSI). In one embodiment, if the network-level UAV ID is not received in the UUAA request, then the processor 1205 fetches the network-level UAV ID (e.g., a GPSI) from a UDM/UDR by providing the SUPI. The processor 1205 controls the transceiver 1225 to transmit a second UUAA request to a USS/UTM, where the second UUAA request contains routing information for a network function that handles UAV and/or UAV-C related message exchange (e.g., UUAA and C2 pairing related message exchange) with the USS/UTM.

In some embodiments, the transceiver 1225 receives a revocation message (e.g., UUAA revocation or pairing revocation) from the USS/UTM, the revocation message comprising a UAV ID (e.g., a CAA-level UAV ID) and the processor 1205 sends (via the transceiver 1225) the revocation message to the first NF (e.g., AMF/SMF in case of 5GS and to MME/SMF+PGW-C in case of EPS). In such embodiments, the transceiver 1225 may also receive a response message from the first NF, the response message containing the UAV ID and a revocation success indication. In certain embodiments, the processor 1205 deletes any UAS-related information (e.g., a UAS context) and UAV ID locally stored for the UAV upon receiving the revocation message and triggers an UAS authentication status update at the USS/UTM (e.g., by sending a revocation response message) in response to receiving the revocation success indication.

In some embodiments, the revocation message includes a pairing update message for the UAV ID. For example, the revocation message may be a UAV/UAV-C pairing update for the UAV ID or a C2 association update for the UAV ID. In such embodiments, the pairing update message contains one or more of: A) UAV-C ID, B) new pairing authorization information, and C) cause value 'UAV-C replacement' (or 'UAV-C change'). In certain embodiments, sending the revocation message to the first NF includes sending the pairing update message to a serving network function (e.g., serving AMF/SMF) corresponding to the UAV ID.

In some embodiments, the first NF includes an AMF, and the revocation message includes a UUAA revocation message that revokes a UUAA for the UAV ID and the UAV ID contains one or more of: a network-level UAV ID (e.g., 3GPP UAV ID, SUPI and/or GPSI) and a CAA-level UAV ID.

In some embodiments, the first NF includes an SMF, and the revocation message revokes a UAS pairing corresponding to the UAV ID (e.g., a UAV/UAV-C pairing or C2 association). In such embodiments, sending the revocation message to the SMF includes sending one or more of: a CAA-level UAV ID, a UAV-C ID, and a subscriber identity (e.g., SUPI and/or GPSI) of the UAV.

In some embodiments, the transceiver 1225 receiving a reauthentication request message from a USS/UTM. Here, the reauthentication request message contains one or more of: A) a network-level UAV ID (e.g., GPSI); B) a CAA-level UAV ID; C) a cause value that indicates reauthentication of the UE; and D) combinations thereof. In such embodiments, the processor 1205 forwards (via the transceiver 1225) the reauthentication request message to a first NF (e.g., to an AMF and/or SMF in case of 5GS and to an MME and/or SMF+PGW-C in case of EPS).

In some embodiments, the transceiver 1225 receives a pairing authorization request from a first NF (e.g., an AMF) and the processor forwards (via the transceiver 1225) the pairing authorization request to a USS/UTM in response to verifying that the UE is authorized to request pairing authorization. In such embodiments, the pairing authorization request includes one or more of: A) a first ID that belongs to the UAV; B) a second ID belonging to the UAV-C; C) a third ID belonging to a UAS; and D) combinations thereof. Moreover, the transceiver 1225 further receives a pairing authorization response from the USS/UTM and forwards (via the transceiver 1225) the pairing authorization response to the first NF (e.g., the AMF). In such embodiments, the pairing authorization response includes one or more of: A) a pairing success indication, B) pairing authorization information (or C2 association authorization information), and C) session security information; and D) combinations thereof.

The memory 1210, in one embodiment, is a computer readable storage medium. In some embodiments, the memory 1210 includes volatile computer storage media. For example, the memory 1210 may include a RAM, including dynamic RAM ("DRAM"), synchronous dynamic RAM ("SDRAM"), and/or static RAM ("SRAM"). In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media.

In some embodiments, the memory 1210 stores data related to location-aware beam selection and/or mobile operation. For example, the memory 1210 may store parameters, configurations, resource assignments, policies, and the like, as described above. In certain embodiments, the memory 1210 also stores program code and related data, such as an operating system or other controller algorithms operating on the apparatus 1200.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, is designed to output visual, audible, and/or haptic signals. In some embodiments, the output device 1220 includes an electronically controllable display or display device capable of outputting visual data to a user. For example, the output device 1220 may include, but is not limited to, an LCD display, an LED display, an OLED display, a projector, or similar display device capable of outputting images, text, or the like to a user. As another, non-limiting, example, the output device 1220 may include a wearable display separate from, but communicatively coupled to, the rest of the network apparatus 1200, such as a smart watch, smart glasses, a heads-up display, or the like. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all or portions of the output device 1220 may be integrated with the input device 1215. For example, the input device 1215 and output device 1220 may form a touchscreen or similar touch-sensitive display. In other embodiments, the output device 1220 may be located near the input device 1215.

The transceiver 1225 includes at least transmitter 1230 and at least one receiver 1235. One or more transmitters 1230 may be used to communicate with the UE, as described herein. Similarly, one or more receivers 1235 may be used to communicate with network functions in the Public Land Mobile Network ("PLMN") and/or RAN, as described herein. Although only one transmitter 1230 and one receiver 1235 are illustrated, the network apparatus 1200 may have any suitable number of transmitters 1230 and receivers 1235. Further, the transmitter(s) 1230 and the receiver(s) 1235 may be any suitable type of transmitters and receivers.

Figure 13:
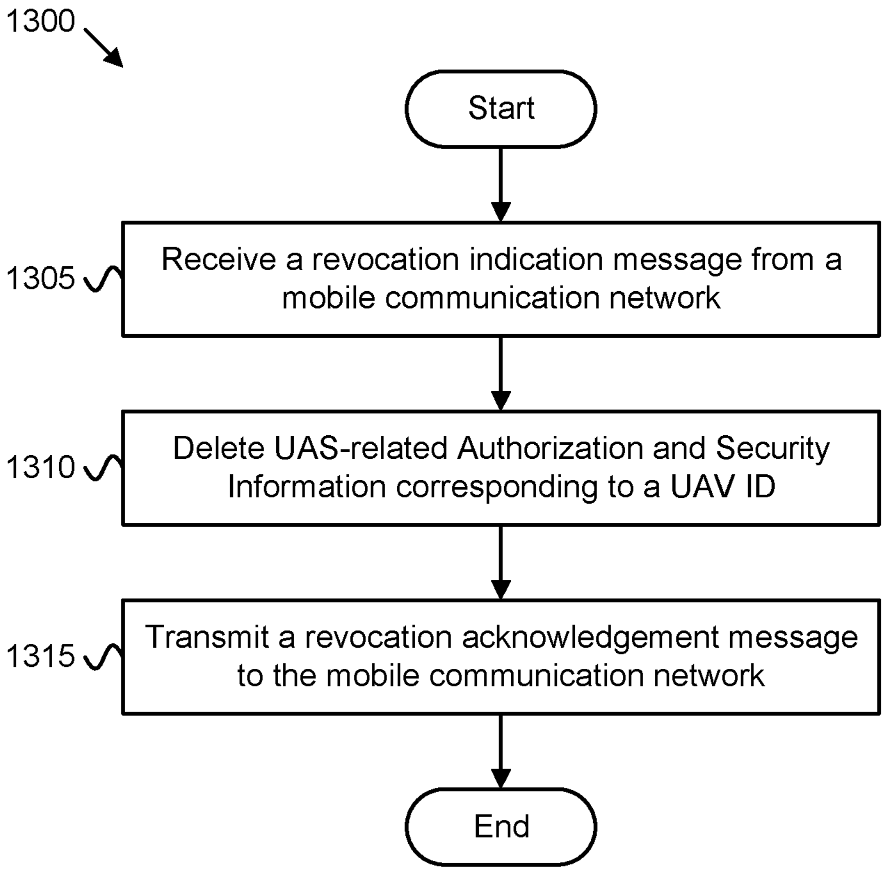
FIG. 13 is a flowchart diagram illustrating one embodiment of a first method for handling security aspects for UAS in a 3GPP network.

FIG. 13 depicts one embodiment of a method 1300 for handling security aspects for UAS in a 3GPP network, according to embodiments of the disclosure. In various embodiments, the method 1300 is performed by a communication apparatus in an UAS, such as the remote unit 105, the UAV 106, the UAV-C 108, the UE 201, the UE 401, the UAV-C 601, the UAV 603, the UE 701, the UE 711, the UAV-C 801, the UAV 803, the UE 1001, and/or the user equipment apparatus 1100, described above as described above. In some embodiments, the method 1300 is performed by a processor, such as a microcontroller, a microprocessor, a CPU, a GPU, an auxiliary processing unit, a FPGA, or the like.

The method 1300 begins and receives 1305 a revocation indication message from a mobile communication network (e.g., from SMF/AMF or from MME/PGW-C/SMF+PGW-C). The method 1300 includes deleting 1310 UAS-related authorization and security information corresponding to a UAV ID. The first method includes transmitting 1315 a revocation acknowledgement message to the mobile communication network. The method 1300 ends.

Figure 14:
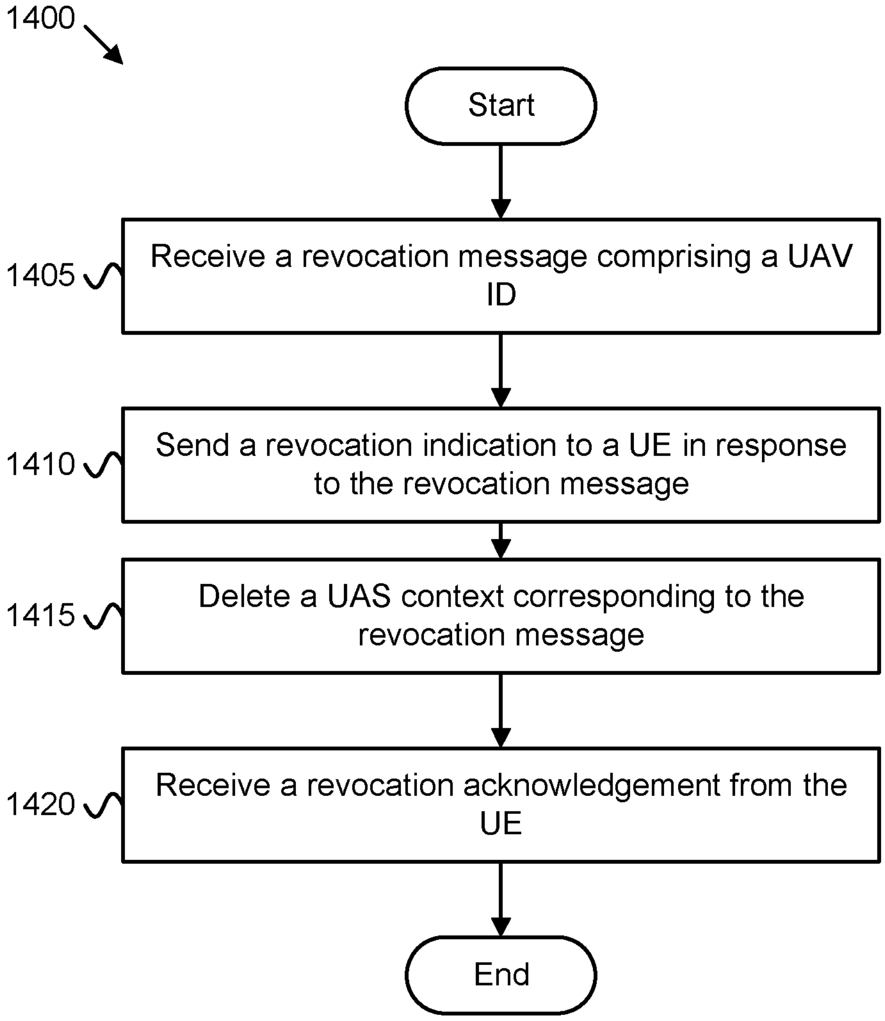
FIG. 14 is a flowchart diagram illustrating one embodiment of a second method for handling security aspects for UAS in a 3GPP network.

FIG. 14 depicts one embodiment of a method 1400 for handling security aspects for UAS in a 3GPP network, according to embodiments of the disclosure. In various embodiments, the method 1400 is performed by a network entity, such as the AMF 143, the SMF 145, the AMF 203, the SMF 205, the AMF/SEAF 605, the AMF/SMF #1 703, the AMF/SMF #2 707, the AMF/SEAF 805, the AMF/SMF 1005, and/or the network apparatus 1200, described above as described above. In some embodiments, the method 1400 is performed by a processor, such as a microcontroller, a microprocessor, a CPU, a GPU, an auxiliary processing unit, a FPGA, or the like.

The method 1400 begins and receives 1405 a revocation message (e.g., a UUAA revocation or a UAS pairing revocation) comprising a UAV ID. The method 1400 includes sending 1410 a revocation indication to a UE in response to the revocation message. The method 1400 includes deleting 1415 a UAS context corresponding to the revocation message. The method 1400 includes receiving 1420 a revocation acknowledgement from the UE. The method 1400 ends.

Figure 15:
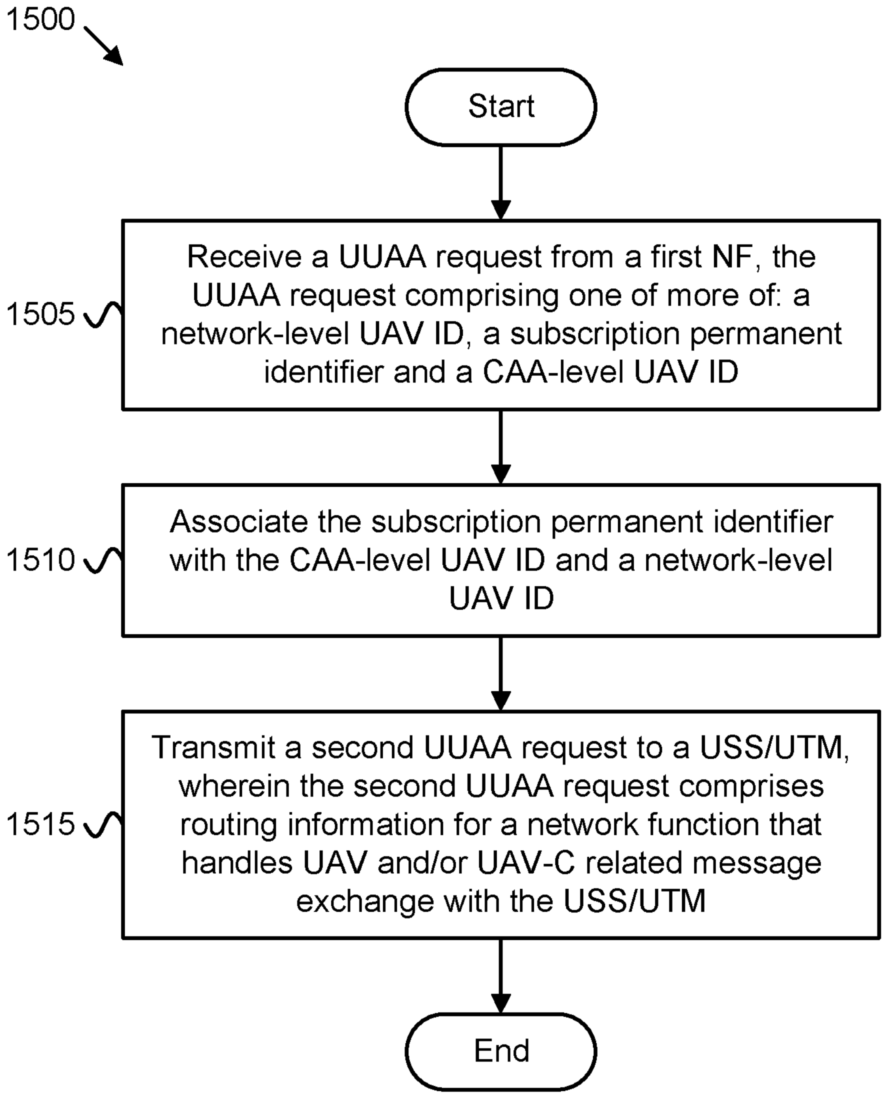
FIG. 15 is a flowchart diagram illustrating one embodiment of a third method for handling security aspects for UAS in a 3GPP network.

FIG. 15 depicts one embodiment of a method 1500 for handling security aspects for UAS in a 3GPP network, according to embodiments of the disclosure. In various embodiments, the method 1500 is performed by a network function in a communication network, such as the NEF 146, UAS-NF 147, the UAS-NF 209, the UAS-NF #1 705, the UAS-NF #2 707, and/or the network apparatus 1200, described above as described above. In some embodiments, the method 1500 is performed by a processor, such as a microcontroller, a microprocessor, a CPU, a GPU, an auxiliary processing unit, a FPGA, or the like.

The method 1500 begins and receives 1505 a UUAA request from a first NF (e.g., AMF/SMF), the UUAA request comprising one or more of: a network-level UAV ID, a subscription permanent identifier (e.g., SUPI) and a CAA-level UAV ID. The method 1500 includes associating 1510 the subscription permanent identifier with the CAA-level UAV ID and a network-level UAV ID (e.g., 3GPP UAV ID/GPSI). The method 1500 includes transmitting 1515 a second UUAA request to a USS/UTM, where the second UUAA request comprises routing information for a network function that handles UAV and UAV-C message exchange (e.g., UUAA and UAV/UAV-C pairing authorization) with the USS/UTM. The method 1500 ends.

Disclosed herein is a first apparatus for handling security aspects for UAS in a 3GPP network, according to embodiments of the disclosure. The first apparatus may be implemented by a communication apparatus in an UAS, such as the remote unit 105, the UAV 106, the UAV-C 108, the UE 201, the UE 401, the UAV-C 601, the UAV 603, the UE 701, the UE 711, the UAV-C 801, the UAV 803, the UE 1001, and/or the user equipment apparatus 1100, described above. The first apparatus includes a transceiver that receives a revocation indication message from a mobile communication network (e.g., from SMF via AMF or from AMF in case of 5GS or from MME/SMF+PGW-C in case of EPS). The processor deletes UAS-related authorization and security information corresponding to a UAV ID and sends a revocation acknowledgement message to the mobile communication network (e.g., via the transceiver).

In some embodiments, the UAV ID comprises at least a CAA-level UAV ID. In some embodiments, the UAS-related authorization and security information includes one or more of: A) UUAA results; B) Pairing/C2 authorization results; C) UUAA authorization information; D) security key; E) a token; F) a lifetime; G) pairing information; H) pairing authorization results; I) C2 association information; J) C2 association authorization results; K) UAS security information; L) session security key material; M) session security token; and N) combinations thereof.

In some embodiments, the revocation indication message revokes a UUAA for the UAV ID. In such embodiments, deleting the UAS-related authorization and security information includes deleting authorization information and security context that was received after a successful UUAA. In some embodiments, the revocation indication message revokes a UAS pairing corresponding to the UAV ID (e.g., UAV/UAV-C pairing and/or C2 pairing/association). In such embodiments, deleting the UAS-related authorization and security information comprises deleting UAS pairing authorization information and session security information that was received after a successful UAS pairing procedure, e.g., between a UAV and a UAV-C.

In certain embodiments, the UAS pairing procedure includes sending a pairing authorization request and receiving a pairing success indication comprising the session security information. Here, the pairing authorization request contains one or more of: A) a first ID that belongs to the UAV, B) a second ID belonging to the UAV-C, and C) a third ID belonging to a UAS.

Disclosed herein is a first method for handling security aspects for UAS in a 3GPP network, according to embodiments of the disclosure. The first method may be performed by a communication apparatus in an UAS, such as the remote unit 105, the UAV 106, the UAV-C 108, the UE 201, the UE 401, the UAV-C 601, the UAV 603, the UE 701, the UE 711, the UAV-C 801, the UAV 803, the UE 1001, and/or the user equipment apparatus 1100, described above. The first method includes receiving a revocation indication message from a mobile communication network (e.g., from SMF via AMF or from AMF in case of 5GS or from MME/SMF+PGW-C in case of EPS) and deleting UAS-related authorization and security information corresponding to a UAV ID. The first method includes transmitting a revocation acknowledgement message to the mobile communication network.

In some embodiments, the UAV ID comprises at least a CAA-level UAV ID. In some embodiments, the UAS-related authorization and security information includes one or more of: A) UUAA results; B) Pairing/C2 authorization results; C) UUAA authorization information; D) security key; E) a token; F) a lifetime; G) pairing information; H) pairing authorization results; I) C2 association information; J) C2 association authorization results; K) UAS security information; L) session security key material; M) session security token; and N) combinations thereof.

In some embodiments, the revocation indication message revokes a UUAA for the UAV ID. In such embodiments, deleting the UAS-related authorization and security information includes deleting authorization information and security context that was received after a successful UUAA. In some embodiments, the revocation indication message revokes a UAS pairing corresponding to the UAV ID (e.g., UAV/UAV-C pairing and/or C2 pairing/association). In such embodiments, deleting the UAS-related authorization and security information comprises deleting UAS pairing authorization information and session security information that was received after a successful UAS pairing procedure, e.g., between a UAV and a UAV-C.

In certain embodiments, the UAS pairing procedure includes sending a pairing authorization request and receiving a pairing success indication comprising the session security information. Here, the pairing authorization request contains one or more of: A) a first ID that belongs to the UAV, B) a second ID belonging to the UAV-C, and C) a third ID belonging to a UAS.

Disclosed herein is a second apparatus for handling security aspects for UAS in a 3GPP network, according to embodiments of the disclosure. The second apparatus may be implemented by a network entity, such as the AMF 143, the SMF 145, the AMF 203, the SMF 205, the AMF/SEAF 605, the AMF/SMF #1 703, the AMF/SMF #2 707, the AMF/SEAF 805, the AMF/SMF 1005, and/or the network apparatus 1200, described above. Alternatively, in the case of EPS, the network entity may be implemented by an or by control plane portion of a PGW/SMF+PGW-C and/or to the MME. The second apparatus includes a processor and a transceiver that receives a revocation message comprising a UAV ID (e.g., a UUAA revocation or a UAS pairing revocation message) and sends a revocation indication to a UE in response to the revocation message. The processor deletes a UAS context corresponding to the revocation message, wherein the transceiver receives a revocation acknowledgement from the UE.

In some embodiments, the revocation message comprises a UUAA revocation message that revokes a UUAA for the UAV ID. In such embodiments, sending the revocation indication comprises sending a UCU command to the UE and deleting the UAS context comprises deleting one or more of: authorization information and security context that was received after a successful UUAA, wherein the UAV ID comprises one or more of: a network-level UAV ID (i.e., 3GPP UAV ID, SUPI and/or GPSI) and a CAA-level UAV ID.

In certain embodiments, the processor determines whether an active data connection (i.e., PDU Session in 5G or PDN Connection in 4G) corresponds to the UUAA/pairing revocation message (e.g., determining using the network-level UAV ID or the CAA-level UAV ID) and releasing the active data connection in response to determining that the active data connection corresponds to UUAA/pairing revocation request.

In some embodiments, the revocation message revokes a UAS pairing corresponding to the UAV ID (e.g., a UAV/UAV-C pairing or C2 association). In such embodiments, sending the revocation indication includes sending a PDU session release command and deleting the UAS context includes deleting one or more of: A) pairing (or C2 association) authorization information, B) session security information that was received after a successful UAS pairing procedure between a UAV and a UAV-C, and C) combinations thereof.

In some embodiments, the revocation message includes a pairing update message for the UAV ID. For example, the revocation indication message may be a UAV/UAV-C pairing update for the UAV ID or a C2 pairing/association update for the UAV ID. In such embodiments, the pairing update message contains one or more of: A) UAV-C ID, B) new pairing authorization information, and C) cause value 'UAV-C replacement' (or 'UAV-C change').

In certain embodiments, sending the revocation indication to the UE includes sending a PDU session modification command. In one embodiment, the processor updates a UAS pairing corresponding to the UAV ID based on the new pairing authorization information. In another embodiment, the processor uses the new pairing authorization information to update one or more of: A) pairing (or C2) authorization information; B) C2 association authorization information; C) session security information that was received after a successful UAS pairing procedure between a UAV and a UAV-C; and D) combinations thereof.

In some embodiments, the UAS context contains one or more of: A) UUAA results; B) Pairing/C2 authorization results; C) UUAA authorization information; D) security key; E) a token; F) a lifetime; G) pairing information; H) pairing authorization results; I) C2 association information; J) C2 association authorization results; K) UAS security information; L) session security key material; M) session security token; and N) combinations thereof.

In some embodiments, the transceiver receives a reauthentication request message from a UAS-NF, the reauthentication request message containing one or more of: A) a network-level UAV ID (e.g., GPSI), B) a CAA-level UAV ID, C) a cause value that indicates reauthentication of the UE, and D) combinations thereof. In such embodiments, the transceiver transmits—to the UE—a NAS message containing a UAV ID request and an indication that reauthentication of the UE is required.

In some embodiments, the transceiver receives a pairing authorization request from a UE and forwarding the pairing authorization request to a UAS-NF in response to verifying that the UE is authorized to request pairing authorization. Here, the pairing authorization request includes one or more of: A) a first ID that belongs to the UAV, B) a second ID belonging to the UAV-C, C) a third ID belonging to a UAS, and D) combinations thereof.

In such embodiments, the transceiver receives a pairing authorization response from the UAS-NF, storing the contents of the pairing authorization response to local memory, and sending the contents of the pairing authorization response to the UE. Here, the contents of the pairing authorization response include one or more of: A) a pairing success indication, B) pairing authorization information (or C2 authorization information), C) session security information, and D) combinations thereof.

Disclosed herein is a second method for handling security aspects for UAS in a 3GPP network, according to embodiments of the disclosure. The second apparatus may be performed by a network entity, such as the AMF 143, the SMF 145, the AMF 203, the SMF 205, the AMF/SEAF 605, the AMF/SMF #1 703, the AMF/SMF #2 707, the AMF/SEAF 805, the AMF/SMF 1005, and/or the network apparatus 1200, described above. Alternatively, in the case of EPS, the network entity may be implemented by an or by control plane portion of a PGW and/or to the MME. The second method includes receiving a revocation message (e.g., a UUAA revocation or a UAS pairing revocation) comprising a UAV ID and sending a revocation indication to a UE in response to the revocation message. The second method includes deleting a UAS context corresponding to the revocation message and receiving a revocation acknowledgement from the UE.

In some embodiments, the revocation message comprises a UUAA revocation message that revokes a UUAA for the UAV ID. In such embodiments, sending the revocation indication comprises sending a UCU command to the UE and deleting the UAS context comprises deleting one or more of: authorization information and security context that was received after a successful UUAA, wherein the UAV ID comprises one or more of: a network-level UAV ID (i.e., 3GPP UAV ID, SUPI and/or GPSI) and a CAA-level UAV ID.

In certain embodiments, the second method includes determining whether an active data connection (i.e., PDU Session in 5G or PDN Connection in 4G) corresponds to the UUAA/pairing revocation message (e.g., determining using the network-level UAV ID or the CAA-level UAV ID) and releasing the active data connection in response to determining that the active data connection corresponds to UUAA/pairing revocation request.

In some embodiments, the revocation message revokes a UAS pairing corresponding to the UAV ID (e.g., a UAV/UAV-C pairing or C2 association). In such embodiments, sending the revocation indication includes sending a PDU session release command and deleting the UAS context includes deleting one or more of: A) pairing (or C2 association) authorization information, B) session security information that was received after a successful UAS pairing procedure between a UAV and a UAV-C, and C) combinations thereof.

In some embodiments, the revocation message includes a pairing update message for the UAV ID. For example, the revocation indication message may be a UAV/UAV-C pairing update for the UAV ID or a C2 pairing/association update for the UAV ID. In such embodiments, the pairing update message contains one or more of: A) UAV-C ID, B) new pairing authorization information, and C) cause value 'UAV-C replacement' (or 'UAV-C change').

In certain embodiments, sending the revocation indication to the UE includes sending a PDU session modification command. In one embodiment, the second method includes the network entity updating a UAS pairing corresponding to the UAV ID based on the new pairing authorization information. In another embodiment, the second method includes the network entity using the new pairing authorization information to update one or more of: A) pairing (or C2) authorization information; B) C2 association authorization information; C) session security information that was received after a successful UAS pairing procedure between a UAV and a UAV-C; and D) combinations thereof.

In some embodiments, the UAS context contains one or more of: A) UUAA results; B) Pairing/C2 authorization results; C) UUAA authorization information; D) security key; E) a token; F) a lifetime; G) pairing information; H) pairing authorization results; I) C2 association information; J) C2 association authorization results; K) UAS security information; L) session security key material; M) session security token; and N) combinations thereof.

In some embodiments, the second method further includes receiving a reauthentication request message from a UAS-NF, the reauthentication request message containing one or more of: A) a network-level UAV ID (e.g., GPSI), B) a CAA-level UAV ID, C) a cause value that indicates reauthentication of the UE, and D) combinations thereof. In such embodiments, the second method includes transmitting—to the UE—a NAS message containing a UAV ID request and an indication that reauthentication of the UE is required.

In some embodiments, the second method further includes receiving a pairing authorization request from a UE and forwarding the pairing authorization request to a UAS-NF in response to verifying that the UE is authorized to request pairing authorization. Here, the pairing authorization request includes one or more of: A) a first ID that belongs to the UAV, B) a second ID belonging to the UAV-C, C) a third ID belonging to a UAS, and D) combinations thereof.

In such embodiments, the second method further includes receiving a pairing authorization response from the UAS-NF, storing the contents of the pairing authorization response to local memory, and sending the contents of the pairing authorization response to the UE. Here, the contents of the pairing authorization response include one or more of: A) a pairing success indication, B) pairing authorization information (or C2 authorization information), C) session security information, and D) combinations thereof.

Disclosed herein is a third apparatus for handling security aspects for UAS in a 3GPP network, according to embodiments of the disclosure. The third apparatus may be implemented by a network function in a communication network, such as the NEF 146, the UAS-NF 147, the UAS-NF 209, the UAS-NF #1 705, the UAS-NF #2 707, and/or the network apparatus 1200, described above. The third apparatus includes a processor and a transceiver (i.e., supporting a network interface) that receives a UUAA request from a first NF (e.g., from an AMF and/or SMF), where the UUAA request contains one or more of: a network-level UAV ID (i.e., UAV ID and/or GPSI), a subscription permanent identifier (i.e., SUPI) and a CAA-level UAV ID.

The processor associates (and stores) the subscription permanent identifier with the CAA-level UAV ID and a network-level UAV ID (i.e., 3GPP UAV ID and/or GPSI). In one embodiment, if the third apparatus does not receive the network-level UAV ID, then the processor fetches the network-level UAV ID (e.g., a GPSI) from a UDM/UDR by providing the SUPI. The processor controls the transceiver to transmit a second UUAA request to a USS/UTM, where the second UUAA request contains routing information for a network function that handles UAV and/or UAV-C related message exchange (e.g., UUAA and UAV/UAV-C pairing authorization) with the USS/UTM.

In some embodiments, the transceiver receives a revocation message (e.g., UUAA revocation or pairing revocation) from the USS/UTM, the revocation message comprising a UAV ID (e.g., a CAA-level UAV ID) and the processor sends (via the transceiver) the revocation message to the first NF (e.g., AMF/SMF in case of 5GS and to MME/SMF+PGW-C in case of EPS). In such embodiments, the transceiver may also receive a response message from the first NF, the response message containing the UAV ID and a revocation success indication. In certain embodiments, the processor deletes any UAS-related information (e.g., a UAS context) and UAV ID locally stored for the UAV upon receiving the revocation message and triggers an UAS authentication status update at the USS/UTM (e.g., by sending a revocation response message) in response to receiving the revocation success indication.

In some embodiments, the revocation message includes a pairing update message for the UAV ID. For example, the revocation message may be a UAV/UAV-C pairing update for the UAV ID or a C2 association update for the UAV ID. In such embodiments, the pairing update message contains one or more of: A) UAV-C ID, B) new pairing authorization information, and C) cause value 'UAV-C replacement' (or 'UAV-C change'). In certain embodiments, sending the revocation message to the first NF includes sending the pairing update message to a serving network function (e.g., serving AMF/SMF) corresponding to the UAV ID.

In some embodiments, the first NF includes an AMF, and the revocation message includes a UUAA revocation message that revokes a UUAA for the UAV ID and the UAV ID contains one or more of: a network-level UAV ID (e.g., 3GPP UAV ID, SUPI and/or GPSI) and a CAA-level UAV ID.

In some embodiments, the first NF includes an SMF, and the revocation message revokes a UAS pairing corresponding to the UAV ID (e.g., a UAV/UAV-C pairing or C2 association). In such embodiments, sending the revocation message to the SMF includes sending one or more of: a CAA-level UAV ID, a UAV-C ID, and a subscriber identity (e.g., SUPI and/or GPSI) of the UAV.

In some embodiments, the transceiver receiving a reauthentication request message from a USS/UTM. Here, the reauthentication request message contains one or more of: A) a network-level UAV ID (e.g., GPSI); B) a CAA-level UAV ID; C) a cause value that indicates reauthentication of the UE; and D) combinations thereof. In such embodiments, the processor forwards (via the transceiver) the reauthentication request message to a first NF (e.g., to an AMF and/or SMF in case of 5GS and to an MME and/or SMF+PGW-C in case of EPS).

In some embodiments, the transceiver receives a pairing authorization request from a first NF (e.g., an AMF) and the processor forwards (via the transceiver) the pairing authorization request to a USS/UTM in response to verifying that the UE is authorized to request pairing authorization. In such embodiments, the pairing authorization request includes one or more of: A) a first ID that belongs to the UAV; B) a second ID belonging to the UAV-C; C) a third ID belonging to a UAS; and D) combinations thereof. Moreover, the transceiver further receives a pairing authorization response from the USS/UTM and forwards (via the transceiver) the pairing authorization response to the first NF (e.g., the AMF). In such embodiments, the pairing authorization response includes one or more of: A) a pairing success indication, B) pairing authorization information (or C2 association authorization information), and C) session security information; and D) combinations thereof.

Disclosed herein is a third method for handling security aspects for UAS in a 3GPP network, according to embodiments of the disclosure. The third method may be performed by a network function in a communication network, such as the NEF 146, the UAS-NF 147, the UAS-NF 209, the UAS-NF #1 705, the UAS-NF #2 707, and/or the network apparatus 1200, described above. The third method includes receiving a UUAA request from a first NF (e.g., AMF/SMF), the UUAA request comprising one or more of: a network-level UAV ID, a subscription permanent identifier (e.g., SUPI) and a CAA-level UAV ID. The third method includes associating (and storing) the subscription permanent identifier with the CAA-level UAV ID and a network-level UAV ID (e.g., 3GPP UAV ID/GPSI) and transmitting a second UUAA request to a USS/UTM, where the second UUAA request comprises routing information for a network function that handles UAV and/or UAV-C related message exchange (e.g., UUAA and UAV/UAV-C pairing authorization) with the USS/UTM.

In some embodiments, the third method includes receiving a revocation message (e.g., UUAA revocation or pairing revocation) from the USS/UTM, the revocation message comprising a UAV ID (e.g., a CAA-level UAV ID) and sending the revocation message to the first NF (e.g., AMF/SMF in case of 5GS and to MME/SMF+PGW-C in case of EPS). In such embodiments, the third method also includes receiving a response message from the first NF, the response message containing the UAV ID and a revocation success indication. In certain embodiments, the third method includes deleting any UAS-related information (e.g., a UAS context) and UAV ID locally stored for the UAV in response to receiving the revocation message and triggering an UAS authentication status update at the USS/UTM (e.g., by sending a revocation response message) in response to receiving the revocation success indication.

In some embodiments, the revocation message includes a pairing update message for the UAV ID. For example, the revocation message may be a UAV/UAV-C pairing update for the UAV ID or a C2 association update for the UAV ID. In such embodiments, the pairing update message contains one or more of: A) UAV-C ID, B) new pairing authorization information, and C) cause value 'UAV-C replacement' (or 'UAV-C change'). In certain embodiments, sending the revocation message to the first NF includes sending the pairing update message to a serving network function (e.g., serving AMF/SMF) corresponding to the UAV ID.

In some embodiments, the first NF includes an AMF, and the revocation message includes a UUAA revocation message that revokes a UUAA for the UAV ID and the UAV ID contains one or more of: a network-level UAV ID (e.g., 3GPP UAV ID, SUPI and/or GPSI) and a CAA-level UAV ID.

In some embodiments, the first NF includes an SMF, and the revocation message revokes a UAS pairing corresponding to the UAV ID (e.g., a UAV/UAV-C pairing or C2 association). In such embodiments, sending the revocation message to the SMF includes sending one or more of: a CAA-level UAV ID, a UAV-C ID, and a subscriber identity (e.g., SUPI and/or GPSI) of the UAV.

In some embodiments, the third method includes receiving a reauthentication request message from a USS/UTM. Here, the reauthentication request message contains one or more of: A) a network-level UAV ID (e.g., GPSI); B) a CAA-level UAV ID; C) a cause value that indicates reauthentication of the UE; and D) combinations thereof. In such embodiments, the third method includes forwarding the reauthentication request message to a first NF (e.g., to an AMF and/or SMF in case of 5GS and to an MME and/or SMF+PGW-C in case of EPS).

In some embodiments, the third method includes receiving a pairing authorization request from a first NF (e.g., an AMF) and forwarding the pairing authorization request to a USS/UTM in response to verifying that the UE is authorized to request pairing authorization. In such embodiments, the pairing authorization request includes one or more of: A) a first ID that belongs to the UAV; B) a second ID belonging to the UAV-C; C) a third ID belonging to a UAS; and D) combinations thereof. Moreover, the third method includes receiving a pairing authorization response from the USS/UTM and forwarding the pairing authorization response to the first NF (e.g., the AMF). In such embodiments, the pairing authorization response includes one or more of: A) a pairing success indication, B) pairing authorization information (or C2 association authorization information), and C) session security information, and D) combinations thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, the UE comprising:
at least one memory; and
at least one processor coupled with the at least memory and configured to cause the UE to:
receive a revocation indication message from a mobile communication network;
delete uncrewed aerial system ("UAS")-related authorization and security information corresponding to an uncrewed aerial vehicle ("UAV") identifier ("ID"), wherein the UAS-related authorization and security information comprises at least a UAV and UAS service supplier authentication and authorization ("UUAA") context comprising authorization information and a security context received after a successful UUAA, wherein the security context comprises a security key, a token, a lifetime, pairing information, or a combination thereof; and
transmit a revocation acknowledgement message to the mobile communication network.

2. The UE of claim 1, wherein the UAV ID comprises a civil aviation authority ("CAA")-level UAV ID, wherein the UAS-related authorization and security information comprises one or more of:
a UUAA result;
a Command and Control ("C2") authorization result;
UUAA authorization information;
a pairing authorization result;
C2 association information;
a C2 association authorization result;
UAS security information;
session security key material;
a session security token;
or a combination thereof.

3. The UE of claim 1, wherein the revocation indication message revokes the UUAA for the UAV ID.

4. The UE of claim 1, wherein the revocation indication message revokes a UAS pairing corresponding to the UAV ID, wherein the at least one processor is configured to cause the UE to perform a UAS pairing procedure between a UAV and a UAV controller ("UAV-C") and to receive pairing authorization information or session security information based on a successful completion of the UAS pairing procedure, and wherein the UAS-related authorization and security information further comprises the pairing authorization information or the session security information.

5. The UE of claim 4, wherein to perform the UAS pairing procedure, the at least one processor is configured to cause the UE to:
transmit a pairing authorization request comprising:
a first ID that belongs to the UAV, and
a second ID belonging to the UAV-C; and
receive a pairing success indication comprising the session security information.

6. A processor for wireless communication, the processor comprising:
at least one controller coupled with at least one memory and configured to cause the processor to:
receive a revocation indication message from a mobile communication network;
delete uncrewed aerial system ("UAS")-related authorization and security information corresponding to an uncrewed aerial vehicle ("UAV") identifier ("ID"), wherein the UAS-related authorization and security information comprises at least a UAV and UAS service supplier authentication and authorization ("UUAA") context comprising authorization information and a security context received after a successful UUAA, wherein the security context comprises a security key, a token, a lifetime, pairing information, or a combination thereof; and
transmit a revocation acknowledgement message to the mobile communication network.

7. The processor of claim 6, wherein the UAV ID comprises a civil aviation authority ("CAA")-level UAV ID, wherein the UAS-related authorization and security information comprises one or more of:
a UUAA result;
a Command and Control ("C2") authorization result;
UUAA authorization information;
a pairing authorization result;
C2 association information;
a C2 association authorization result;
UAS security information;
session security key material;
a session security token;
or a combination thereof.

8. The processor of claim 6, wherein the revocation indication message revokes a UUAA for the UAV ID.

9. The processor of claim 6, wherein the revocation indication message revokes a UAS pairing corresponding to the UAV ID, wherein the at least one controller is configured to cause the processor to perform a UAS pairing procedure between a UAV and a UAV controller ("UAV-C") and to receive pairing authorization information or session security information based on a successful completion of the UAS pairing procedure, and wherein the UAS-related authorization and security information further comprises at least the pairing authorization information or the session security information.

10. The processor of claim 9, wherein to perform the UAS pairing procedure, the at least one controller is configured to cause the processor to:

transmit a pairing authorization request comprising:
a first ID that belongs to the UAV, and
a second ID belonging to the UAV-C; and
receive a pairing success indication comprising the session security information.

11. A network apparatus for wireless communication, the network apparatus comprising:

at least one memory; and
at least one processor coupled with the at least memory and configured to cause the network apparatus to:
receive a revocation message comprising an uncrewed aerial vehicle ("UAV") identifier ("ID");
transmit a revocation indication to a user equipment ("UE") in response to the revocation message;
delete an uncrewed aerial system ("UAS") context corresponding to the revocation message, wherein the UAS context comprises authorization information and security context that was received after a successful UAV and UAS service supplier Authentication and Authorization ("UUAA") procedure, wherein the security context comprises a security key, a token, a lifetime, pairing information, or a combination thereof; and
receive a revocation acknowledgement from the UE.

12. The network apparatus of claim 11, wherein the revocation message revokes a UUAA for the UAV ID, wherein to transmit the revocation indication, the at least one processor is configured to cause the network apparatus to transmit a UE configuration update ("UCU") command to the UE.

13. The network apparatus of claim 11, wherein the UAV ID comprises one or more of: generic public subscription identifier ("GPSI") and a civil aviation authority ("CAA")-level UAV ID.

14. The network apparatus of claim 11, wherein the at least one processor is further configured to cause the network apparatus to:

determine whether an active data connection corresponds to the revocation message; and
release the active data connection, in response to determining that the active data connection corresponds to the revocation request.

15. The network apparatus of claim 11, wherein the revocation message revokes a UAS pairing corresponding to the UAV ID, wherein to transmit the revocation indication, the at least one processor is configured to cause the network apparatus to transmit a PDU session release command.

16. The network apparatus of claim 11, wherein the at least one processor is configured to cause the network apparatus to perform a UAS pairing procedure between a UAV and a UAV controller ("UAV-C") and to receive pairing authorization information or session security information, based on a successful completion of the UAS pairing procedure, and wherein the UAS context comprises the pairing authorization information or the session security information.

17. The network apparatus of claim 11, wherein the revocation message comprises a pairing update message for the UAV ID, wherein the pairing update message comprises new pairing authorization information, and one or more of: a UAV controller ("UAV-C") ID and cause value 'UAV-C replacement', wherein to transmit the revocation indication to the UE, the at least one processor is configured to cause the network apparatus to transmit a protocol data unit ("PDU") session modification command, and wherein the at least one processor is further configured to cause the network apparatus to update a UAS pairing corresponding to the UAV ID based on the new pairing authorization information.

18. The network apparatus of claim 11, wherein the UAS context comprises one or more of:

UUAA result;
a Command and Control ("C2") authorization result;
UUAA authorization information;
a pairing authorization result;
C2 association information;
a C2 association authorization result;
UAS security information;
session security key material;
a session security token;
or a combination thereof.

19. The network apparatus of claim 11, wherein the at least one processor is further configured to cause the network apparatus to:

receive a reauthentication request message from a UAS network function ("UAS-NF"), the reauthentication request message containing:
a network-level UAV ID,
a civil aviation authority ("CAA")-level UAV ID, and
a cause value that indicates reauthentication of the UE; and
transmit a non-access stratum ("NAS") message to the UE, the NAS message containing:
a UAV ID request, and
an indication that reauthentication of the UE is required.

20. A method performed by a network function, the method comprising:

receiving a revocation message comprising an uncrewed aerial vehicle ("UAV") identifier ("ID");
transmitting a revocation indication to a user equipment ("UE") in response to the revocation message;
deleting an uncrewed aerial system ("UAS") context corresponding to the revocation message, wherein the UAS context comprises authorization information and security context that was received after a successful UAV and UAS service supplier authentication and authorization ("UUAA") procedure, wherein the security context comprises a security key, a token, a lifetime, pairing information, or a combination thereof; and
receiving a revocation acknowledgement from the UE.

* * * * *